US011087253B2

(12) United States Patent
DaCosta et al.

(10) Patent No.: US 11,087,253 B2
(45) Date of Patent: *Aug. 10, 2021

(54) INTERACTIVE REAL TIME SYSTEM AND REAL TIME METHOD OF USE THEREOF IN CONVEYANCE INDUSTRY SEGMENTS

(71) Applicant: TELEPORT MOBILITY, INC., San Diego, CA (US)

(72) Inventors: Alexis DaCosta, Santa Clara, CA (US); Vince Coletti, San Marcos, CA (US)

(73) Assignee: TELEPORT MOBILITY, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/124,833

(22) Filed: Dec. 17, 2020

(65) Prior Publication Data
US 2021/0103877 A1 Apr. 8, 2021

Related U.S. Application Data

(60) Continuation of application No. 16/222,817, filed on Dec. 17, 2018, which is a continuation of application
(Continued)

(51) Int. Cl.
*G06Q 10/06* (2012.01)
*H04W 4/029* (2018.01)
(Continued)

(52) U.S. Cl.
CPC ... *G06Q 10/063114* (2013.01); *G01C 21/343* (2013.01); *G01C 21/3438* (2013.01);
(Continued)

(58) Field of Classification Search
CPC combination set(s) only.
See application file for complete search history.

(56) References Cited

U.S. PATENT DOCUMENTS 5,948,040 A * 9/1999 DeLorme ............... G06Q 10/02
701/426
9,262,929 B1 2/2016 Roy et al.
(Continued)

FOREIGN PATENT DOCUMENTS

CA 2974452 A1 7/2016
WO WO 2019203804 A1 * 4/2018 ......... G06Q 30/0282

OTHER PUBLICATIONS

M. Rigby, S. Winter and A. Krüger, "A Continuous Representation of Ad Hoc Ridesharing Potential," in IEEE Transactions on Intelligent Transportation Systems, vol. 17, No. 10, pp. 2832-2842, Oct. 2016, doi: 10.1109/TITS.2016.2527052. (Year: 2016).*
(Continued)

*Primary Examiner* — Crystol Stewart
(74) *Attorney, Agent, or Firm* — Eleanor Musick; Musick Davison LLP

(57) ABSTRACT

The inventive system and method address a long felt need for enhancing the efficiency of systems in the interactive conveyance industry for goods and services by providing for the filtering, selection and securing of conveyance services in accordance with one or more of client and representative preferences in substantially real time.

28 Claims, 13 Drawing Sheets

Related U.S. Application Data

No. PCT/US2018/043363, filed on Jul. 24, 2018, and a continuation-in-part of application No. PCT/US2018/043359, filed on Jul. 24, 2018, and a continuation-in-part of application No. 16/038,487, filed on Jul. 18, 2018, and a continuation-in-part of application No. 15/680,439, filed on Aug. 18, 2017, which is a division of application No. 15/675,757, filed on Aug. 13, 2017.

(60) Provisional application No. 62/539,706, filed on Aug. 1, 2017, provisional application No. 62/482,306, filed on Apr. 6, 2017, provisional application No. 62/426,549, filed on Nov. 27, 2016, provisional application No. 62/375,491, filed on Aug. 16, 2016.

(51) Int. Cl.

| | | |
|---|---|---|
| *G08G 1/127* | (2006.01) | |
| *G01C 21/34* | (2006.01) | |
| *G06Q 30/06* | (2012.01) | |
| *G06F 16/2457* | (2019.01) | |
| *H04W 4/42* | (2018.01) | |
| *G08G 1/00* | (2006.01) | |
| *G06Q 10/02* | (2012.01) | |
| *G06Q 50/30* | (2012.01) | |
| *G06F 16/248* | (2019.01) | |
| *G06Q 10/08* | (2012.01) | |
| *G08G 1/005* | (2006.01) | |
| *G08G 5/00* | (2006.01) | |
| *H04W 4/20* | (2018.01) | |
| *G06Q 50/32* | (2012.01) | |
| *G06F 3/0485* | (2013.01) | |

(52) U.S. Cl.
CPC ....... *G06F 16/24578* (2019.01); *G06Q 10/02* (2013.01); *G06Q 10/06316* (2013.01); *G06Q 10/063112* (2013.01); *G06Q 30/0629* (2013.01); *G06Q 30/0633* (2013.01); *G06Q 30/0635* (2013.01); *G08G 1/005* (2013.01); *G08G 1/127* (2013.01); *G08G 1/202* (2013.01); *G08G 5/0043* (2013.01); *G08G 5/0069* (2013.01); *H04W 4/029* (2018.02); *H04W 4/20* (2013.01); *H04W 4/42* (2018.02); *G01C 21/34* (2013.01); *G06F 3/0485* (2013.01); *G06F 16/248* (2019.01); *G06Q 10/0833* (2013.01); *G06Q 50/30* (2013.01); *G06Q 50/32* (2013.01)

(56) References Cited

U.S. PATENT DOCUMENTS

| | | |
|---|---|---|
| 9,552,564 B1 | 1/2017 | Martenis |
| 9,562,785 B1 | 2/2017 | Racah et al. |
| 10,093,252 B2 | 10/2018 | Zych |
| 10,628,758 B2 | 4/2020 | Ikeda et al. |
| 2001/0056396 A1 | 12/2001 | Goino |
| 2004/0143466 A1 | 7/2004 | Smith et al. |
| 2004/0260470 A1* | 12/2004 | Rast .............. G06Q 10/06 701/300 |
| 2006/0136254 A1 | 6/2006 | Greenstein |
| 2009/0234564 A1* | 9/2009 | Onishi ............ G06Q 10/02 705/5 |
| 2009/0248587 A1 | 10/2009 | Van Buskirk |
| 2010/0017237 A1* | 1/2010 | Dalesandro ........ G06Q 10/02 705/5 |
| 2010/0312591 A1 | 12/2010 | Wu |
| 2011/0040655 A1 | 2/2011 | Hendrickson |
| 2011/0055046 A1 | 3/2011 | Bowen et al. |
| 2011/0137666 A1* | 6/2011 | Zuida ................. G06Q 30/02 705/1.1 |
| 2011/0153629 A1 | 6/2011 | Lehmann et al. |
| 2012/0130627 A1 | 5/2012 | Islam et al. |
| 2013/0041696 A1 | 2/2013 | Richard |
| 2013/0132140 A1 | 5/2013 | Amin et al. |
| 2014/0026065 A1 | 1/2014 | Wang |
| 2014/0039784 A1 | 2/2014 | Millspaugh |
| 2014/0067488 A1 | 3/2014 | James et al. |
| 2014/0067491 A1* | 3/2014 | James ................ G06Q 50/30 705/13 |
| 2014/0172727 A1 | 6/2014 | Abhyanker et al. |
| 2014/0229258 A1 | 8/2014 | Seriani |
| 2014/0278802 A1 | 9/2014 | Macpherson |
| 2014/0309876 A1 | 10/2014 | Ricci |
| 2014/0365268 A1 | 12/2014 | Masterlark |
| 2015/0039365 A1 | 2/2015 | Haque |
| 2015/0185034 A1 | 7/2015 | Abhyanker |
| 2015/0206267 A1* | 7/2015 | Khanna ............ G06Q 30/0284 705/5 |
| 2015/0294566 A1 | 10/2015 | Huang et al. |
| 2015/0339928 A1 | 11/2015 | Ramanujam |
| 2015/0356501 A1 | 12/2015 | Gorjestani et al. |
| 2015/0379437 A1 | 12/2015 | Reich |
| 2016/0019496 A1 | 1/2016 | Gorlin |
| 2016/0055605 A1* | 2/2016 | Kim ................ G06Q 50/30 701/465 |
| 2016/0055743 A1 | 2/2016 | Raj |
| 2016/0104110 A1 | 4/2016 | Jones et al. |
| 2016/0171574 A1 | 6/2016 | Paulucci et al. |
| 2016/0244311 A1* | 8/2016 | Burks .............. G06Q 30/0635 |
| 2016/0293012 A1 | 10/2016 | Lubeck et al. |
| 2016/0334797 A1 | 11/2016 | Ross et al. |
| 2016/0364812 A1 | 12/2016 | Cao |
| 2017/0011324 A1 | 1/2017 | Truong et al. |
| 2017/0059336 A1 | 3/2017 | Huang et al. |
| 2017/0083957 A1 | 3/2017 | Ross et al. |
| 2017/0098224 A1 | 4/2017 | Marco et al. |
| 2017/0124205 A1 | 5/2017 | Shaam et al. |
| 2017/0132934 A1 | 5/2017 | Kentley et al. |
| 2017/0141873 A1 | 5/2017 | Mandeville-Clarke et al. |
| 2017/0147959 A1 | 5/2017 | Sweeney et al. |
| 2017/0178085 A1 | 6/2017 | Kragh et al. |
| 2017/0316387 A1* | 11/2017 | Joshi ................ G06Q 10/1097 |
| 2017/0372703 A1 | 12/2017 | Sung et al. |
| 2018/0024554 A1 | 1/2018 | Brady et al. |
| 2018/0025407 A1* | 1/2018 | Zhang ............ G06Q 30/0635 705/26.81 |
| 2018/0032928 A1 | 2/2018 | Li et al. |
| 2018/0033058 A1 | 2/2018 | Mukherjee et al. |
| 2018/0053136 A1 | 2/2018 | DaCosta et al. |
| 2020/0211142 A1 | 7/2020 | James et al. |

OTHER PUBLICATIONS

Anonymous: "Heat map—Wikipedia", Oct. 16, 2014 (Oct. 16, 2014), XP055424374, Retrieved from the Internet: URL: http://web.archive.org/web/20141016035026/https://fr.wikipedia.org/wiki/Heat_map[retrieved on Nov. 13, 2017].

EP18841983.2 Extended European Search Report and Search Opinion, dated Apr. 8, 2021, 18 pages.

\* cited by examiner

INTERACTIVE REAL TIME SYSTEM AND REAL TIME METHOD OF USE THEREOF IN CONVEYANCE INDUSTRY SEGMENTS

RELATED APPLICATIONS

This application is a continuation of U.S. application Ser. No. 16/222,817, filed Dec. 17, 2018, which is a continuation-in-part of PCT Application No. PCT/US18/043363, filed Jul. 24, 2018, and is a continuation-in-part of PCT Application No. PCT/US18/043359, filed Jul. 24, 2018, and is a continuation-in-part of U.S. application Ser. No. 16/038,487, filed Jul. 18, 2018, which is a continuation-in-part of U.S. application Ser. No. 15/680,439, filed Aug. 18, 2017, which is a divisional application of U.S. application Ser. No. 15/675,757, filed Aug. 13, 2017, which claims benefit of the priority of each of U.S. Provisional Application No. 62/539,706, filed Aug. 1, 2017, U.S. Provisional Application No. 62/482,306, filed Apr. 6, 2017, U.S. Provisional Application No. 62/426,549, filed Nov. 27, 2016, and U.S. Provisional Application No. 62/375,491 filed Aug. 16, 2016, each of which is incorporated herein by reference in its entirety.

TECHNICAL FIELD

The present invention relates generally to the fields of interactive real time systems and real time methods of use in the conveyance industry segments.

BACKGROUND

As in any new industry or industry segment, when created, there are typically multiple inefficiencies in the related systems and methods due to there not being enough data or knowledge on how to optimize these systems and methods ahead of time. These inefficiencies are typically identified over time through trial and error, which leads to technological advancement in the field. The same can be said about the conveyance industry and many of the new conveyance industry segments such as the ride-hail industry segment, rideshare industry segment, good delivery industry segment, and courier industry segment.

The current inefficient systems and methods available in the conveyance industry segments lead to disadvantages for conveyance clients. The companies or entities themselves, hereinafter referred to as service providers, as well as the representatives carrying out the services for the service providers, are disadvantaged also.

The problems relating to the current systems and methods used in the conveyance industry segments are rooted in computer technology and tied to the fact that the modern conveyance industry segments operate and change drastically in real time or near real time. Conveyance industry segments are real time or near real time environments in that conveyance service requests and conveyance service offerings are available one second and gone the next second. In the real time or near real time conveyance industry segments, neither a representative nor a conveyance client can procure all or most of the real time or near real time information and analyze or evaluate this information accurately to make a well-informed decision on the fly. There is currently no real time or near real time system or real time or near real time method that can assist both a representative and a conveyance client with this type of analysis. This lack of a real time or near real time system or real time or near real time method leads to a representative securing or obtaining a suboptimal, one-size-fits-all conveyance service request and a conveyance client securing or obtaining a suboptimal, one-size-fits-all conveyance service offering due to the inability to apply their own preferences.

Currently, a conveyance client requesting a ride in the ride-hail industry segment, can have many different ride options, prices, wait times, and times to destination depending on which service provider a given conveyance service offering is from and when the conveyance service offering is secured or obtained. However, a conveyance client is given options of conveyance service offerings from only one service provider to accept or decline. A representative is limited even further as only one conveyance service request is shown when a representative wants to provide a conveyance service in any conveyance industry segment. Currently, there is a poor system and method to dispatch or assign representatives to conveyance service requests and conveyance service offerings to conveyance clients. Thus, there exists a need that the present invention addresses.

The existing systems and methods for a representative to analyze or evaluate incoming conveyance service requests are difficult and time consuming in the fast-paced, real time or near real time environment of conveyance industry segments. The current technology does not permit a representative to analyze or evaluate and then secure or obtain conveyance service requests that the representative would prefer based on their individual preferences. Representatives are currently given a single conveyance service request and only have the option to accept or decline that specific conveyance service request without an alternative. Generally, any details of a conveyance service request a representative is securing or obtaining are not provided ahead of time but are only revealed after that conveyance service request is secured or obtained. A representative must choose to either secure or obtain a conveyance service request without knowing any of the details of the conveyance service to be provided or choose not to work at all.

Furthermore, a representative is penalized for canceling a conveyance service request the representative does not wish to fulfill even though the representative likely never would have secured or obtained that conveyance service request in the first place had the representative been given a choice. This disadvantage among others, has led to the common practice of representatives working for more than one service provider at the same time to give the representatives some semblance of choice. However, that method of analyzing or evaluating is a very laborious and time-consuming process which is not useful or practical in the real time or near real time environment of conveyance industry segments.

To analyze or evaluate conveyance service requests, a representative would need to login to multiple applications from different service providers and navigate between these applications, viewing one individual conveyance service request per application. Analyzing or evaluating conveyance service requests in such a way takes a lot of time and can cause a representative to miss conveyance service requests in the real time or near real time environment that a representative would consider as preferred. Currently there is no system or method that a representative can use as a tool to analyze or evaluate conveyance service requests in real time or near real time.

A representative is currently not able to analyze or evaluate conveyance service requests from more than one service provider in real time or near real time given conventional systems and methods, which is a frustrating hindrance when every other aspect of the conveyance industry segments operate in real time or near real time. A representative's decision-making ability is limited given the current state of the art. With no way to analyze or evaluate conveyance service requests continuously in real time or near real time, a representative currently is not able to maximize their profit or work as efficiently as they would like, as the representative is forced to secure or obtain less preferred conveyance service requests. To secure or obtain a preferred conveyance service request, a representative may have to wait and pass up less preferred conveyance service requests for a more preferred conveyance service request to become available to them, as representatives are only provided one conveyance service request at a time. A representative wishing to work more efficiently is not able to do so given the current limitations of the systems and methods in the conveyance industry segments.

There is also currently no system or method to analyze or evaluate and secure or obtain conveyance service requests in real time or near real time across more than one conveyance industry segment. This lack of a real time or near real time system or real time or near real time method further limits a representative's exposure in the conveyance industry and their ability to operate more efficiently if the representative wants to provide conveyance services in more than one conveyance industry segment. In addition, current limitations also reduce the amount of potential preferred conveyance service requests available to a representative. Currently, if a representative wants to provide a ride in the ride-hail industry segment, then deliver food in the good delivery industry segment because that conveyance service request is in close proximity to them, a representative does not have the ability to analyze or evaluate and then secure or obtain these preferred conveyance service requests in real time or near real time. If there were a system and method for a representative to be able to do so, the representative would have access to a greater number of diverse conveyance service requests and gives the representative more flexibility in providing conveyance services within the conveyance industry. One aspect of the present invention solves this problem for representatives.

Currently, some service providers dynamically increase prices in certain areas for various reasons. Representatives looking to work more efficiently or earn more money try to work in these areas as much as possible. The problem is that by the time a representative gets to the area with elevated pricing, the increased pricing has either moved or been removed. Representatives experience the challenge of chasing the elevated pricing areas but generally do not have the chance to capitalize on them. As a result, some representatives have given up on chasing areas with elevated pricing. Currently there is no system or method a representative can use to predict where the areas of elevated pricing will be in order to maximize their earning potential.

Currently, representatives are assigned or provided with one conveyance service request at a time that can either be blindly accepted, without knowing any details, or rejected. This process is not a useful way of presenting conveyance service requests to representatives. Existing technology is lacking in a way to visually present preferred conveyance service requests from multiple service providers on a geographical map with dynamic icons being updated in real time or near real time. Currently there is no system or method to display to a representative a visually identifiable preferred conveyance service request relative to a less preferred conveyance service request.

Conveyance clients often endure similar problems or challenges as representatives. Currently when a conveyance client is looking to secure or obtain a conveyance service offering, the conveyance client is only shown the closest representatives from an individual service provider. The only way for conveyance clients to analyze or evaluate conveyance service offerings from different service providers is a very tedious and time-consuming process similar to that for representatives. First a conveyance client would have to know about a competitor, then download the competitor's application, and input the same search criteria for the first service provider. This process would have to be repeated for every other competitor a conveyance client wishes to evaluate.

In the fast-paced conveyance industry segments, where seconds can matter greatly in being able to secure or obtain a preferred conveyance service offering, current methods are not practical or useful to analyze or evaluate conveyance service offerings in real time or near real time. In most cases, by the time a conveyance client goes through the steps to analyze or evaluate even two or three service providers, the preferred conveyance service offering given a conveyance client's preferences is likely no longer available. As a result, a conveyance client often pays more or waits longer for a conveyance service than needed since there is currently no way to visually analyze or evaluate conveyance service offerings from multiple service providers in real time or near real time. Existing technology is lacking in a way to visually present preferred conveyance service offerings from multiple service providers on a geographical map with dynamic icons being updated in real time or near real time. An improved system and method are needed.

When service providers increase their pricing in certain areas, conveyance clients currently do not have a system or method to determine if there is an area close by which does not have elevated pricing. Currently, there is no way for a conveyance client to visually analyze or evaluate different areas on a geographical map to see pricing information for an individual service provider, let alone for multiple service providers. The downside of this lack in transparency is that conveyance clients do not have an opportunity to make an informed purchasing decision given their current limited options in the conveyance industry segments. One aspect of the present invention solves this problem for conveyance clients.

BRIEF SUMMARY

The present invention recognizes that there is a long felt need for more efficient systems in the interactive conveyance industry for goods and services.

A first aspect of the present invention generally relates to an interactive system in the conveyance and other industries.

A second aspect of the present invention generally relates to a method of use of the interactive system of the present invention.

DETAILED DESCRIPTION OF THE INVENTION

Figure 1:
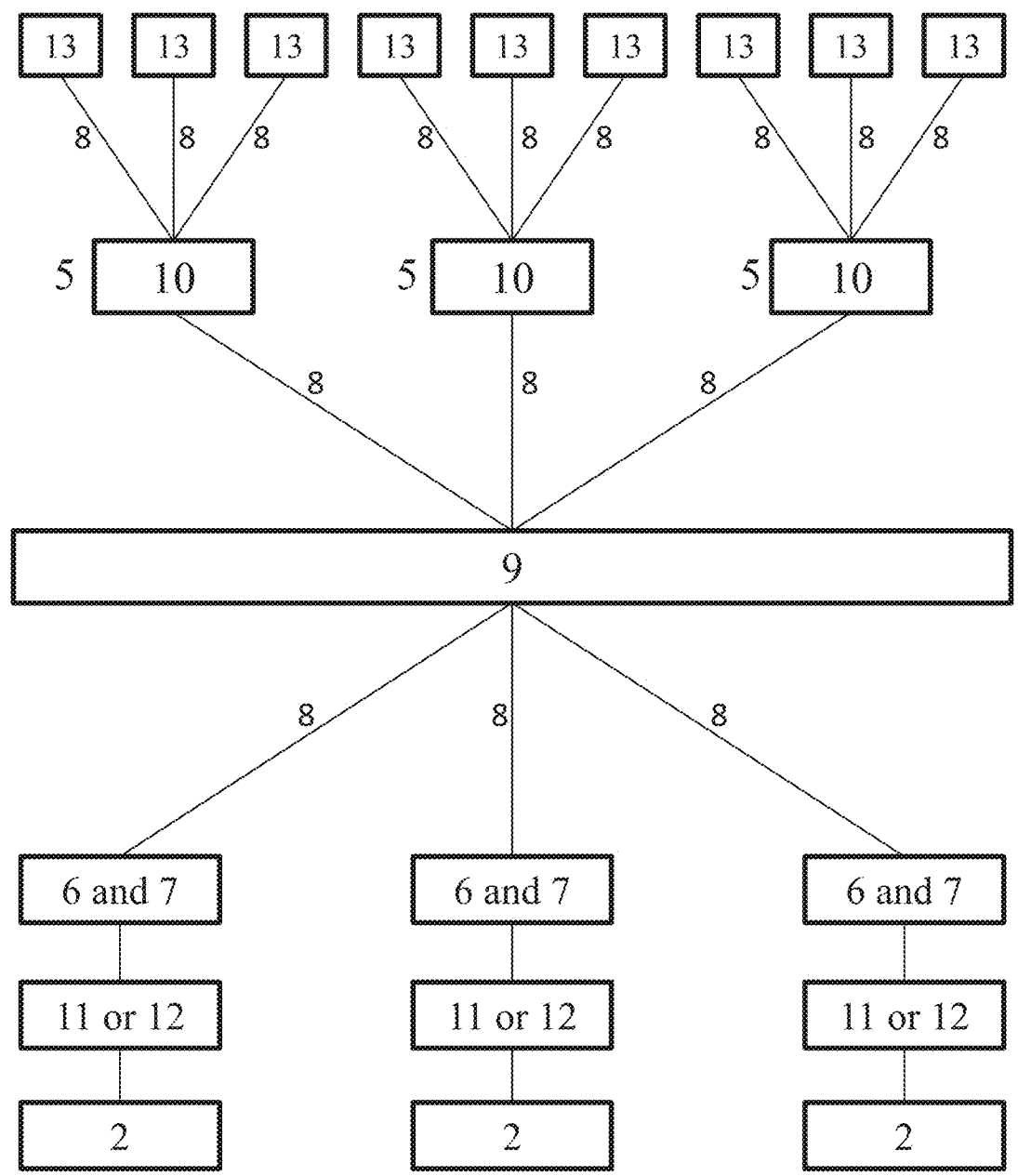
FIG. 1 is a high-level schematic of a conveyance system according to one embodiment of the present invention that utilizes representative preferences.

DEFINITIONS: Unless defined otherwise, all technical and scientific terms used herein have the same meaning as commonly understood by one of ordinary skill in the art to which this invention belongs. Generally, the nomenclature used herein and the procedures described below are well-known and commonly employed in the art. Where a term is provided in the singular, the inventors also contemplate the plural of that term, and where a term is provided in the plural, the inventors also contemplate the singular of that term. To provide a clarifying example, when an object is described, unless that object is expressly described as a single object, "one or more object", or "at least one object" also falls within the meaning of the term. Other technical terms used herein have their ordinary meaning in the art that they are used, as exemplified by a variety of technical dictionaries.

In an exemplary embodiment, the present invention includes several general and useful aspects, including an interactive system in the conveyance and other industries and a method of use of the interactive system of the present invention. In one aspect, the present invention can be a technology-based solution that can use a real time or near real time system, i.e., substantially real time, and a real time or near real time method to assist one or more representative in analyzing or evaluating and then securing or obtaining one or more preferred conveyance service request using a visual representation of the present invention.

The present invention can receive and filter conveyance service requests based on one or more representative preference and preferably one or more substantially real time geographical location of the representative(s). The present invention can identify one or more preferred conveyance service request from one or more filtered conveyance service request. A visual representation of a filtered conveyance service request with corresponding conveyance data, a preferred conveyance service request with corresponding conveyance data, or a combination thereof, can be compiled with a geographical map on an application. The present invention can provide a representative with a visual tool to help analyze or evaluate and then secure or obtain a preferred conveyance service request.

One example of a visual representation of the present invention can be a dynamic map. A dynamic map of the present invention can be a geographical map that can display one or more of a preferred conveyance service request with corresponding conveyance data, a filtered conveyance service request with corresponding conveyance data, or a combination thereof, from a service provider in real time or near real time. A dynamic map of the present invention can display the real time or near real time geographical location of a conveyance client, a beginning service geographical location, an ending service geographical location, pricing information, or a combination thereof. The representative can visually identify one or more preferred conveyance service request to make well informed decisions when analyzing or evaluating and then securing or obtaining a preferred conveyance service request. One differentiating improvement of a dynamic map of the present invention can be that a conveyance client, a service provider, a good supplier, a corresponding conveyance service request, or a combination thereof, can be displayed individually as a mobile transitory icon, a mobile transitory visual, or a mobile transitory symbol, and can be updated in real time or near real time.

A visual representation of the present invention can be a heat map. A heat map of the present invention can be a geographical map in which an area can be shaded, colored, patterned, or a combination thereof, in proportion to a measurement of one or more statistical variable being displayed on the geographical map to aid the representative when analyzing or evaluating a conveyance service request.

In some embodiments, the visual representation can be a predictive heat map, which is a variation that can be compiled from one or more statistical variable of a real time or near real time filtered conveyance service request, a past filtered conveyance service request, or a combination thereof. The predictive heat map can estimate a future supply, future demand, a future statistical variable, or a combination thereof. The predictive heat map can utilize machine learning technology.

In some embodiments, the visual representation can be a historical heat map, which can be a heat map compiled from one or more statistical variable of a past filtered conveyance service request. The historical heat map can show past supply, past demand, one or more past statistical variable, or a combination thereof.

The visual representation can be a combination of one or more dynamic map and one or more heat map. This combination map can allow a representative to view one or more service provider operating in a conveyance industry segment on both a macro and micro level.

One benefit of the present invention can be an improved technique of displaying information that can result in a new way of analyzing or evaluating a preferred conveyance service request by using a visual representation of the present invention. The improved technique relating to a dynamic map of the present invention can enable a representative to easily analyze or evaluate a visually identifiable preferred conveyance service request relative to a filtered conveyance service request. The representative can use a heat map to analyze or evaluate if a given geographical location is a good area to work in. One advantage can be that the representative can gain insight and know which conveyance service request is preferred to be secured or obtained because the visual representation can be updated continuously in real time or near real time. The improved technique can allow the representative to visually gain perspective of the real time or near real time environment in a conveyance industry segment, to identify a preferred conveyance service request.

Another benefit of the present invention can be a new technique to generate new data that can be useful to the representative. In one embodiment, a predictive heat map can transform a real time or near real time filtered conveyance service request, one or more past filtered conveyance service request, or a combination thereof, into a predictive heat map that the representative can analyze or evaluate to work more in line with their goals. The predictive heat map can provide one or more solution to a missed opportunity of chasing an area of elevated pricing. For example, a predictive heat map can provide the representative with new data for analysis or evaluation based on a real time or near real time filtered conveyance service request, one or more past filtered conveyance service request, or a combination thereof, and can utilize machine learning technology to predict future supply or future demand.

One benefit of the present invention can be the improved ability for the representative to interact with one or more of a conveyance client, a good supplier, a service provider, or a combination thereof, due to increased insight or knowledge relating to the conveyance industry segment. The present invention can be a tool for presenting one or more preferred conveyance service request, one or more filtered conveyance service request, conveyance data, or a combination thereof, to be analyzed or evaluated by the representative.

One benefit of the present invention can improve the representative's decision-making ability, allowing the representative to use one or more representative preference, and can improve the ability for the representative to secure or obtain the most preferred conveyance service request available at that time.

One aspect of the present invention can be a technology-based solution that can use a real time or near real time system and method to assist a conveyance client in the process of analyzing or evaluating and then securing or obtaining a preferred conveyance service offering using a visual representation.

The present invention can receive and filter one or more conveyance service offering based on a conveyance client preference and preferably the real time or near real time geographical location of the conveyance client. The present invention can identify a preferred conveyance service offering from a filtered conveyance service offering. A visual representation of a filtered conveyance service offering with corresponding conveyance data, a preferred conveyance service offering with corresponding conveyance data, or a combination thereof, can be compiled with a geographical map on an application. The present invention can provide a conveyance client with a visual tool to help analyze or evaluate and then secure or obtain a preferred conveyance service offering.

One example of a visual representation can be a dynamic map, which can be a geographical map that can display, among other information, one or more preferred conveyance service offering with corresponding conveyance data, a filtered conveyance service offering with corresponding conveyance data, or a combination thereof, from a service provider in real time or near real time. The dynamic map can display one or more of a real time or near real time geographical location of the representative, a beginning service geographical location, an ending service geographical location, pricing information, or a combination thereof. The conveyance client can visually identify a preferred conveyance service offering to make a well-informed decision when analyzing or evaluating and then securing or obtaining a preferred conveyance service offering. One differentiating improvement of the dynamic map can be that a representative, a service provider, a good supplier, a corresponding conveyance service offering, or a combination thereof, can be displayed individually as a mobile transitory icon, a mobile transitory visual or a mobile transitory symbol, and can be updated in real time or near real time.

In some embodiments, the visual representation can be a heat map, which can be a geographical map in which an area can be shaded, colored, patterned, or a combination thereof, in proportion to a measurement of one or more statistical variable being displayed on the geographical map to aid the conveyance client when analyzing or evaluating a conveyance service offering.

One variation of a heat map can be a predictive heat map that can be compiled from one or more statistical variable of real time or near real time filtered conveyance service offering, a past filtered conveyance service offering, or a combination thereof. The predictive heat map can estimate one or more of future supply, future demand, a future statistical variable, or a combination thereof. The predictive heat map can utilize machine learning technology.

Another variation of a heat map can be a historical heat map, which can be compiled from one or more statistical variable of past filtered conveyance service offering(s). A historical heat map can show past supply, past demand, one or more statistical variable, or a combination thereof.

The visual representation can be a combination of one or more dynamic map and heat map, which can allow a conveyance client to view one or more service provider operating in a conveyance industry segment on both a macro and micro level.

One benefit of the present invention can be an improved technique of displaying information that can result in a new way of analyzing or evaluating a preferred conveyance service offering by using a visual representation. An improved technique relating to a dynamic map, can enable a conveyance client to easily analyze or evaluate a visually identifiable preferred conveyance service offering relative to a filtered conveyance service offering. A conveyance client can use a heat map to analyze or evaluate if a conveyance client is in an area of elevated pricing. One advantage can be that a conveyance client can gain insight and know which of one or more conveyance service offering is preferred to be secured or obtained because a visual representation can be updated continuously in real time or near real time. The improved technique can allow a conveyance client to visually gain perspective of a real time or near real time environment in a conveyance industry segment, to identify a preferred conveyance service offering.

Another benefit of the present invention can be a new technique to generate new data that can be useful to a conveyance client. In one example, a real time or near real time filtered conveyance service offering, a past filtered conveyance service offering, or a combination thereof, can be transformed into a predictive heat map that the conveyance client can analyze or evaluate to help identify and a future preferred conveyance service offering. The predictive heat map can provide a solution to the problem of paying more for a similar conveyance service. One embodiment of a predictive heat map can provide at the conveyance client with new data for analysis or evaluation based on a real time or near real time filtered conveyance service offering, a past filtered conveyance service offering, or a combination thereof, and can utilize machine learning technology to predict future supply or future demand.

One benefit of the present invention can be an improved ability for a conveyance client to interact with one or more of a representative, a good supplier, a service provider, or a combination thereof, due to increased insight or knowledge relating to a conveyance industry segment. The present invention can be a tool for presenting one or more of a preferred conveyance service offering, a filtered conveyance service offering, conveyance data, or a combination thereof, to be analyzed or evaluated by the conveyance client.

Another benefit of the present invention can enhance the conveyance client's decision-making ability, allowing the conveyance client to use one or more conveyance client preference, and can improve the ability for the conveyance client to secure or obtain a most preferred conveyance service offering available at that time.

One benefit of the present invention can be that a visual representation of the present invention can provide more knowledge or information to a representative about an analysis or trend based on one or more metric, a representative preference, or a combination thereof, inputted or provided by the representative to help analyze or evaluate and preferably secure or obtain a preferred conveyance service request. The visual representation can be a tool to present real time information or data, near real time information or data, historical information or data, predictive information or data, or a combination thereof, that can assist the representative when analyzing or evaluating a conveyance service request and can provide more transparency.

One benefit of the present invention can be that a representative can have more control or flexibility when analyzing or evaluating and then securing or obtaining a preferred conveyance service request. The representative can set one or more parameter or a representative preference on how and where the representative wants to work, thus providing more control or flexibility for the representative.

One benefit of the present invention can be that a visual representation can provide more knowledge or information to a conveyance client about an analysis or trend based on one or more metric, a conveyance client preference, or a combination thereof, inputted or provided by the conveyance client to help analyze or evaluate and preferably secure or obtain a preferred conveyance service offering. The visual representation can be a tool that can present real time information or data, near real time information or data, historical information or data, predictive information or data, or a combination thereof, that can assist the conveyance client when analyzing or evaluating a conveyance service offering and can provide more transparency. Increased knowledge or information can be amplified for the conveyance client when travelling outside of the conveyance client's hometown. The conveyance client may not have the same local knowledge or information of a different area as a person from that area has. The present invention can provide the conveyance client with pricing information from a service provider, which can aid in balancing supply and demand. The present invention can provide more price transparency, thus improving knowledge or information for the conveyance client.

One benefit of the present invention for a representative can be that a method of analyzing or evaluating and then securing or obtaining a conveyance service request can now be accomplished in real time or near real time. By utilizing a system and method that can operate in real time or near real time, quantum computing, machine learning technology, or a combination thereof, can be incorporated to further improve analysis or evaluation for a representative to secure or obtain one or more preferred conveyance service request.

One benefit of the present invention for a conveyance client can be that a method of analyzing or evaluating and then securing or obtaining a preferred conveyance service offering can now be accomplished in real time or near real time. By utilizing a system and method that can operate in real time or near real time, quantum computing, machine learning technology, or a combination thereof, can be incorporated to further improve analysis or evaluation for a conveyance client to secure or obtain a preferred conveyance service offering.

One benefit of the present invention can be a larger number of conveyance service requests available to be analyzed or evaluated by a representative. The larger number of conveyance service request that the representative has exposure to, the greater the chance of identifying a preferred conveyance service request to secure or obtain given the representative's preference.

One benefit of the present invention can be a larger number of conveyance service offerings available to be analyzed or evaluated by a conveyance client. The larger number of conveyance service offerings that the conveyance client has exposure to, the greater the chance of identifying one or more preferred conveyance service offering to secure or obtain given a conveyance client preference.

One benefit of the present invention can be that the representative can now input or provide one or more representative preference to filter conveyance service requests into one or more filtered conveyance service request and identify a preferred conveyance service request from the filtered conveyance service request. The representative can analyze or evaluate a conveyance service request more efficiently due to the improved process by using a representative preference to identify and preferably secure or obtain a preferred conveyance service request. The improved process can allow the representative to work more efficiently and spend less time on identifying and securing or obtaining a preferred conveyance service request and more time on providing a conveyance service.

One benefit of the present invention can be that a conveyance client can now input or provide one or more conveyance client preference to filter the conveyance service offerings into one or more filtered conveyance service offering and identify a preferred conveyance service offering from the filtered conveyance service offering. The conveyance client can analyze or evaluate the conveyance service offerings more efficiently due to the improved process by using a conveyance client preference to identify and preferably secure or obtain a preferred conveyance service offering.

One benefit of the present invention can be that a representative can increase their earning potential when securing or obtaining a preferred conveyance service request relating to a representative preference. The present invention can provide the ability for the representative to input or provide one or more representative preference to identify and preferably secure or obtain a preferred conveyance service request. The improved process can allow the representative to secure or obtain only a preferred conveyance service request that can increase the representative's earning potential over a given period of time when using an elevated pricing preference. The representative may only want to provide a shorter distance conveyance service to stay within a given area when using an elevated pricing preference to increase earning potential. The representative can increase earning potential for every conveyance service provided within an area of elevated pricing rather than the representative performing a similar conveyance service outside of the area of elevated pricing.

One benefit of the present invention can be that a conveyance client can save money when securing or obtaining a preferred conveyance service offering relating to one or more conveyance client preference. The present invention can provide the ability for the conveyance client to input or provide the conveyance client preference(s) to identify and preferably secure or obtain preferred conveyance service offering(s). The improved process can allow the conveyance client to secure or obtain only preferred conveyance service offerings that can save the conveyance client from paying more money for a similar conveyance service when using a pricing preference. The conveyance client can use a heat map of the present invention to determine an area of elevated pricing around a real time or near real time geographical location of a conveyance client. If the conveyance client is in an area of elevated pricing, the conveyance client can visually determine a potential nearby area that does not have elevated pricing. The conveyance client can then have the option of walking to an area that does not have elevated pricing to request a conveyance service. As a result, the conveyance client can now pay much less for a similar conveyance service.

One benefit of the present invention can be the ability of a representative to operate or provide a conveyance service in multiple conveyance industry segments. Currently, a service provider does not have the ability to enable a representative to operate in an additional conveyance industry segment at the same time. The present invention can allow the representative to operate initially in one conveyance industry segment, then perform a conveyance service in a different conveyance industry segment, and then go back to operate in the first conveyance industry segment. The present invention can seamlessly allow the representative to transfer between different conveyance industry segments based on the representative preference.

One benefit of the present invention can be the ability of the conveyance client to analyze or evaluate and then secure or obtain a preferred conveyance service offering in a conveyance industry segment.

One benefit of the present invention can be that value can be added to the conveyance industry as a whole. The representative and service provider can benefit from the present invention by increasing satisfaction of the representative and allowing the representative to identify and perform a preferred conveyance service based on one or more representative preference. The conveyance client can benefit from the present invention through shorter wait times, higher quality of conveyance service, more price transparency, or a combination thereof. Together, the present invention can improve an existing system and method by adapting to the real time or near real time environment to enhance the conveyance industry segment for the better for all involved.

The following examples describe non-limiting embodiments and applications of the inventive system and method:

Example 1: Representative Maps

A first aspect of the present invention includes a real time or near real time system to assist a representative in the process of securing or obtaining a preferred conveyance service request relating to a representative preference and a real time or near real time geographical location of the representative by using a visual representation.

Figure 2:
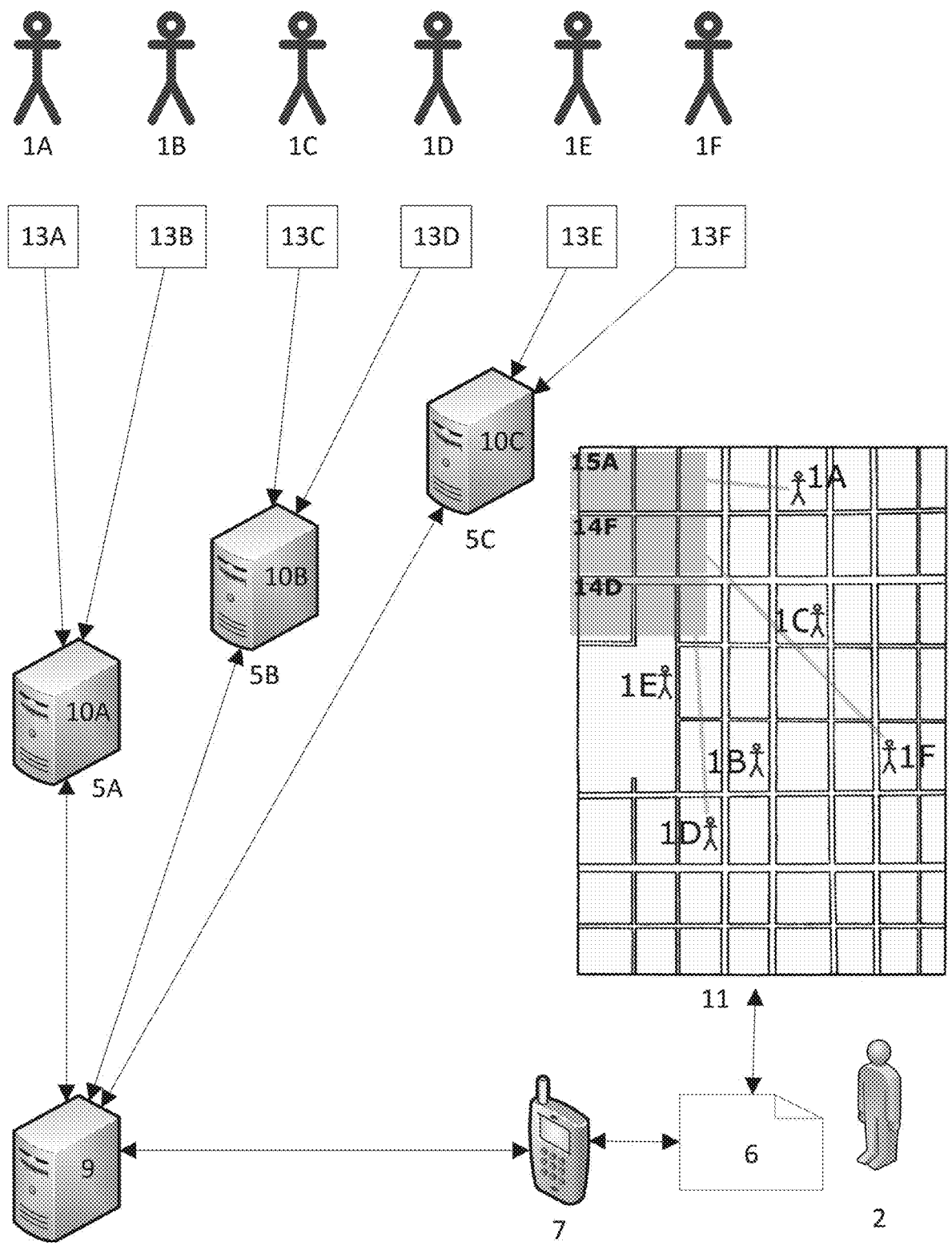
FIG. 2 is a high-level diagram of a conveyance service system according to an embodiment of the present invention that utilizes representative preferences.

FIGS. 1 and 2 provide high-level diagrams of an exemplary embodiment of the inventive system that can be of benefit to a representative operating in on or more conveyance industry segment. As shown in FIG. 1, conveyance service requests 13 can be sourced from an external server 10 and can be transmitted to a central server 9 by way of a link 8. A service provider 5 can be associated with an external server 10. Each service provider 5 is associated with one external server 10. A central server 9 can filter conveyance service requests 13 into filtered conveyance service requests 14 by using a representative preference 3 and preferably the real time or near real time geographical location of the representative 2. A central server 9 can calculate the weighted average of the representative preference 3. A central server 9 can preferably sort the filtered conveyance service requests 14 in an order relating to the corresponding weighted averages to identify a preferred conveyance service request 15. A preferred conveyance service request 15 can be identified by a central server 9 from the filtered conveyance service requests 14 that has the highest weighted average. A preferred conveyance service request 15 with corresponding conveyance data and filtered conveyance service requests 14 with corresponding conveyance data can be transmitted from a central server 9 to an application 6 by way of a link 8. The application 6 can operate on a terminal 7 and can display a visual representation such a dynamic map 11 or a heat map 12, or a combination thereof. The representative 2 can analyze or evaluate the visual representation and then secure or obtain a preferred conveyance service request 15. A link 8 can be a connection or an association with a software function or a software component relating to an application 6, a terminal 7, a central server 9, an external server 10, or a combination thereof.

Referring to FIG. 2, an individual conveyance service request 13 can be submitted by each individual conveyance client 1A, 1B, 1C, 1D, 1E, and 1F. An individual conveyance service request 13 corresponds with each individual conveyance client 1 in the figure. Conveyance service requests 13A and 13B are submitted by conveyance clients 1A and 1B to external server 10A associated with service provider 5A. Conveyance service requests 13C and 13D are submitted by conveyance clients 1C and 1D to external server 10B associated with service provider 5B. Conveyance service requests 13E and 13F are submitted by conveyance clients 1E and 1F to external server 10C associated with service provider 5C. Each service provider 5 can have one or more external server 10.

Central server 9 can receive conveyance service requests 13 and then filter the conveyance service requests 13 into filtered conveyance service requests 14 by comparing to, for example, the two representative preferences 3 and preferably the real time or near real time geographical location of a representative 2. Conveyance service requests 13 that match the indicated two representative preferences 3 can be identified as filtered conveyance service requests 14. Conveyance service requests 13 that do not match the indicated two representative preferences 3 can be discarded or ignored as not being filtered conveyance service requests 14. Filtered conveyance service requests 14 can preferably be sorted by a weighted average of the two representative preferences 3 to identify a preferred conveyance service request 15. Representative preferences 3 can be assigned equal weights of 50% when calculating a weighted average. Representative preferences 3 chosen by a representative 2 can optionally be given unequal weights, e.g., 60% and 40% respectively. A representative 2 can optionally choose for representative preferences 3 to have equal or unequal weights.

Preferably, a filtered conveyance service request 14 with the highest weighted average can be identified as a preferred conveyance service request 15. Central server 9 can identify a preferred conveyance service request 15 from filtered conveyance service requests 14 by preferably using the highest weighted average of the pricing preference and service duration preference. Preferably, additional conveyance service requests 13 can be received and continuously filtered by a central server 9 into additional filtered conveyance service requests 14. Preferably, additional filtered conveyance service requests 14 can be sorted by a central server 9 into preferred conveyance service requests 15.

Filtered conveyance service requests 14 and a preferred conveyance service request 15 can be transmitted from a central server 9 to an application 6 by way of a link 8. An application 6 can then compile a dynamic map 11 of filtered conveyance service requests 14 and a preferred conveyance service request 15 based on a representative's 2 preferences. A dynamic map 11 can be compiled on an application 6 by combining a geographical map relating to the real time or near real time geographical location of a representative 2 with filtered conveyance service requests 14 and a preferred conveyance service request 15. Filtered conveyance service requests 14 and a preferred conveyance service request 15 can be positioned on a dynamic map 11 relating to corresponding geographical locations contained therein.

A preferred conveyance service request 15 can be displayed on a dynamic map 11 as a visually distinguishable icon compared to filtered conveyance service requests 14. A dynamic map 11 can preferably be refreshed continuously in real time or near real time with updated filtered conveyance service requests 14 and a preferred conveyance service request 15.

A representative 2 can then preferably visually analyze or evaluate a dynamic map 11 prior to securing or obtaining a filtered conveyance service request 14 or a preferred conveyance service request 15. For example, in order to find another filtered conveyance service request 14 or another preferred conveyance service request 15, a representative 2 can update a representative preference 3. In this example, a representative 2 chooses to secure or obtain a preferred conveyance service request 15 identified by a central server 9. A representative 2 can then preferably perform a conveyance service. An application 6, a central server 9, an external server 10, a terminal 7, a link 8, or a combination thereof, can be combined or integrated. A representative 2 can utilize a visual representation that can display a dynamic map 11 on a terminal 7 that can be integrated or associated with an application 6, a central server 9, an external server 10, a link 8, or a combination thereof. The representative uses the application to analyze or evaluate the visual representation and then secure or obtain the preferred conveyance service request.

The external server(s) are real time or near real time sources of all or some of the conveyance service requests transmitted in real time or near real time from the external server to the central server by way of a link. All or some of the plurality of conveyance service requests are updated in real time or near real time. The central server standardizes, aggregates, or a combination thereof, in real time or near real time, all or some of the plurality of conveyance service requests and further filters in real time or near real time, all or some of the plurality of conveyance service requests by using the representative preference and the real time or near real time geographical location of the representative, to identify all or some of the plurality of filtered conveyance service requests. All or some of the plurality of filtered conveyance service requests are updated in real time or near real time. The central server further identifies in real time or near real time, the preferred conveyance service request from all or some of the plurality of filtered conveyance service requests relating to the representative preference. The preferred conveyance service request may be updated in real time or near real time. The central server further transmits in real time or near real time, all or some of the plurality of filtered conveyance service requests, the preferred conveyance service request, the representative preference, or a combination thereof, to the application by way of a link between the central server and the application. The terminal facilitates or provides an input function, a display function, and operation of the application and is used by the representative to interface with the application. The terminal, the application, the central server, the external server, a link, or a combination thereof, may be combined or integrated, and one or more function of the central server may be performed by the application. The application may compile in real time or near real time, the visual representation of all or some of the plurality of filtered conveyance service requests, the preferred conveyance service request, the representative preference, or a combination thereof. The application displays the visual representation updated in real time or near real time. The representative may use the application to analyze or evaluate the visual representation and then secure or obtain the preferred conveyance service request and perform the conveyance service.

In a further embodiment of the present invention, where all or some of the plurality of conveyance service requests, the real time or near real time geographical location of the representative, or a combination thereof, are structured in a different format, the central server standardizes or converts them into a uniform format.

An additional embodiment of the present invention includes, wherein all or some of the plurality of conveyance service requests are structured in a uniform format prior to being transmitted from the external server to the central server by way of a link between the external server and the central server and are not standardized.

In some embodiments, all or some of the plurality of conveyance service requests are sourced or provided by one or more service providers or goods suppliers operating in a conveyance industry segment.

In another embodiment, conveyance service requests may include one or more, or a combination of requests for a ride-hail service, a ride-share service, a car-share service, a peer-to-peer conveyance service, a transportation service, a scooter service, a bicycle service, a person delivery service, a taxi service, a shuttle service, a good delivery service, an item delivery service, a medical service and delivery, a food delivery service, a courier delivery service, a freight delivery service, an animal delivery service, a delivery service, or a combination thereof.

In a further embodiment of the present invention the plurality of conveyance service requests may be a single conveyance service request.

Conveyance data may include one or a combination of beginning service geographical location(s), ending service geographical location(s), pricing information, elevated pricing information, a representative preference, a conveyance client preference, a distance parameter, an estimated time of arrival, a time to destination, a conveyance client geographical location, a conveyance client review, a conveyance client rating, a conveyance client detail, conveyance service detail(s), conveyance service route, a preferred conveyance client, sensor data, a representative's geographical location, representative review(s) or rating(s), representative detail(s), autonomous vehicle geographical location, an autonomous vehicle review or rating, autonomous vehicle detail(s), a preferred autonomous vehicle, a route planning preference, a fuel economy preference, a battery longevity preference, a vehicle capacity preference, a vehicle diagnostic preference, a conveyance data preference, a service provider geographical location, a service provider review, a service provider rating, a service provider detail, a preferred service provider, a good supplier geographical location, a good supplier review, a good supplier rating, a good supplier detail, a preferred good supplier, an owner or controller of an autonomous vehicle geographical location, a review or rating of an owner or controller of an autonomous vehicle, a detail about an owner or controller of an autonomous vehicle, a preferred owner or controller of an autonomous vehicle, a fleet manager geographical location, a fleet manager review, a fleet manager rating, a fleet manager detail, a preferred fleet manager, a logistics provider geographical location, a logistics provider review, a logistics provider rating, a logistics provider detail, a preferred logistics provider, a logistics supplier geographical location, a logistics supplier review, a logistics supplier rating, a logistics supplier detail, a preferred logistics supplier, a conveyance industry segment detail, a preferred conveyance industry segment, a good detail, an item detail, a type of vehicle detail, a vehicle detail, a measurement of one or more statistical variable, a level of service detail, a fuel consumption, a battery level, a vehicle diagnostic, a vehicle capacity, or a combination thereof.

In some embodiments of the present invention, all or some of the plurality of conveyance service requests are filtered relating to the representative preference and the real time or near real time geographical location of the representative, to identify all or some of the plurality of filtered conveyance service requests by one or more of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

Another embodiment of the present invention includes, wherein the preferred conveyance service request is identified from all or some of the plurality of filtered conveyance service requests relating to a weighted average of the representative preference.

In a further embodiment, a different geographical location is used other than the real time or near real time geographical location of the representative when filtering all or some of the plurality of conveyance service requests. In some embodiments, the plurality of filtered conveyance service requests may be single filtered conveyance service request.

The following provides additional details, illustrative examples and embodiments within the system for generating representative maps:

In an embodiment of the present invention, the visual representation is compiled on the central server and transmitted to the application by way of a link between the central server and the application. The visual representation may include one or more of a dynamic map and a heat map, or a combination thereof. The representative may use the visual representation to secure or obtain the preferred conveyance service request in real time or near real time, related to the representative preference, the real time or near real time geographical location of the representative, or a combination thereof.

In another embodiment, the representative preference is displayed as one or more icon or visual with or on the visual representation, to allow the representative to analyze or evaluate all or some of the plurality of filtered conveyance service requests, the preferred conveyance service request, or a combination thereof, and secure or obtain the preferred conveyance service request relating to a service provider or a good supplier operating in a conveyance industry segment.

In another embodiment, the preferred conveyance service request, the representative preference, or a combination thereof, is displayed in a visually identifiable format compared to all or some of the plurality of filtered conveyance service requests relating to a service provider or a good supplier operating in a conveyance industry segment.

In an additional embodiment the dynamic map may include a geographical map that displays in real time or near real time, all or some of the plurality of filtered conveyance service requests, the preferred conveyance service request, the representative preference, or a combination thereof.

All or some of the plurality of filtered conveyance service requests, the preferred conveyance service request, the representative preference, or a combination thereof, relating to a service provider or a good supplier operating in a conveyance industry segment, may be displayed individually as a mobile or transitory icon or a mobile or transitory visual and updates or changes in real time or near real time.

Further, all or some of the plurality of filtered conveyance service requests, the preferred conveyance service request, the representative preference, or a combination thereof, relating to an individual service provider or an individual good supplier operating in a conveyance industry segment, may be displayed as a distinguishable icon or a distinguishable visual and updates or changes in real time or near real time.

All or some of the plurality of filtered conveyance service requests, the preferred conveyance service request, the representative preference, or a combination thereof, relating to an individual service provider or an individual good supplier operating in a conveyance industry segment, may be displayed as an icon or visual and updates or changes in real time or near real time.

In another embodiment all or some of the filtered conveyance service requests, the preferred conveyance service request, the representative preference, or a combination thereof, relating to an individual service provider or an individual good supplier may be displayed as or with a different icon, a different symbol, a different color, a different shading, a different pattern, a different visual, or a combination thereof.

All or some of the filtered conveyance service requests, the preferred conveyance service request, the representative preference, or a combination thereof, relating to an individual service provider or an individual good supplier is displayed as or with a similar icon, a similar symbol, a similar color, a similar shading, a similar pattern, a similar visual, or a combination thereof.

In some embodiments, the representative updates, modifies, or changes the representative preference and the dynamic map displays in real time or near real time, all or some of the plurality of filtered conveyance service requests, the preferred conveyance service request, the representative preference, or a combination thereof, based on the updated, modified, or changed the representative preference.

In a further embodiment, the heat map includes the geographical map that displays a visual depiction of a statistical variable of all or some of the conveyance service requests; all or some of the plurality of filtered conveyance service requests; all or some of the preferred conveyance service requests; the representative preference; or a combination thereof.

The statistical variable may include one or more of measurement of conveyance service availability, pricing, elevated pricing, conveyance service request density, filtered conveyance service request density, preferred conveyance service request density, level of service density, conveyance service distance, estimated time of arrival, preferred conveyance client density, preferred good supplier density, preferred conveyance industry segment, conveyance industry segment density, representative density, conveyance client density, service provider density, good supplier density, or a combination thereof.

Areas of the heat map may be distinguished in proportion to a measurement of the statistical variable and displayed as having one or a combination of a distinguishable visual characteristics such as hue, shade, saturation, opacity, color, color value, pattern, fill, shape, image, animation, or a combination thereof.

In some embodiments, the preferred conveyance service request is not identified prior to compiling the heat map, a real time or near real time heat map, a historical heat map, a predictive heat map, or a combination thereof.

In a further embodiment, a real time or near real time heat map is compiled from the statistical variable of the conveyance service request(s), the filtered conveyance service request(s), the preferred conveyance service request(s), the representative preference, or a combination thereof.

An additional embodiment of the present invention includes a historical heat map compiled from the statistical variable of all or some of past the plurality of conveyance service requests, all or some of past the plurality of filtered conveyance service requests, all or some of past the preferred conveyance service request, the representative preference, or a combination thereof.

An embodiment of the present invention includes a predictive heat map compiled from the statistical variable of all or some of past the plurality of conveyance service requests, all or some of past the plurality of filtered conveyance service requests, all or some of past the preferred conveyance service request, all or some of the plurality of conveyance service requests, all or some of the plurality of filtered conveyance service requests, all or some of the preferred conveyance service request, the representative preference, or a combination thereof.

In an embodiment, the predictive heat map identifies or estimates one or more of future conveyance service availability, future pricing, future elevated pricing, future conveyance service request density, future filtered conveyance service request density, future preferred conveyance service request density, future level of service density, future conveyance industry segment density, future representative density, future conveyance client density, future service provider density, future good supplier density, future level of service demand, future conveyance industry segment demand, future conveyance service demand, future service provider demand, future good supplier demand, future conveyance service supply, future representative supply, or a combination thereof.

The predictive heat map generates a visual notification or an audio notification to notify the representative of a future change or update to the statistical variable, the measurement of the statistical variable, or a combination thereof.

In one embodiment of the present invention, the representative, the central server, the application, or a combination thereof, secures or obtains the preferred conveyance service request in a conveyance industry segment. In another embodiment, the representative may secure or obtain multiple preferred conveyance service requests concurrently.

In a further embodiment, one or more of the preferred conveyance service request(s), the filtered conveyance service request(s), the conveyance service request(s), the additional filtered conveyance service request(s), the additional preferred conveyance service request(s), the real time or near real time geographical location(s) of the representative (s), the representative preference(s), the beginning service geographical location, the ending service geographical location, or a combination thereof, is identified or updated in real time or near real time as the real time or near real time geographical location of the representative updates or changes or as traffic information updates or changes.

In another embodiment, the representative browses or navigates an area of the visual representation to identify and then secure or obtain the preferred conveyance service request or the filtered conveyance service request by selecting or accepting the preferred conveyance service request, the filtered conveyance service request, the representative preference, or a combination thereof.

In another embodiment, one or more of the application, terminal, central server, external server(s), link, or a combination thereof, are combined or integrated.

One or more of the preferred conveyance service request(s), the filtered conveyance service request(s), the conveyance service requests, the real time or near real time geographical location of the representative, the representative preference, the additional filtered conveyance service request(s), the additional preferred conveyance service request(s), a secured or obtained preferred conveyance service request, the beginning service geographical location, the ending service geographical location, or a combination thereof, may be transmitted and/or updated in real time or near real time by way of a link between the application and the central server.

In another embodiment, one or more of the preferred conveyance service request(s), the filtered conveyance service request(s), the conveyance service request(s), the real time or near real time geographical location of the representative, the representative preference, the additional filtered conveyance service request(s), the additional preferred conveyance service request(s), a secured or obtained preferred conveyance service request, the beginning service geographical location, the ending service geographical location, or a combination thereof, are transmitted in real time or near real time between the application and the external server and updated in real time or near real time.

In another embodiment, one or more of the preferred conveyance service request(s), the filtered conveyance service request(s), the conveyance service request(s), the real time or near real time geographical location of the representative, the representative preference, the additional filtered conveyance service request(s), the additional preferred conveyance service request(s), a secured or obtained preferred conveyance service request, the beginning service geographical location, the ending service geographical location, or a combination thereof, are transmitted in real time or near real time between the central server and the external server and updated in real time or near real time.

Example 2: Representative Maps

A second aspect of the invention includes a real time or near real time method to assist a representative in the process of securing or obtaining, within the conveyance industry, a preferred conveyance service request relating to a representative preference and a real time or near real time geographical location of the representative by using a visual representation, the method including, in the system described in Example 1 above.

Figure 3:
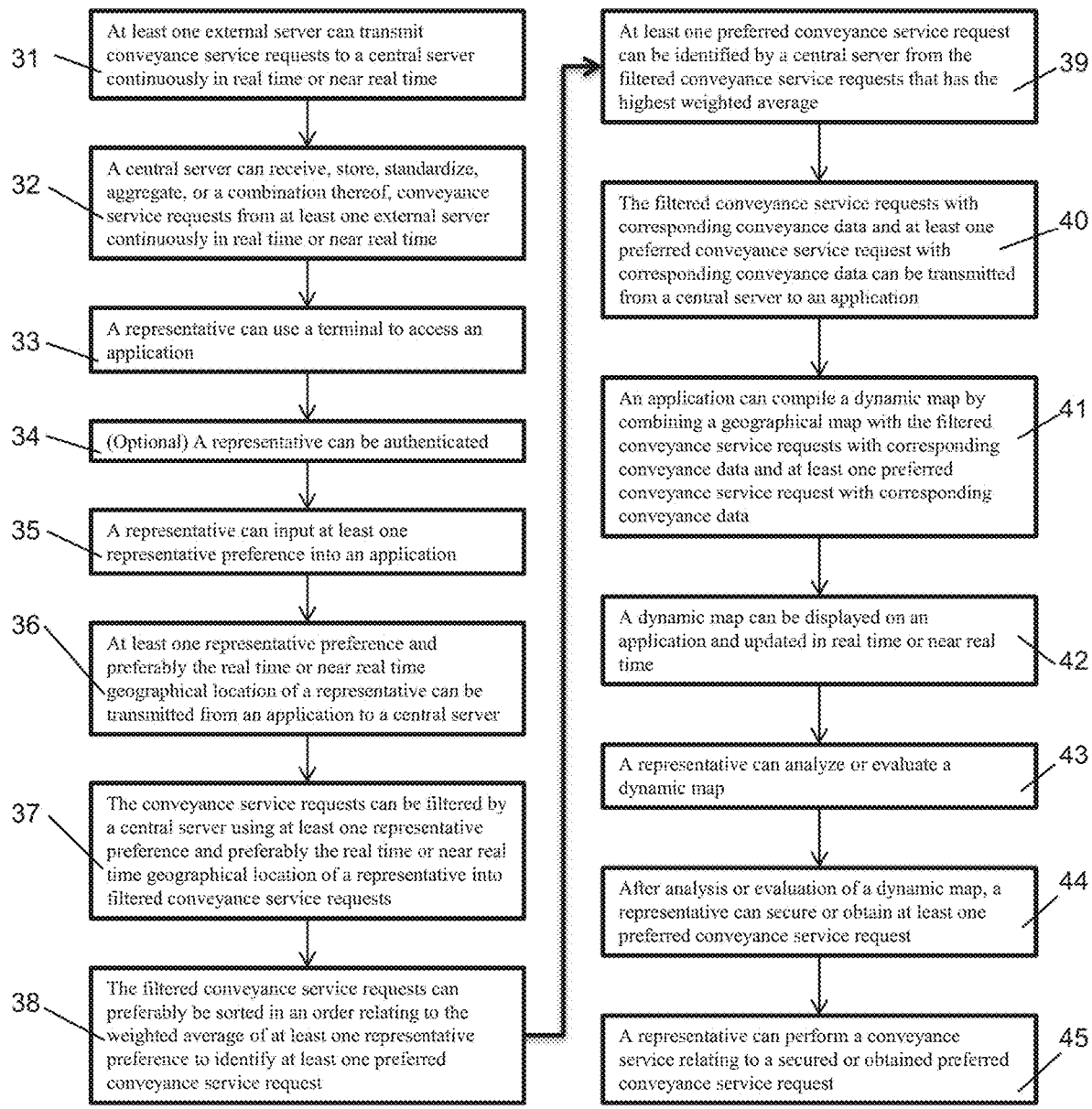
FIG. 3 is a flow diagram of steps according to an embodiment of the present invention that utilizes representative preferences.

FIG. 3 provides a flowchart of steps of an exemplary method in a preferable but not necessarily required order. The flowchart describes steps of how a representative 2 can secure or obtain a preferred conveyance service request 15 by analyzing or evaluating a visual representation, in this example, a dynamic map 11. A link can be a connection or an association with a software function or a software component relating to an application 6, a terminal 7, a central server 9, one or more external server 10, or a combination thereof. Referring to FIG. 3:

Step 31. A conveyance service request can be transmitted from an external server to a central server continuously in real time or near real time by way of a link Step 32. A conveyance service request can be stored, standardized, aggregated, or a combination thereof, at least once on a central server.

Step 33. A representative can use a terminal to access an application.

Step 34. A representative can be authenticated.

Step 35. A representative can input or provide a representative preference into an application.

Step 36. A representative preference and preferably a real time or near real time geographical location of a representative can be transmitted from an application to a central server by way of a link.

Step 37. A conveyance service request can be filtered by a central server using a representative preference and preferably a real time or near real time geographical location of a representative into a filtered conveyance service request.

Step 38. A filtered conveyance service request can preferably be sorted in an order relating to a weighted average of a representative preference to identify a preferred conveyance service request.

Step 39. A preferred conveyance service request can be identified by a central server as a filtered conveyance service request that has the highest weighted average from a filtered conveyance service request.

Step 40. A filtered conveyance service request and a preferred conveyance service request can be transmitted from a central server to an application by way of a link.

Step 41. An application can compile a dynamic map by combining a geographical map with a filtered conveyance service request with corresponding conveyance data and preferably a preferred conveyance service request with corresponding conveyance data and then preferably a dynamic map can be displayed on an application and updated in real time or near real time.

Step 42. A preferred conveyance service request can be displayed as a visually distinguishable icon alongside a filtered conveyance service request on a dynamic map Step 43. A representative can analyze or evaluate a dynamic map Step 44. After analysis or evaluation of a dynamic map, a representative can secure or obtain a preferred conveyance service request Step 45. A representative can perform a conveyance service.

In an embodiment of the invention for use in the ride-hail industry segment, a representative 2 can be a driver, a conveyance client 1 can be a passenger, and a conveyance service request 13 can be a ride service request. Central server 9 can continuously receive conveyance service requests 13 from preferably more than one external server 10 by way of a link 8 in real time or near real time and can store, standardize, aggregate, and filter conveyance service requests 13 in real time or near real time. A central server 9 can preferably sort filtered conveyance service requests 14 in real time or near real time, or use another technique, to identify a preferred conveyance service request 15. In a situation where a representative 2 does not have an application 6 downloaded to a terminal 7, a representative 2 could download an application 6 and optionally register an account to create a representative 2 profile if desired/required. A representative 2 can access an application 6 using a terminal 7 to gain knowledge of the ride-hail industry segment. When a representative 2 would like to provide a ride in the ride-hail industry segment, a representative 2 would preferably login to an application 6 and can be authenticated.

Once logged into an application 6, a representative 2 can input or provide representative preferences 3 into an application 6. In this example, a representative 2 can input or provide two representative preferences 3, a pricing preference and a service duration preference. A pricing preference can be, e.g., a preference of over $20 income per each individual conveyance service request 13. A service duration preference can be, for example, a preference of conveyance services shorter than 15 minutes.

Figure 4:
FIG. 4 is a sample display of a dynamic map according to an embodiment of the invention that utilizes representative preferences.

Preferably, these two representative preferences 3 can enable a representative 2 to analyze or evaluate a dynamic map 11, an example of which is provided in FIG. 4, with a preferred conveyance service request 15 and filtered conveyance service requests 14 that can be more desired by a representative 2. Central server 9 can filter out conveyance service requests 13 that do not match or satisfy the two representative preferences 3 for a representative 2. Benefits of representative preferences 3 can be to allow a representative 2 to better meet their criteria in providing conveyance services such as higher earning potential, better efficiencies, more suitable conveyance service requests 13, or a combination thereof. The two representative preferences 3 for this example and preferably the real time or near real time geographical location of a representative 2 can be transmitted from an application 6 to a central server 9 by way of a link 8.

The dynamic map 11 can be used by the representative 2 to analyze or evaluate and then secure or obtain the preferred conveyance service request 15A. The filtered conveyance service requests 14A, 14B, 14C, and 14D and the preferred conveyance service request 15A are associated with different service providers 5A, 5B, 5C, and 5D respectively. A link can be a connection or an association with a software function or a software component relating to an application 6, a terminal 7, a central server 9, an external server 10, or a combination thereof.

The preferred conveyance service request 15A can be visually identifiable compared to the filtered conveyance service requests 14A, 14B, 14C and 14D. In this figure, a star is used in addition to a larger icon to demonstrate the preferred conveyance service request 15A as being visually identifiable. At least one different icon, symbol, color, shade, or visual can be used to identify individual filtered conveyance service requests 14A, 14B, 14C and 14D and the preferred conveyance service request 15A that are from different conveyance industry segments, different service providers 5, or a combination thereof. For example, in this figure, icons displaying a person are ride service requests from the ride-hail industry segment, icons displaying a van are good delivery service requests from the courier industry segment, and icons with a spoon and fork are food delivery service requests from the food delivery industry segment. Each individual icon, symbol, color, shade, or visual can be mobile or dynamic and updated in real time or near real time on an application 6.

Figure 5:
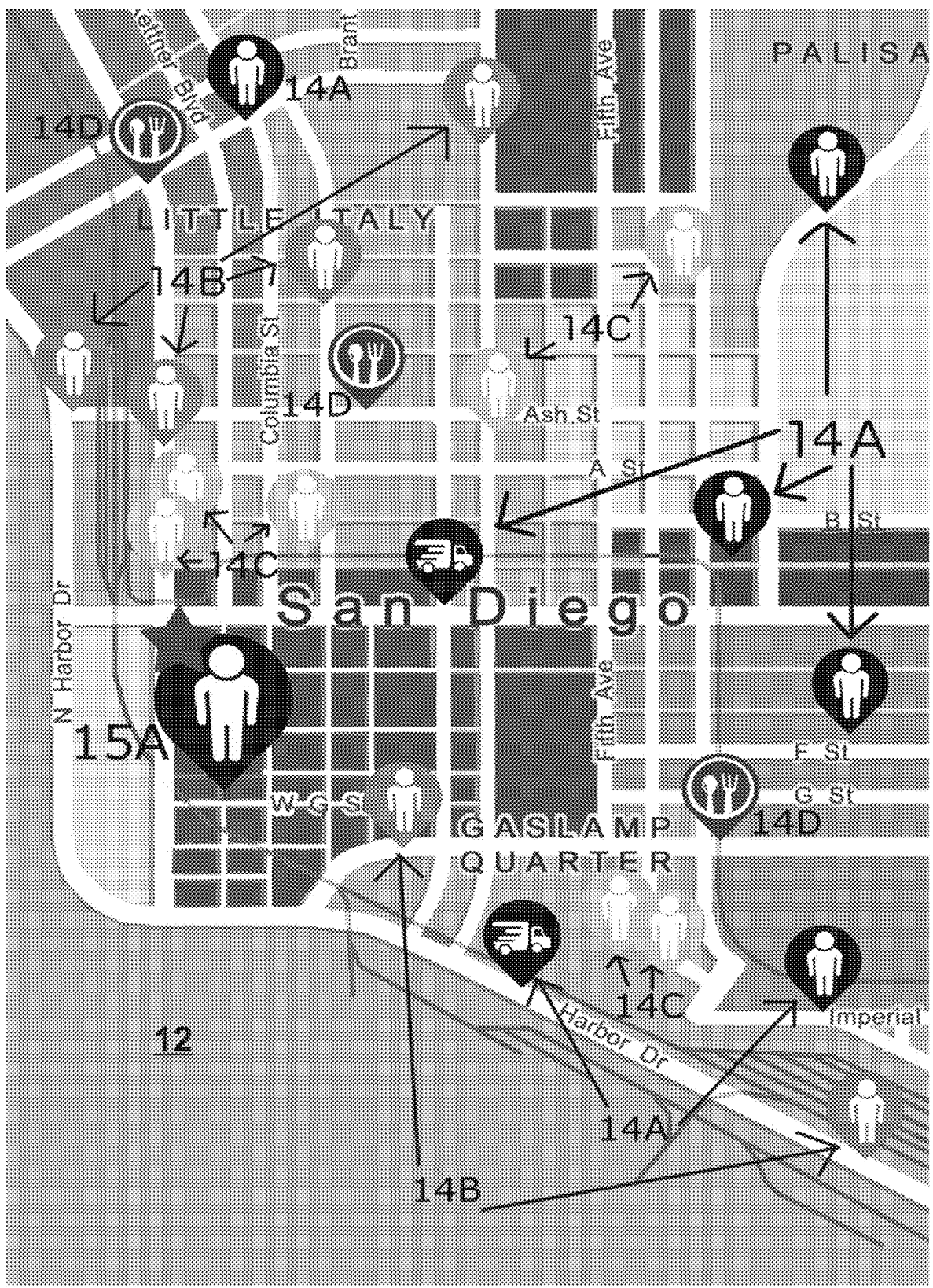
FIG. 5 provides a sample display of a combination of a dynamic map and a heat map according to an embodiment of the invention that utilizes representative preferences.

FIG. 5 provides an example of a combination of a dynamic map and a heat map which may be used by representative 2 to analyze or evaluate on both a micro and macro level view of a conveyance industry segment and then secure or obtain the preferred conveyance service request 15A. The filtered conveyance service requests 14A, 14B, 14C, and 14D and the preferred conveyance service request 15A are associated with different service providers 5A, 5B, 5C, and 5D respectively. A link can be a connection or an association with a software function or a software component relating to an application 6, a terminal 7, a central server 9, an external server 10, or a combination thereof.

The preferred conveyance service request 15A can be visually identifiable compared to the filtered conveyance service requests 14A, 14B, 14C, and 14D. In this example, a star is used in addition to a larger icon to demonstrate the preferred conveyance service request 15A as being visually identifiable. At least one different icon, symbol, color, shade, or visual can be used to identify individual filtered conveyance service requests 14A, 14B, 14C and 14D and the preferred conveyance service request 15A that are from different conveyance industry segments, different service providers 5, or a combination thereof. For example, in this figure, icons displaying a person are ride service requests from the ride-hail industry segment, icons displaying a van are good delivery service requests from the courier industry segment, and icons with a spoon and fork are food delivery service requests from the food delivery industry segment. Each individual icon, symbol, color, shade, or visual can be mobile or dynamic and updated in real time or near real time on an application 6.

In the example of FIG. 5, a dynamic map showing filtered conveyance service requests 14A, 14B, 14C, and 14D and the preferred conveyance service request 15A is displayed in combination with a heat map showing areas with elevated pricing. Areas of the combination of a dynamic map and a heat map can be shaded or patterned in proportion to the measurement of an elevated pricing metric being displayed on a geographical map. Darker shaded areas can represent areas with higher elevated pricing whereas lighter shaded areas can represent areas with lower elevated pricing or potentially no elevated pricing. A representative 2 can use this combination of a dynamic map 11 and a heat map 12 to analyze and identify areas of elevated pricing shown as darker shaded areas to position themselves closer to areas of elevated pricing. In this figure, the representative 2 can drive to a darker shaded area with higher pricing and then secure or obtain the preferred conveyance service request 15 to provide the requested conveyance service.

Additional definitions, features and embodiments of the representative maps and method(s) for generating them are described below:

Standardizing Conveyance Service Requests: In one embodiment, some or all of the plurality of conveyance service requests, the real time or near real time geographical location of the representative, or a combination thereof, may be structured in a different format, and are standardized or converted into a uniform format. In another embodiment, all or some of the plurality of conveyance service requests are structured in a uniform format prior to being transmitted from the external server to the central server and are not standardized.

Transmitting a Representative Preference and a Geographical Location: In an embodiment of the present invention, the representative preference, once inputted or provided into the application, may be stored or cached on the application, the computer readable memory of the central server, or a combination thereof, and the representative preference is not inputted or provided again into the application by the representative. In another embodiment, the representative preference is stored or cached in the computer readable memory of the central server and the representative preference is not transmitted again from the application to the central server. In still another embodiment, the representative preference, the real time or near real time geographical location of the representative, or a combination thereof, may be transmitted from the application to the central server at any time prior to filtering all or some of the plurality of conveyance service requests.

Filtering Conveyance Service Requests

In some embodiments, all or some of the conveyance service requests are filtered relating to the representative preference and the real time or near real time geographical location of the representative, to identify all or some of the plurality of filtered conveyance service requests by one or more process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

In another embodiment, all or some of the plurality of conveyance service requests are filtered in real time or near real time and the preferred conveyance service request is identified in real time or near real time from all or some of the plurality of filtered conveyance service requests on the application by: (a) transmitting in real time or near real time, all or some of the plurality of conveyance service requests from the central server to the application by way of a link between the central server and the application; (b) filtering in real time or near real time, all or some of the plurality of conveyance service requests by using the representative preference and the real time or near real time geographical location of the representative, to identify all or some of the plurality of filtered conveyance service requests; and (c) identifying in real time or near real time, the preferred conveyance service request from all or some of the plurality of filtered conveyance service requests relating to the representative preference.

In a further embodiment of the present invention a different geographical location may be used other than the real time or near real time geographical location of the representative when filtering all or some of the plurality of conveyance service requests.

Identifying Preferred Conveyance Service Request(s)

In some embodiments, the preferred conveyance service request relating to the representative preference is identified from all or some of the plurality of filtered conveyance service requests by using one or more of a sorting algorithm, a selection algorithm, a search algorithm, a merge algorithm, a maximum function, a minimum function, a graph algorithm, a graph search algorithm, a tree algorithm, a tree search algorithm, a matrix calculation, a matrix algorithm, a comparison, or a combination thereof.

Another embodiment of the present invention includes, wherein the preferred conveyance service request is identified from all or some of the plurality of filtered conveyance service requests relating to a weighted average of the representative preference.

In a further embodiment, the preferred conveyance service request is identified in real time or near real time from all or some of the plurality of filtered conveyance service requests on the application by: (a) transmitting in real time or near real time, all or some of the plurality of filtered conveyance service requests from the central server to the application by way of a link between the central server and the application; and (b) identifying in real time or near real time, the preferred conveyance service request from all or some of the plurality of filtered conveyance service requests relating to the representative preference.

In some embodiments, the visual representation may be compiled on the central server and transmitted to the application by way of a link between the central server and the application.

Displaying a Visual Representation

The visual representation may be displayed on a remote display and may include one or more of a dynamic map and heat map, or a combination thereof.

The representative may use the visual representation to secure or obtain the preferred conveyance service request in real time or near real time, related to the representative preference, the real time or near real time geographical location of the representative, or a combination thereof. The representative preference may be displayed as one or more icon or visual with or on the visual representation, to allow the representative to analyze or evaluate all or some of the plurality of filtered conveyance service requests, the preferred conveyance service request, or a combination thereof, and secure or obtain the preferred conveyance service request relating to a service provider or a good supplier operating in a conveyance industry segment.

Another embodiment of the present invention includes, wherein the preferred conveyance service request, the representative preference, or a combination thereof, is displayed in a visually identifiable format compared to all or some of the plurality of filtered conveyance service requests relating to a service provider or a good supplier operating in a conveyance industry segment.

An additional embodiment of the present invention includes, wherein the dynamic map includes the geographical map that displays in real time or near real time, all or some of the plurality of filtered conveyance service requests, the preferred conveyance service request, the representative preference, or a combination thereof.

A further embodiment of the present invention includes, wherein all or some of the plurality of filtered conveyance service requests, the preferred conveyance service request, the representative preference, or a combination thereof, relating to a service provider or a good supplier operating in a conveyance industry segment, is displayed individually as a mobile or transitory icon or a mobile or transitory visual and updates or changes in real time or near real time.

A further embodiment of the present invention includes, wherein all or some of the plurality of filtered conveyance service requests, the preferred conveyance service request, the representative preference, or a combination thereof, relating to an individual service provider or an individual good supplier operating in a conveyance industry segment, is displayed as a distinguishable icon or visual and updates or changes in real time or near real time.

A further embodiment of the present invention includes, wherein all or some of the plurality of filtered conveyance service requests, the preferred conveyance service request, the representative preference, or a combination thereof, relating to an individual service provider or an individual good supplier operating in a conveyance industry segment, is displayed as an icon or visual and updates or changes in real time or near real time.

A further embodiment of the present invention includes, wherein all or some of the plurality of filtered conveyance service requests, the preferred conveyance service request, the representative preference, or a combination thereof, relating to an individual service provider or an individual good supplier is displayed as or with a different icon, a different symbol, a different color, a different shading, a different pattern, a different visual, or a combination thereof.

A further embodiment of the present invention includes, wherein all or some of the plurality of filtered conveyance service requests, the preferred conveyance service request, the representative preference, or a combination thereof, relating to an individual service provider or an individual good supplier is displayed as or with a similar icon, a similar symbol, a similar color, a similar shading, a similar pattern, a similar visual, or a combination thereof.

A further embodiment of the present invention includes, wherein the representative updates, modifies, or changes the representative preference and the dynamic map displays in real time or near real time, all or some of the plurality of filtered conveyance service requests, the preferred conveyance service request, the representative preference, or a combination thereof, based on the updated, modified, or changed the representative preference.

An additional embodiment of the present invention includes, wherein the heat map includes the geographical map that displays a visual depiction of one or more statistical variable of all or some of the plurality of conveyance service requests; all or some of the plurality of filtered conveyance service requests; all or some of the preferred conveyance service request; the representative preference; or a combination thereof.

An embodiment of the present invention includes, wherein the statistical variable includes a measurement of conveyance service availability, pricing, elevated pricing, conveyance service request density, filtered conveyance service request density, preferred conveyance service request density, level of service density, a conveyance service distance, an estimated time of arrival, preferred conveyance client density, preferred good supplier density, a preferred conveyance industry segment, conveyance industry segment density, representative density, conveyance client density, service provider density, good supplier density, or a combination thereof.

Another embodiment of the present invention includes, wherein an area of the heat map is distinguished in proportion to a measurement of the statistical variable and displayed as having one or more of a distinguishable hue, shade, saturation, opacity, color, value of color, pattern, fill, shape, image, animation, or a combination thereof.

A further embodiment of the present invention includes, wherein the preferred conveyance service request is not identified prior to compiling the heat map, a real time or near real time heat map, a historical heat map, a predictive heat map, or a combination thereof.

Another embodiment of the present invention includes, wherein a real time or near real time heat map is compiled from the statistical variable of all or some of the conveyance service requests, all or some of the filtered conveyance service requests, all or some of the preferred conveyance service request, the representative preference, or a combination thereof.

An embodiment of the present invention includes, wherein a historical heat map is compiled from the statistical variable of all or some of past the plurality of conveyance service requests, all or some of past the plurality of filtered conveyance service requests, all or some of past the preferred conveyance service request, the representative preference, or a combination thereof.

In another embodiment, a predictive heat map may be compiled from the statistical variable of all or some past conveyance service requests, all or some past filtered conveyance service requests, all or some past preferred conveyance service request(s), all or some of the conveyance service requests, all or some filtered conveyance service requests, all or some preferred conveyance service request, the representative preference, or a combination thereof.

The predictive heat map may identify or estimate one or more of future conveyance service availability, future pricing, future elevated pricing, future conveyance service request density, future filtered conveyance service request density, future preferred conveyance service request density, future level of service density, future conveyance industry segment density, future representative density, future conveyance client density, future service provider density, future good supplier density, future level of service demand, future conveyance industry segment demand, future conveyance service demand, future service provider demand, future good supplier demand, future conveyance service supply, future representative supply, or a combination thereof.

An additional embodiment of the present invention includes, wherein the predictive heat map generates a visual notification or an audio notification to notify the representative of a future change or update to the statistical variable, the measurement of the statistical variable, or a combination thereof.

In one embodiment, a function of the central server or the external server may be performed by the application. In some embodiments, the application operates on the central server. Further, a function of the application is performed by the central server or the external server.

An additional embodiment of the present invention includes, wherein the representative, the central server, the application, or a combination thereof, secures or obtains the preferred conveyance service request in a conveyance industry segment.

An embodiment of the present invention includes, wherein all or some of the plurality of conveyance service requests are sourced or provided by a service provider or a good supplier operating in a conveyance industry segment.

Another embodiment of the present invention includes, wherein the representative secures or obtains more than one the preferred conveyance service requests concurrently.

A further embodiment of the present invention includes, wherein the representative secures or obtains a filtered conveyance service request other than the preferred conveyance service request.

An additional embodiment of the present invention includes, wherein the preferred conveyance service request, all or some of the plurality of filtered conveyance service requests, all or some of the plurality of conveyance service requests, all or some of subsequent or additional the plurality of filtered conveyance service requests, all or some of subsequent or additional the preferred conveyance service request, all or some of the real time or near real time geographical location of the representative, the representative preference, the beginning service geographical location, the ending service geographical location, or a combination thereof, is identified or updated in real time or near real time as the real time or near real time geographical location of the representative updates or changes or as traffic information updates or changes.

An embodiment of the present invention includes, wherein the plurality of conveyance service requests is a single conveyance service request.

Another embodiment of the present invention includes, wherein the plurality of filtered conveyance service requests is a single filtered conveyance service request.

A further embodiment of the present invention includes, wherein the representative browses or navigates an area of the visual representation to identify and then secure or obtain the preferred conveyance service request or the filtered conveyance service request by selecting or accepting the preferred conveyance service request, the filtered conveyance service request, the representative preference, or a combination thereof.

Another embodiment of the present invention includes, wherein the central server is located on or associated with the terminal.

Another embodiment of the present invention includes, wherein the application, the terminal, the central server, the external server, a link, or a combination thereof, is combined or integrated.

Another embodiment of the present invention includes, wherein the beginning service geographical location, the ending service geographical location, the representative preference, or a combination thereof, is provided prior to receiving all or some of the plurality of conveyance service requests on or at the central server.

Another embodiment of the present invention includes, wherein the preferred conveyance service request, all or some of the plurality of filtered conveyance service requests, all or some of the plurality of conveyance service requests, all or some of the real time or near real time geographical location of the representative, the representative preference, all or some of subsequent or additional the plurality of filtered conveyance service requests, all or some of subsequent or additional the preferred conveyance service request, a secured or obtained preferred conveyance service request, the beginning service geographical location, the ending service geographical location, or a combination thereof, is transmitted in real time or near real time between the application and the central server and updated in real time or near real time by way of a link between the application and the central server.

Another embodiment of the present invention includes, wherein the preferred conveyance service request, all or some of the plurality of filtered conveyance service requests, all or some of the plurality of conveyance service requests, all or some of the real time or near real time geographical location of the representative, the representative preference, all or some of subsequent or additional the plurality of filtered conveyance service requests, all or some of subsequent or additional the preferred conveyance service request, a secured or obtained preferred conveyance service request, the beginning service geographical location, the ending service geographical location, or a combination thereof, is transmitted in real time or near real time between the application and the external server and updated in real time or near real time by way of a link between the application and the external server.

In an embodiment of the present invention includes, the preferred conveyance service request, all or some of the plurality of filtered conveyance service requests, all or some of the plurality of conveyance service requests, all or some of the real time or near real time geographical location of the representative, the representative preference, all or some of subsequent or additional the plurality of filtered conveyance service requests, all or some of subsequent or additional the preferred conveyance service request, a secured or obtained preferred conveyance service request, the beginning service geographical location, the ending service geographical location, or a combination thereof, is transmitted in real time or near real time between the central server and the external server and updated in real time or near real time by way of a link between the central server and the external server.

Example 3: Conveyance Client Maps

A third aspect of the present invention includes a real time or near real time system to assist a conveyance client in a process of securing or obtaining a preferred conveyance service offering.

Figure 6:
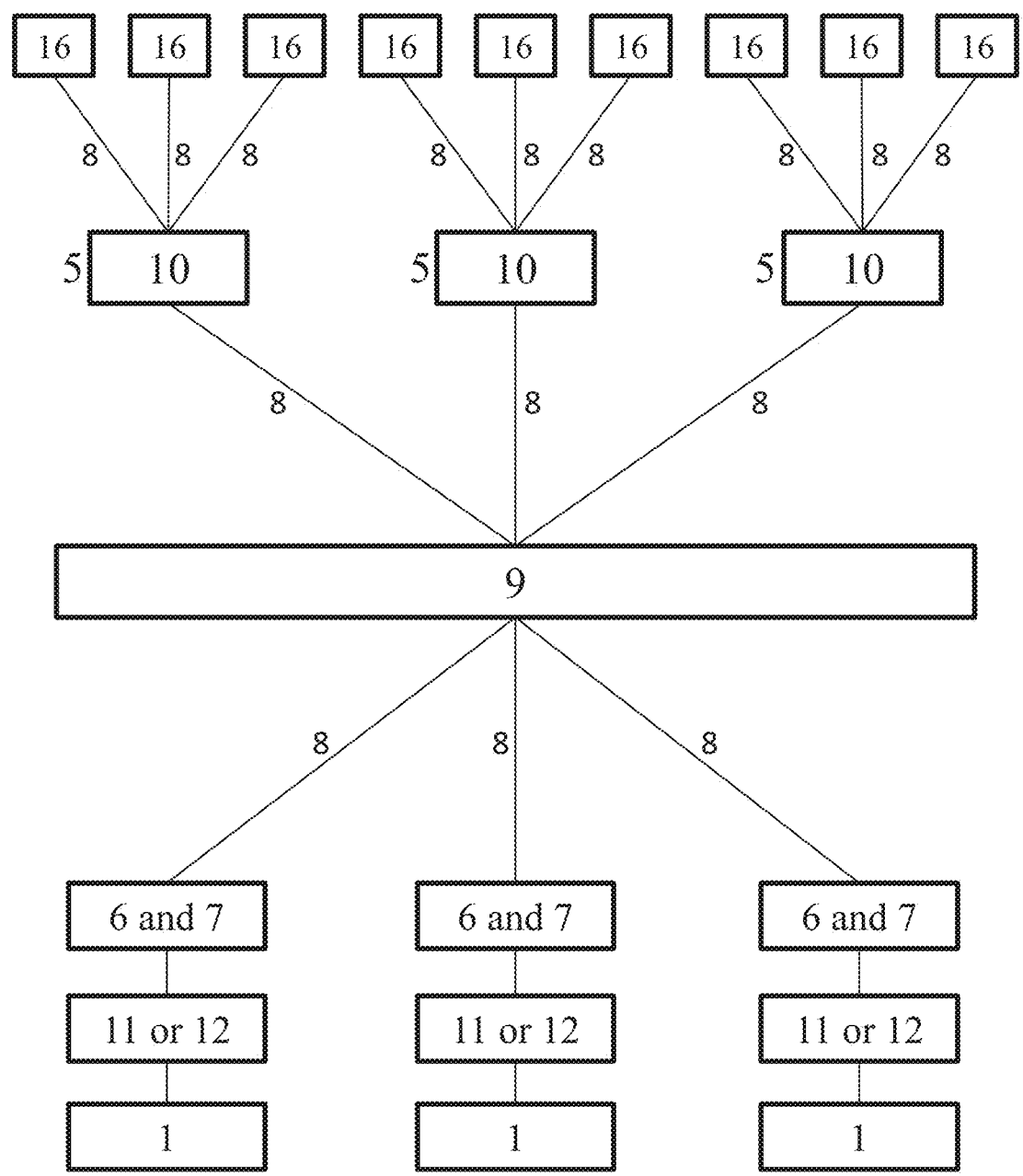
FIG. 6 is a high-level schematic of a conveyance system according to an embodiment of the present invention that utilizes conveyance client preferences.
Figure 7:
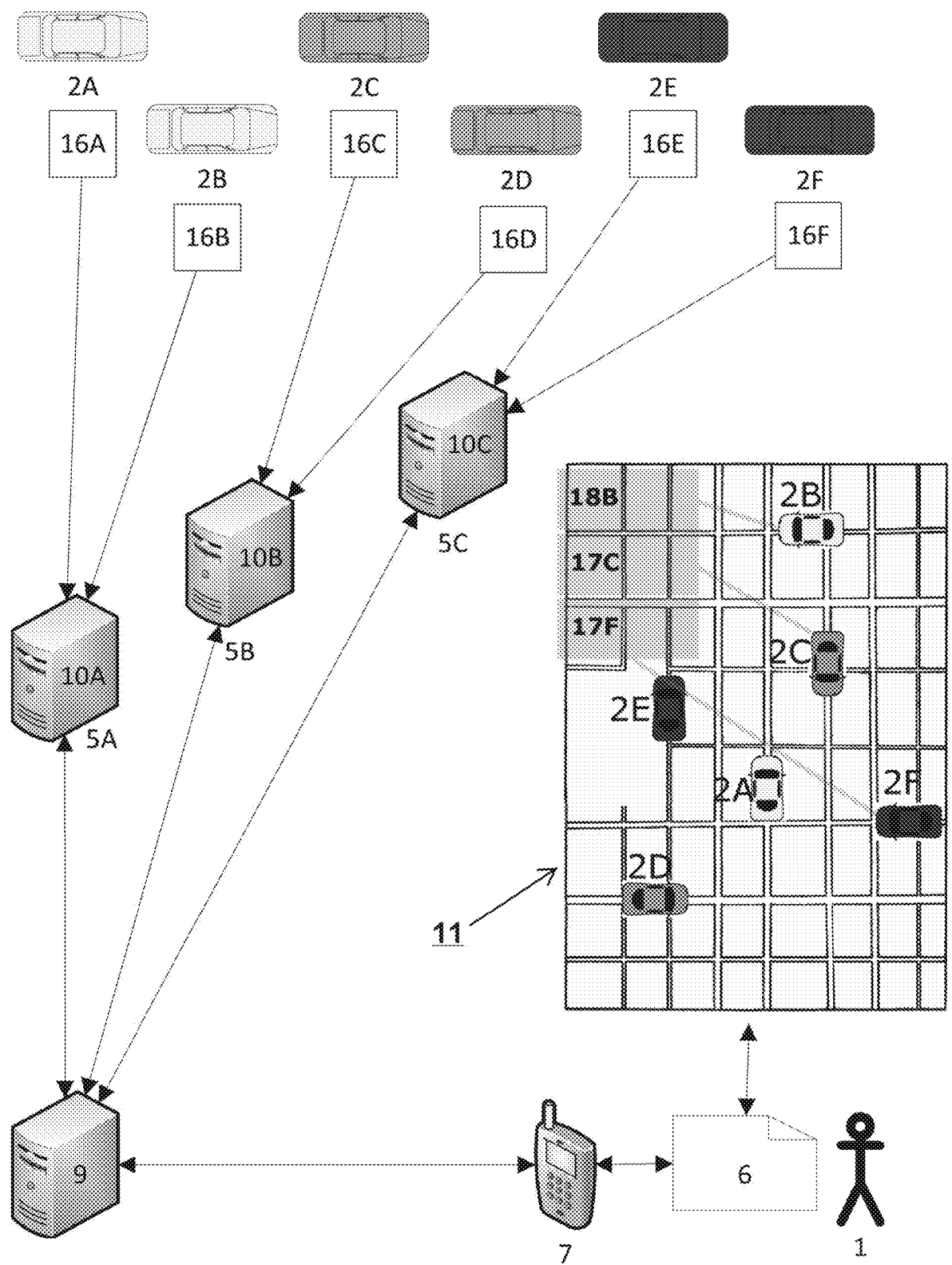
FIG. 7 is a high-level diagram of a conveyance service system according to an embodiment of the present invention that utilizes conveyance client preferences.

Referring to FIGS. 6 and 7, conveyance service offerings 16 can be sourced from an external server 10 and can be transmitted to a central server 9 by way of a link 8. A service provider 5 can be associated with one or more external servers 10. In this figure, each service provider 5 is associated with one external server 10. A central server 9 can filter conveyance service offerings 16 into filtered conveyance service offerings 17 by using a conveyance client preference 4 and preferably the real time or near real time geographical location of a conveyance client 1. A central server 9 can calculate the weighted average of the conveyance client preference 4. A central server 9 can preferably sort the filtered conveyance service offerings 17 in an order relating to the corresponding weighted averages to identify at least one preferred conveyance service offering 18. A preferred conveyance service offering 18 can be identified by a central server 9 from the filtered conveyance service offerings 17 that has the highest weighted average. A preferred conveyance service offering 18 with corresponding conveyance data and filtered conveyance service offerings 17 with corresponding conveyance data can be transmitted from a central server 9 to an application 6 by way of a link 8. An application 6 can operate on a terminal 7 and can display a visual representation such as a dynamic map 11, a heat map 12, or a combination thereof. A conveyance client 1 can analyze or evaluate the visual representation and then secure or obtain a preferred conveyance service offering 18. A link 8 can be a connection or an association with a software function or a software component relating to an application 6, a terminal 7, a central server 9, an external server 10, or a combination thereof.

FIG. 7 provides a sample diagram of a real time or near real time conveyance service system according to an embodiment of the invention, which is designed to benefit a conveyance client 1. An individual conveyance service offering 16 can be performed by each individual representative 2A, 2B, 2C, 2D, 2E, and 2F. An individual conveyance service offering 16 corresponds with each individual representative 2 in the figure. Conveyance service offerings 16A and 16B are offered by representatives 2A and 2B to external server 10A associated with service provider 5A. Conveyance service offerings 16C and 16D are offered by representatives 2C and 2D to external server 10B associated with service provider 5B. Conveyance service offerings 16E and 16F are offered by representatives 2E and 2F to external server 10C associated with service provider 5C. Each service provider 5 can have an external server 10.

A central server 9 can receive conveyance service offerings 16 and then filter the conveyance service offerings 16 into filtered conveyance service offerings 17 by using a conveyance client preference 4 and preferably the real time or near real time geographical location of a conveyance client 1. A central server 9 can calculate the weighted average of a conveyance client preference 4. A central server 9 can preferably sort the filtered conveyance service offerings 17 in an order relating to the corresponding weighted averages to identify one or more preferred conveyance service offering 18. The preferred conveyance service offering 18 can be identified by the central server 9 from the filtered conveyance service offerings 17 that has the highest weighted average. At least one preferred conveyance service offering 18 with corresponding conveyance data and filtered conveyance service offerings 17 with corresponding conveyance data can be transmitted from the central server 9 to an application 6 by way of a link 8. An application 6 can operate on a terminal 7 and can display a visual representation, for example, a dynamic map 11. Individual filtered conveyance service offerings 17C, 17F and the preferred conveyance service offering 18B can be shown on a dynamic map 11 as dynamic icons or visuals and can optionally show conveyance data. A conveyance client 1 can analyze or evaluate a dynamic map 11 and then secure or obtain the preferred conveyance service offering 18B.

A link can be a connection or an association with a software function or a software component relating to the application 6, a terminal 7, a central server 9, an external server 10, or a combination thereof. The terminal 7 may be associated with a conveyance client 1.

Conveyance service offerings may include an individual conveyance service offering including an offering for transporting one or more of a person, a good, a thing, or a combination thereof, from one geographical location another geographical location, where the individual conveyance service offering is updated in real time or near real time, and where individual conveyance service offering includes qualitative and quantitative conveyance data corresponding thereto. A plurality of filtered conveyance service offerings include at least a subset of the plurality of conveyance service offerings that result from filtering all or some of the conveyance service offerings using the conveyance client preference and the real time or near real time geographical location of the conveyance client, where all or some of the plurality of filtered conveyance service offerings are updated in real time or near real time. A preferred conveyance service offering includes an offering for transporting the person, the good, the thing, or a combination thereof, from one geographical location to another geographical location that is identified from all or some of the plurality of filtered conveyance service offerings, where the preferred conveyance service offering is updated in real time or near real time. The conveyance client may include one or more of a person and a machine, or a combination thereof, that analyzes or evaluates the visual representation and then secures or obtains the preferred conveyance service offering. The conveyance client provides one or more conveyance client preferences including an option selected or provided by the conveyance client that is used to filter all or some of the plurality of conveyance service offerings into all or some of the plurality of filtered conveyance service offerings.

The visual representation includes one or more geographical map displaying all or some of the plurality of filtered conveyance service offerings, the preferred conveyance service offering, the conveyance client preference, or a combination thereof. A beginning service geographical location and one or more ending service geographical location are inputted or provided to the application to be transmitted in real time or near real time to the central server by way of a link between the application and the central server. The beginning service geographical location and the ending service geographical location are transmitted in real time or near real time from the central server to the external server by way of a link between the central server and the external server.

All or some of the plurality of conveyance service offerings are transmitted in real time or near real time between the external server and the central server by way of ae link between the external server and the central server. All or some of the plurality of filtered conveyance service offerings, the preferred conveyance service offering, the conveyance client preference, the real time or near real time geographical location of the conveyance client, or a combination thereof, are transmitted in real time or near real time between the central server and the application by way of a link between the central server and the application. The application may operate on the terminal and the conveyance client uses the application to analyze or evaluate the visual representation of all or some of the plurality of filtered conveyance service offerings, the preferred conveyance service offering, or a combination thereof. The conveyance client may use the application to analyze or evaluate the visual representation and then secure or obtain the preferred conveyance service offering.

The external server(s) are real time or near real time sources of all or some of the plurality of conveyance service offerings transmitted in real time or near real time from the external server to the central server by way of a link between the external server and the central server. All or some of the plurality of conveyance service offerings are updated in real time or near real time.

The central server standardizes, aggregates, or a combination thereof, in real time or near real time, all or some of the plurality of conveyance service offerings. The central server filters, in real time or near real time, all or some of the plurality of conveyance service offerings by using the conveyance client preference and the real time or near real time geographical location of the conveyance client, to identify all or some of the plurality of filtered conveyance service offerings, all or some of which may be updated in real time or near real time. The central server identifies in real time or near real time, the preferred conveyance service offering from all or some of the plurality of filtered conveyance service offerings relating to the conveyance client preference. The preferred conveyance service offering may be updated in real time or near real time.

The central server transmits in real time or near real time, all or some of the plurality of filtered conveyance service offerings, the preferred conveyance service offering, or a combination thereof, to the application by way of a link between the central server and the application.

The terminal facilitates or provides one or more of an input function, a display function, and operation of the application, and is used by the conveyance client to interface with the application. The application compiles in real time or near real time, the visual representation of all or some of the plurality of filtered conveyance service offerings, the preferred conveyance service offering, or a combination thereof. The application displays the visual representation, which is updated in real time or near real time. The conveyance client uses the application to analyze or evaluate the visual representation and then secure or obtain the preferred conveyance service offering.

Definitions, descriptions and examples of certain features and elements of the invention are provided below:
Conveyance Service Offerings: The following are illustrative, non-limiting examples of "conveyance service offerings" as used in the present disclosure:

All or some of the plurality of conveyance service offerings are sourced or provided by service provider or a good supplier operating in a conveyance industry segment.

All or some of the plurality of conveyance service offerings include one or more of a ride-hail service, a ride-share service, a car-share service, a peer-to-peer conveyance service, a transportation service, a scooter service, a bicycle service, a person delivery service, a taxi service, a shuttle service, a good delivery service, an item delivery service, a medical service and delivery, a food delivery service, a courier delivery service, a freight delivery service, an animal delivery service, a delivery service, or a combination thereof.

The plurality of conveyance service offerings may be a single conveyance service offering.

In an embodiment of the present invention all or some of the plurality of conveyance service offerings are filtered relating to the conveyance client preference and the real time or near real time geographical location of the conveyance client, to identify all or some of the plurality of filtered conveyance service offerings by one or more of a process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

The preferred conveyance service offering may be identified from all or some of the plurality of filtered conveyance service offerings relating to a weighted average of the conveyance client preference.

A different geographical location may be used other than the real time or near real time geographical location of the conveyance client when filtering all or some of the plurality of conveyance service offerings.

The plurality of filtered conveyance service offerings may be a single filtered conveyance service offering.
Visual Representation: The following are illustrative, non-limiting examples and embodiments of "visual representation" as used in the present disclosure:

The visual representation includes one or more of a dynamic map and a heat map, or a combination thereof. The conveyance client utilizes the visual representation to secure or obtain the preferred conveyance service offering in real time or near real time, related to the conveyance client preference, the real time or near real time geographical location of the conveyance client, or a combination thereof.

The conveyance client preference is displayed as one or more icon or visual with or on the visual representation, to allow the conveyance client to analyze or evaluate all or some of the plurality of filtered conveyance service offerings, the preferred conveyance service offering, or a combination thereof, and secure or obtain the preferred conveyance service offering relating to a service provider or a good supplier operating in a conveyance industry segment.

The visual representation may include a display of the preferred conveyance service offering, the conveyance client preference, or a combination thereof, in a visually identifiable format compared to all or some of the plurality of filtered conveyance service offerings relating to a service provider or a good supplier operating in a conveyance industry segment.

The dynamic map may include a geographical map that displays in real time or near real time, all or some of the plurality of filtered conveyance service offerings, the preferred conveyance service offering, the conveyance client preference, or a combination thereof.

All or some of the plurality of filtered conveyance service offerings, the preferred conveyance service offering, the conveyance client preference, or a combination thereof, relating to a service provider or a good supplier operating in a conveyance industry segment, may be displayed individually as a mobile or transitory icon or a mobile or transitory visual and updates or changes in real time or near real time.

All or some of the plurality of filtered conveyance service offerings, the preferred conveyance service offering, the conveyance client preference, or a combination thereof, relating to an individual service provider or an individual good supplier operating in a conveyance industry segment, may be displayed as a distinguishable icon or visual and updates or changes in real time or near real time.

All or some of the plurality of filtered conveyance service offerings, the preferred conveyance service offering, the conveyance client preference, or a combination thereof, relating to an individual service provider or an individual good supplier operating in a conveyance industry segment, may be displayed as an icon or visual and updates or changes in real time or near real time.

All or some of the plurality of filtered conveyance service offerings, the preferred conveyance service offering, the conveyance client preference, or a combination thereof, relating to an individual service provider or an individual good supplier may be displayed as or with one or more of a different icon, symbol, color, shading, pattern, visual, or a combination thereof.

All or some of the plurality of filtered conveyance service offerings, the preferred conveyance service offering, the conveyance client preference, or a combination thereof, relating to an individual service provider or an individual good supplier may be displayed as or with one or more of a similar icon, symbol, color, shading, pattern, visual, or a combination thereof.

When a conveyance client updates, modifies, or changes the conveyance client preference and the dynamic map displays in real time or near real time, all or some of the plurality of filtered conveyance service offerings, the preferred conveyance service offering, the conveyance client preference, or a combination thereof, based on the updated, modified, or changed conveyance client preference.

The heat map includes the geographical map that displays a visual depiction of one or more statistical variable of all or some of the plurality of conveyance service offerings; all or some of the plurality of filtered conveyance service offerings; all or some of the preferred conveyance service offering; the conveyance client preference; or a combination thereof.

The statistical variable may include one or more of a measurement of conveyance service availability, pricing, elevated pricing, conveyance service offering density, filtered conveyance service offering density, preferred conveyance service offering density, preferred good supplier density, a preferred conveyance industry segment, conveyance industry segment density, level of service density, a conveyance service distance, an estimated time of arrival, preferred representative density, representative density, conveyance client density, service provider density, good supplier density, or a combination thereof.

An area of the heat map may be distinguished in proportion to one or more of a measurement of the statistical variable and displayed in the visual representation as having one or more of a distinguishable hue, shade, saturation, opacity, color, color value, pattern, fill, shape, image, animation, or a combination thereof.

In one embodiment, the preferred conveyance service offering is not identified prior to compiling one or more of a heat map, a real time or near real time heat map, a historical heat map, a predictive heat map, or a combination thereof.

In a further embodiment of the present invention includes a real time or near real time heat map is compiled from the statistical variable of all or some of the plurality of conveyance service offerings, all or some of the plurality of filtered conveyance service offerings, all or some of the preferred conveyance service offering, the conveyance client preference, or a combination thereof.

A historical heat map may be compiled from the statistical variable of all or some of past the plurality of conveyance service offerings, all or some of past the plurality of filtered conveyance service offerings, all or some of past the preferred conveyance service offering, the conveyance client preference, or a combination thereof.

A predictive heat map may be compiled from the statistical variable of all or some of past the plurality of conveyance service offerings, all or some of past the plurality of filtered conveyance service offerings, all or some of past the preferred conveyance service offering, all or some of the plurality of conveyance service offerings, all or some of the plurality of filtered conveyance service offerings, all or some of the preferred conveyance service offering, the conveyance client preference, or a combination thereof.

The predictive heat map identifies or estimates one or more of future conveyance service availability, future pricing, future elevated pricing, future conveyance service offering density, future filtered conveyance service offering density, future preferred conveyance service offering density, future level of service density, future conveyance industry segment density, future representative density, future conveyance client density, future service provider density, future good supplier density, future level of service supply, future conveyance industry segment supply, future conveyance service supply, future service provider supply, future good supplier supply, future conveyance service demand, future conveyance client demand, or a combination thereof.

The predictive heat map can generate a visual notification or audio notification to notify the conveyance client of a future change or update to the statistical variable, the measurement of the statistical variable, or a combination thereof.

Another embodiment of the present invention includes, wherein the preferred conveyance service offering, all or some of the plurality of filtered conveyance service offerings, all or some of the plurality of conveyance service offerings, all or some of subsequent or additional the plurality of filtered conveyance service offerings, all or some of subsequent or additional the preferred conveyance service offering, all or some of the real time or near real time geographical location of the conveyance client, the conveyance client preference, the beginning service geographical location, the ending service geographical location, or a combination thereof, is identified or updated in real time or near real time as the real time or near real time geographical location of the conveyance client updates or changes or as traffic information updates or changes.

An embodiment of the present invention includes, wherein the conveyance client browses or navigates an area of the visual representation to identify and then secure or obtain the preferred conveyance service offering or the filtered conveyance service offering by selecting or accepting the preferred conveyance service offering, the filtered conveyance service offering, the conveyance client preference, or a combination thereof.

Another embodiment of the present invention includes, wherein the application, the terminal, the central server, the external server, a link, or a combination thereof, is combined or integrated.

Another embodiment of the present invention includes, wherein the preferred conveyance service offering, all or some of the plurality of filtered conveyance service offerings, all or some of the plurality of conveyance service offerings, all or some of the real time or near real time geographical location of the conveyance client, the conveyance client preference, all or some of subsequent or additional the plurality of filtered conveyance service offerings, all or some of subsequent or additional the preferred conveyance service offering, a secured or obtained preferred conveyance service offering, the beginning service geographical location, the ending service geographical location, or a combination thereof, is transmitted in real time or near real time between the application and the central server and updated in real time or near real time by way of a link between the application and the central server.

Another embodiment of the present invention includes, wherein the preferred conveyance service offering, all or some of the plurality of filtered conveyance service offerings, all or some of the plurality of conveyance service offerings, all or some of the real time or near real time geographical location of the conveyance client, the conveyance client preference, all or some of subsequent or additional the plurality of filtered conveyance service offerings, all or some of subsequent or additional the preferred conveyance service offering, a secured or obtained preferred conveyance service offering, the beginning service geographical location, the ending service geographical location, or a combination thereof, is transmitted in real time or near real time between the application and the external server and updated in real time or near real time by way of a link between the application and the external server.

Another embodiment of the present invention includes, wherein the preferred conveyance service offering, all or some of the plurality of filtered conveyance service offerings, all or some of the plurality of conveyance service offerings, all or some of the real time or near real time geographical location of the conveyance client, the conveyance client preference, all or some of subsequent or additional the plurality of filtered conveyance service offerings, all or some of subsequent or additional the preferred conveyance service offering, a secured or obtained preferred conveyance service offering, the beginning service geographical location, the ending service geographical location, or a combination thereof, is transmitted in real time or near real time between the central server and the external server and updated in real time or near real time by way of a link between the central server and the external server.

Example 4: Conveyance Client Maps

A fourth aspect of the present invention includes a real time or near real time method to assist a conveyance client in a process of securing or obtaining, within the conveyance industry, a preferred conveyance service offering relating to a conveyance client preference and a real time or near real time geographical location of the conveyance client by using a visual representation, the method being carried out in a system of Example 3.

Figure 8:
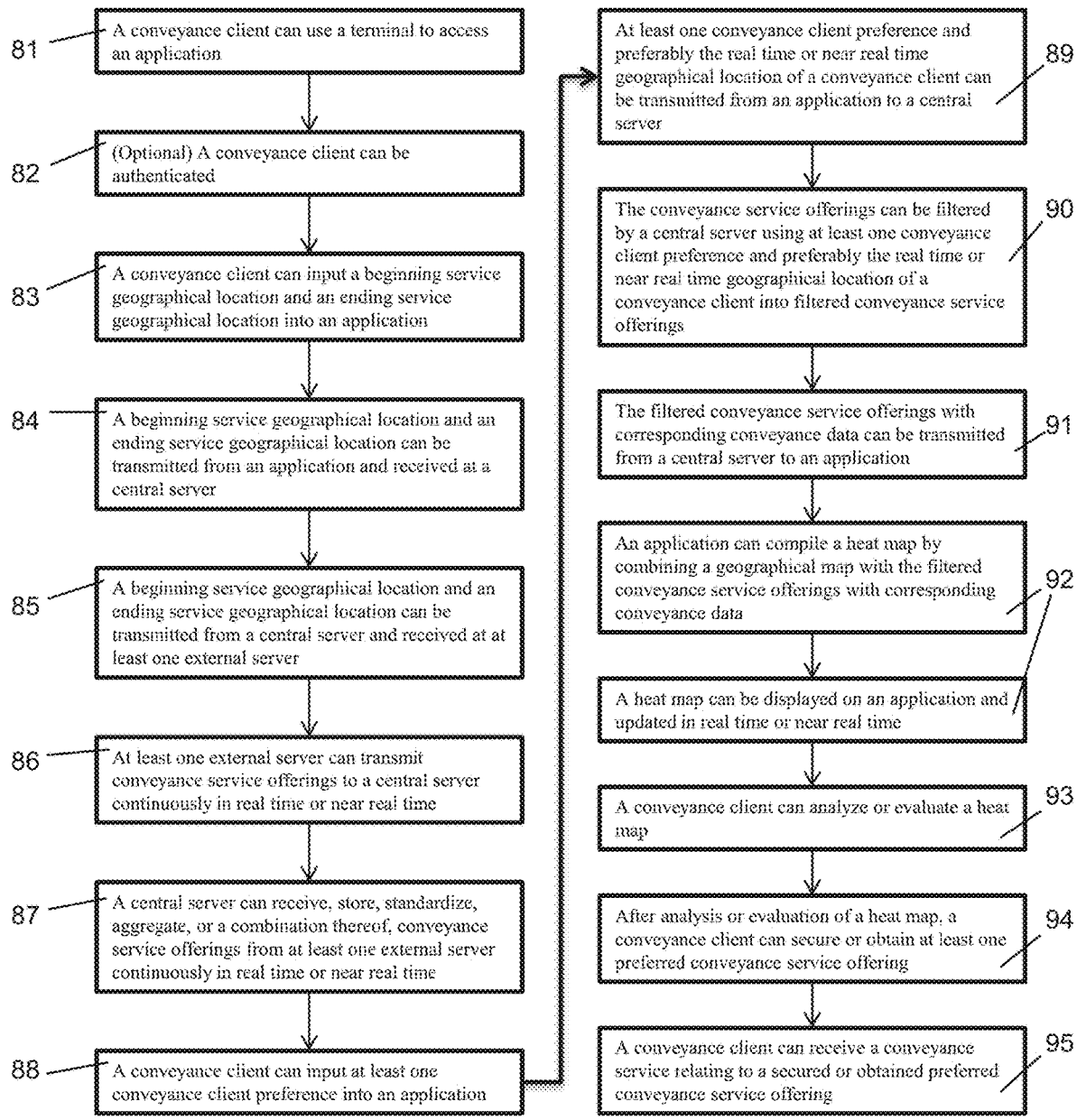
FIG. 8 is a flow diagram of steps according to an embodiment of the present invention that utilizes conveyance client preferences.

FIG. 8 provides as a flowchart of steps of an exemplary method in which a benefit is provided to a conveyance client 1. The flowchart describes steps of how a conveyance client 1 can secure or obtain a preferred conveyance service offering 18 by analyzing or evaluating a visual representation, in this example, a heat map 12. A link can be a connection or an association with a software function or a software component relating to an application 6, a terminal 7, a central server 9, an external server 10, or a combination thereof.

Referring to FIG. 8:

Step 81. A conveyance client can use a terminal to access an application.

Step 82. A conveyance client can be authenticated.

Step 83. A conveyance client can input or provide a beginning service geographical location and an ending service geographical location into an application.

Step 84. A beginning service geographical location and an ending service geographical location can be transmitted from an application to a central server by way of a link.

Step 85. A beginning service geographical location and an ending service geographical location can be transmitted from a central server to an external server by way of a link.

Step 86. A conveyance service offering can be transmitted from an external server to a central server continuously in real time or near real time by way of a link.

Step 87. A conveyance service offering can be stored, standardized, aggregated, or a combination thereof, at least once on a central server.

Step 88. A conveyance client can input or provide a conveyance client preference into an application.

Step 89. A conveyance client preference and preferably a real time or near real time geographical location of a conveyance client can be transmitted from an application to a central server by way of a link.

Step 90. A conveyance service offering can be filtered by a central server using a conveyance client preference and preferably a real time or near real time geographical location of a conveyance client into a filtered conveyance service offering.

Step 91. A filtered conveyance service offering can be transmitted from a central server to an application by way of a link.

Step 92. An application can compile a heat map by combining a geographical map with conveyance data relating to a filtered conveyance service offering and then preferably a heat map can be displayed on an application and updated in real time or near real time.

Step 93. A conveyance client can analyze or evaluate a heat map.

Step 94. After analysis or evaluation of a heat map, a conveyance client can secure or obtain a preferred conveyance service offering.

Step 95. A conveyance client can receive a conveyance service.

Using an example within the ride-hail industry segment and referring to FIGS. 6 and 7, a conveyance client 1 can be a passenger, a representative 2 can be a driver, and a preferred conveyance service offering 18 can be a ride service offering. A central server 9 can continuously receive conveyance service offerings 16 from preferably more than one external server 10 by way of a link 8 in real time or near real time and can store, standardize, and aggregate conveyance service offerings 16 in real time or near real time. A central server 9 can preferably sort filtered conveyance service offerings 17 in real time or near real time, or use another technique, to identify a preferred conveyance service offering 18. A conveyance client 1 can access an application 6 using a terminal 7 to gain knowledge of the ride-hail industry segment, such as current prices of conveyance service offerings 16. When a conveyance client 1 would like to receive a ride in the ride-hail industry segment, a conveyance client 1 would preferably login to an application 6 and can be authenticated.

Once logged into an application 6, a conveyance client 1 can input or provide a beginning service geographical location, an ending service geographical location, and a conveyance client preference 4 into an application 6. In this example, a conveyance client 1 can input or provide one conveyance client preference 4, a pricing preference. A pricing preference can be, e.g., a preference of elevated pricing of no more than 2× normal pricing for the cost of a conveyance service.

Preferably, this conveyance client preference 4 can enable a conveyance client 1 to analyze or evaluate a heat map 12 with filtered conveyance service offerings 17 that can be more desired by a conveyance client 1. Central server 9 can filter out conveyance service offerings 16 that do not match or satisfy the conveyance client preference 4 for a conveyance client 1. Benefits of conveyance client preferences 4 can be to allow a conveyance client 1 to better meet their criteria in receiving a conveyance service such as lower pricing, shorter wait time, shorter time to destination, more suitable conveyance service offerings 16, or a combination thereof. The conveyance client preference 4 for this example and preferably the real time or near real time geographical location of a conveyance client 1 can be transmitted to a central server 9 by way of a link 8.

A central server 9 can filter conveyance service offerings 16 into filtered conveyance service offerings 17 by comparing to a conveyance client preference 4 and preferably the real time or near real time geographical location of a conveyance client 1. Conveyance service offerings 16 that match the indicated two conveyance client preferences 4 can be identified as filtered conveyance service offerings 17. Conveyance service offerings 16 that do not match the indicated two conveyance client preferences 4 can be discarded or ignored as not being filtered conveyance service offerings 17. Preferably, additional conveyance service offerings 16 can be received and continuously filtered by a central server 9 into additional filtered conveyance service offerings 17.

Filtered conveyance service offerings 17 can be transmitted from a central server 9 to an application 6 by way of a link 8. An application 6 can then compile a heat map 12 displaying, e.g., elevated pricing metrics of filtered conveyance service offerings 17 as distinguishable shades of color on a heat map 12. A heat map 12 can be compiled on an application 6 by combining a geographical map relating to the real time or near real time geographical location of a conveyance client 1 with conveyance data relating to elevated pricing metrics of filtered conveyance service offerings 17. Conveyance data relating to the elevated pricing metrics of filtered conveyance service offerings 17 can be positioned on a heat map 12 relating to corresponding geographical locations contained therein. A heat map 12 can preferably be refreshed continuously in real time or near real time with updated conveyance data relating to the elevated pricing metrics of filtered conveyance service offerings 17.

A conveyance client 1 can then preferably visually analyze or evaluate a heat map 12 prior to securing or obtaining a filtered conveyance service offering 17 or a preferred conveyance service offering 18 after which the conveyance client receives the requested conveyance service.

In one example, service providers 5 #1 and #2 can display elevated pricing of 1.5× at the real time or near real time geographical location of a conveyance client 1. Service provider 5 #3 can display elevated pricing of 2× at the real time or near real time geographical location of a conveyance client 1 and elevated pricing of 1.8× one hundred yards east of the real time or near real time geographical location of a conveyance client 1. Conveyance client 1 can analyze or evaluate a heat map 12 and find that just two hundred feet north of the real time or near real time geographical location of a conveyance client 1, there is no elevated pricing for service provider 5 #1.

In this example, a conveyance client 1 chooses to walk from his or her current location north two hundred feet to secure or obtain the preferred conveyance service offering 18 with no elevated pricing from service provider 5 #1. A conveyance client 1 can receive a conveyance service from service provider 5 #1.

The application 6, central server 9, external server (s) 10, terminal 7, link 8, or a combination thereof, can be combined or integrated. The conveyance client 1 can utilize a visual representation that can display a heat map 12 on terminal 7 that can be integrated or associated with application 6, central server 9, external server(s) 10, link 8, or a combination thereof.

Figure 9:
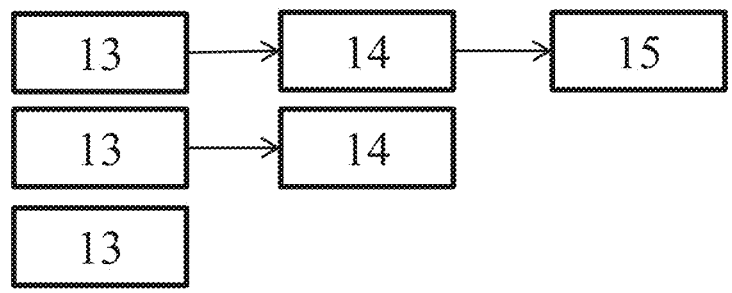
FIG. 9 is a flow diagram of a sample filtering process according to an embodiment of the present invention that utilizes representative preferences.

FIG. 9 provides a flowchart of the steps involved in an exemplary transformation of a conveyance service request 13 into a preferred conveyance service request 15 according to an embodiment of the invention.

Once a central server 9 receives a conveyance service request 13 from an external server 10, a central server 9 can filter a conveyance service request 13 using a representative preference 3 and preferably the real time or near real time geographical location of a representative 2 into a filtered conveyance service request 14. A central server 9 can calculate the weighted average of a representative preference 3. A central server 9 can preferably sort a filtered conveyance service request 14 in an order relating to the corresponding weighted averages to identify one or more preferred conveyance service request 15. A preferred conveyance service request 15 can be identified by a central server 9 as a filtered conveyance service request 14 that has the highest weighted average from a filtered conveyance service request 14. Not every conveyance service request 13 can become a filtered conveyance service request 14 and not every filtered conveyance service request 14 can become a preferred conveyance service request 15. One or more function of a central server 9 can be performed by an application 6. A link can be a connection or an association with a software function or a software component relating to an application 6, a terminal 7, a central server 9, an external server 10, or a combination thereof.

Figure 10:
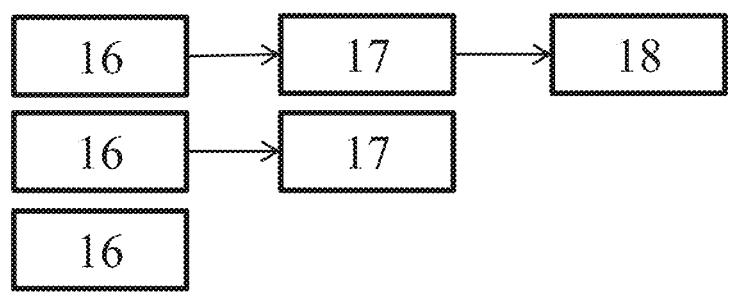
FIG. 10 is a flow diagram of a sample filtering process according to an embodiment of the present invention that utilizes conveyance client preferences.

FIG. 10 provides a flowchart of the steps involved in the transformation of a conveyance service offering 16 into a preferred conveyance service offering 18 according to an embodiment of the invention. Once a central server 9 receives a conveyance service offering 16 from an external server 10, a central server 9 can filter a conveyance service offering 16 using a conveyance client preference 4 and preferably the real time or near real time geographical location of a conveyance client 1 into a filtered conveyance service offering 17. A central server 9 can calculate the weighted average of a conveyance client preference 4. A central server 9 can preferably sort a filtered conveyance service offering 17 in an order relating to the corresponding weighted averages to identify a preferred conveyance service offering 18. A preferred conveyance service offering 18 can be identified by a central server 9 as one or more filtered conveyance service offering 17 that has the highest weighted average from a filtered conveyance service offering 17. Not every conveyance service offering 16 can become a filtered conveyance service offering 17 and not every filtered conveyance service offering 17 can become a preferred conveyance service offering 18. One or more function of a central server 9 can be performed by an application 6.

Example 5: Conveyance Client Maps

A fifth aspect of the present invention includes a real time or near real time method to assist a conveyance client in a process of securing or obtaining, within the conveyance industry, a preferred conveyance service offering relating to a conveyance client preference and a real time or near real time geographical location of the conveyance client by using a visual representation that may be generated in the system of Example 3.

Figure 11:
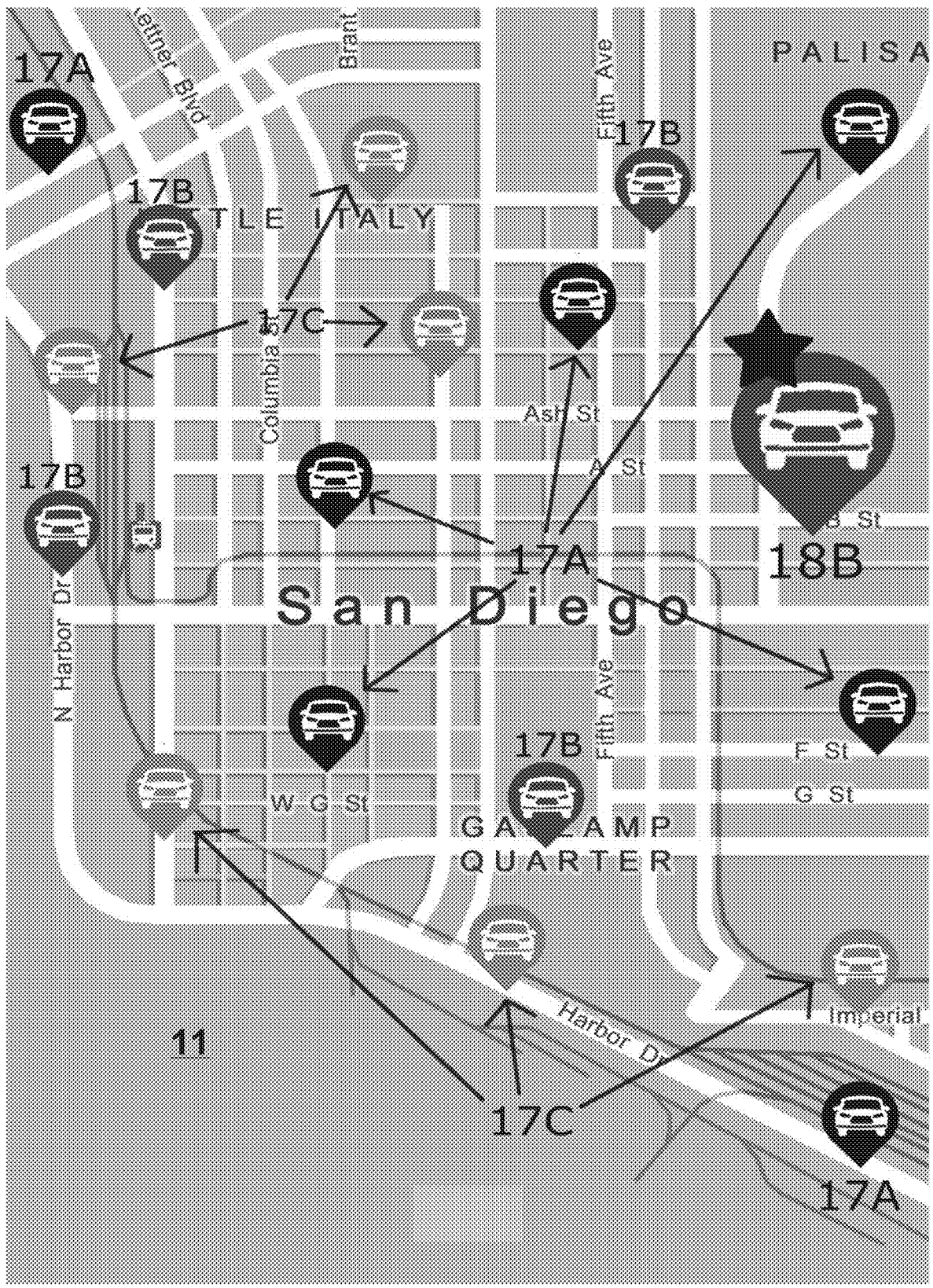
FIG. 11 is a sample display of a dynamic map according to an embodiment of the invention that utilizes conveyance client preferences.

FIG. 11 provides an example of a dynamic map that can be generated according to the system and method for use by the conveyance client to analyze or evaluate and then secure or obtain a preferred conveyance service offering 18B. The filtered conveyance service offerings 17A, 17B, and 17C and the preferred conveyance service offering 18B are associated with different service providers 5A, 5B, and 5C respectively.

The preferred conveyance service offering 18B can be visually identifiable compared to the filtered conveyance service offerings 17A, 17B, and 17C. In this figure, a star is used in addition to a larger icon to demonstrate the preferred conveyance service offering 18B as being visually identifiable. At least one different icon, symbol, color, shade, or visual can be used to identify individual filtered conveyance service offerings 17A, 17B, and 17C and the preferred conveyance service offering 18B that are from different service providers 5. In this figure, icons displaying a car are ride service offerings from the ride-hail industry segment. Each individual icon, symbol, color, shade, or visual can be mobile or dynamic and updated in real time or near real time on an application 6.

Figure 12:
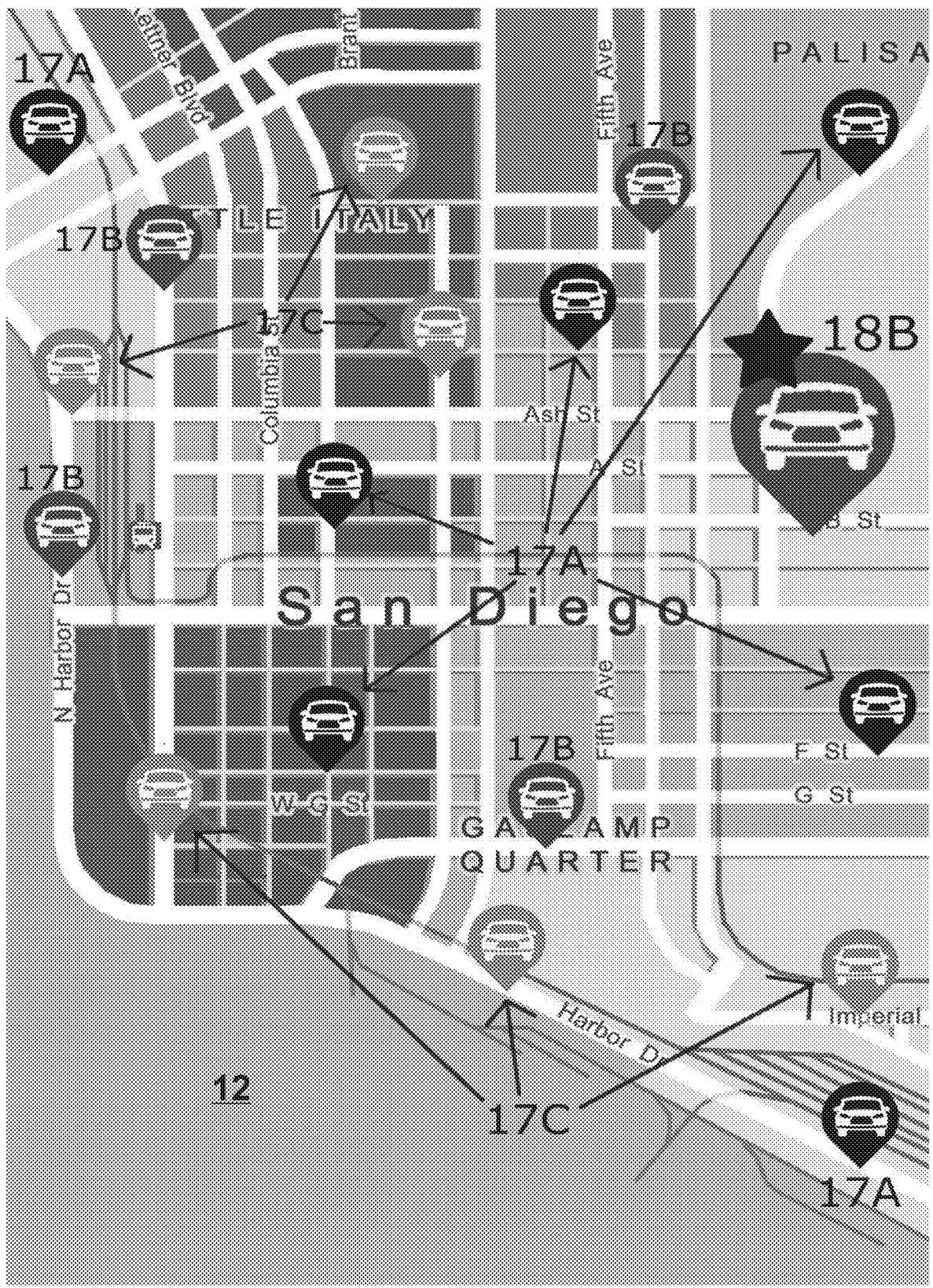
FIG. 12 provides a sample display of a combination of a dynamic map and a heat map according to an embodiment of the invention that utilizes conveyance client preferences.
Figure 13:
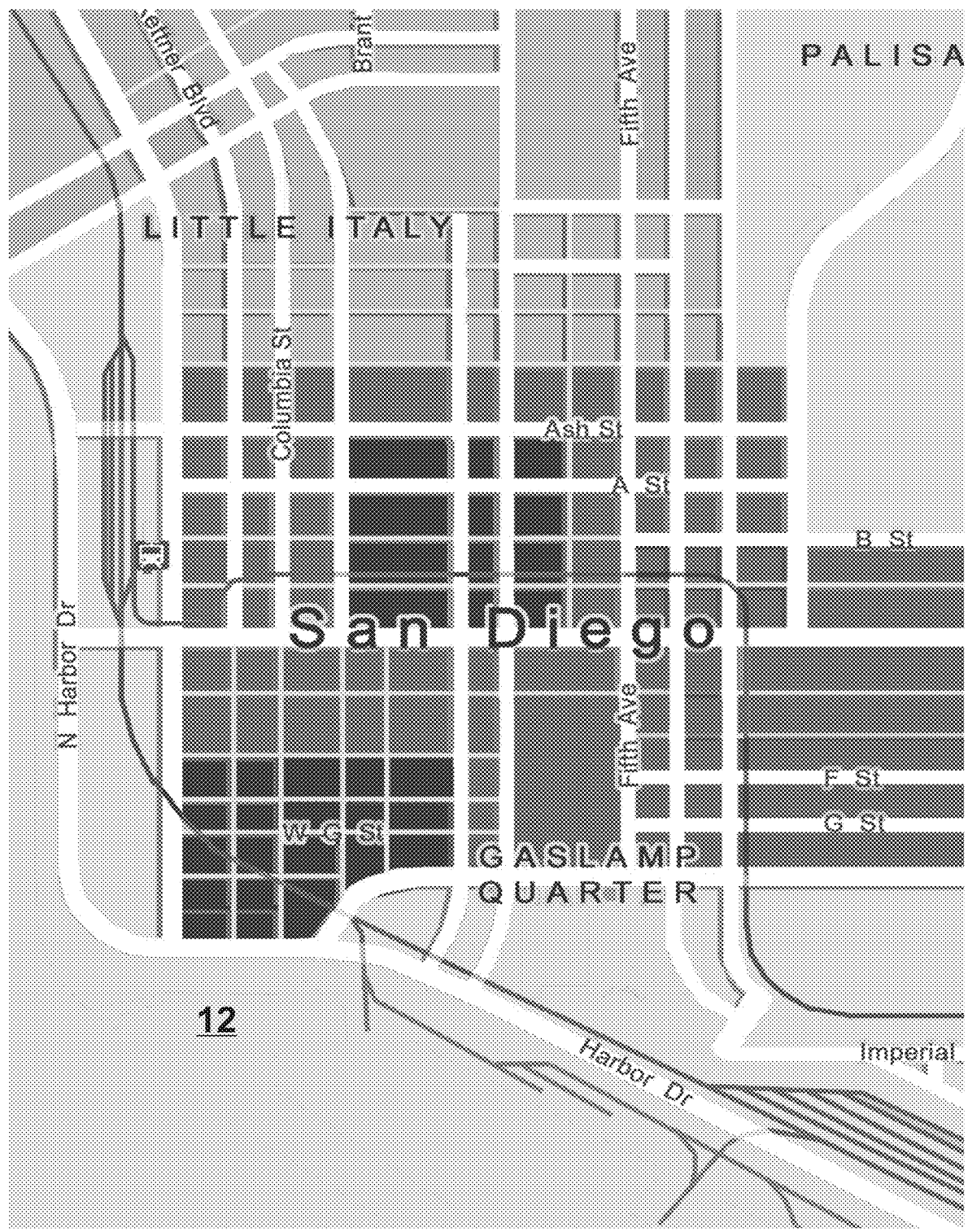
FIG. 13 provides a sample display of a combination of a dynamic map and a heat map according to an embodiment of the invention that utilizes representative preferences and conveyance client preferences.
Figure 14:
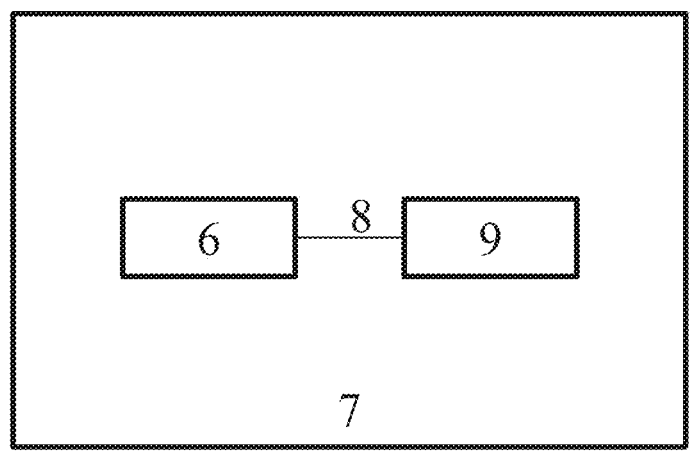
FIG. 14 is a schematic showing a sample integration of hardware and software according to an embodiment of the present invention.

FIG. 12 relates to a preferred example of one aspect of the present invention as a combination of a dynamic map 11 and a heat map 12 where a conveyance client 1 can benefit from the present invention. A combination of a dynamic map 11 and a heat map 12 can be used by the conveyance client 1 to analyze or evaluate on both a micro and macro level view of a conveyance industry segment and then secure or obtain the preferred conveyance service offering 18B. The filtered conveyance service offerings 17A, 17B, and 17C and the preferred conveyance service offering 18B are associated with different service providers 5A, 5B, and 5C respectively.

The preferred conveyance service offering 18B can be visually identifiable compared to the filtered conveyance service offerings 17A, 17B, and 17C. In this figure, a star is used in addition to a larger icon to demonstrate the preferred conveyance service offering 18B as being visually identifiable. At least one different icon, symbol, color, shade, or visual can be used to identify individual filtered conveyance service offerings 17A, 17B, and 17C and the preferred conveyance service offering 18B that are from different service providers 5. In this figure, icons displaying a car are ride service offerings from the ride-hail industry segment. Each individual icon, symbol, color, shade, or visual can be mobile or dynamic and updated in real time or near real time on an application 6.

The sample dynamic map shown in FIG. 12 displays filtered conveyance service offerings 17A, 17B, and 17C and the preferred conveyance service offering 18B in combination with a heat map showing areas with elevated pricing. Areas of the combination of a dynamic map and a heat map can be shaded or patterned in proportion to the measurement of an elevated pricing metric being displayed on a geographical map. Darker shaded areas can represent areas with higher elevated pricing whereas lighter shaded areas can represent areas with lower elevated pricing or potentially no elevated pricing. A conveyance client 1 can use this combination of a dynamic map and a heat map to analyze and identify areas of elevated pricing to position themselves in areas of lower pricing shown as lighter shaded areas. In this figure, the conveyance client 1 can walk to a lighter shaded area with lower pricing and then secure or obtain the preferred conveyance service offering 18B.

Example 6: Conveyance Client Maps

The following example illustrates the steps within the processing of conveyance service offerings 16 to provide filtered conveyance service offerings 17 and then a preferred conveyance service offering 18 using a system such as that shown in FIG. 7. A conveyance client 1 can be a passenger, a representative 2 can be a driver, and a preferred conveyance service offering 18 can be a ride service offering. In this example, a conveyance client 1 can use a dynamic map 11 to secure or obtain a preferred conveyance service offering 18.

A central server 9 can receive conveyance service offerings 16 from an external server 10 continuously or repeatedly in real time or near real time. A central server 9 can store, standardize, aggregate, or a combination thereof, conveyance service offerings 16 in any order. A conveyance client 1 can input or provide two conveyance client preferences 4, the real time or near real time geographical location of a conveyance client 1, or a combination thereof, to a central server 9.

A central server 9 can compare conveyance service offerings 16 to the real time or near real time geographical location of a conveyance client 1 and discard or ignore conveyance service offerings 16 that are not associated with selected service providers 5. A subset of conveyance service offerings 16 that match or satisfy a service provider inclusion preference can be identified as filtered conveyance service offerings 17.

A service provider inclusion preference can be given a weight of 40% by a conveyance client 1 and can be set to include only Company A and Company B. A filtered conveyance service offering 17 associated with Company A and Company B can be assigned a score of 10 out of 10 by a central server 9. A filtered conveyance service offering 17 not associated with Company A and Company B can be assigned a score of 0 out of 10 by a central server 9.

A pricing preference can be given a weight of 60% and can be set by a conveyance client 1 to include filtered conveyance service offerings 17 that cost less than $20.00. A filtered conveyance service offering 17 that costs more than $20.00 can be assigned a score of 0 out of 10 by a central server 9. A filtered conveyance service offering 17 that costs between $10.00-$20.00 can be assigned a score of 5 out of 10 by a central server 9. A filtered conveyance service offering 17 that costs less than $10.00 can be assigned a score of 10 out of 10 by a central server 9.

A filtered conveyance service offering 17 associated with Company A and costs $15.00 can be calculated or determined by a central server 9 as having a weighted average of (40% of 10) plus (60% of 5) that can equal 7 based on a service provider inclusion preference and a pricing preference. A filtered conveyance service offering 17 can preferably be sorted in a descending order relating to a weighted average of 7 in this instance and can be identified as a preferred conveyance service offering 18 in comparison to other filtered conveyance service offerings 17 with lower weighted averages.

A conveyance client 1 can analyze or evaluate a dynamic map such as the example shown in FIG. 11, and then secure or obtain a preferred conveyance service offering 18 relating to Company A and costs $15.00. A conveyance client 1 can receive a conveyance service provided by Company A.

Example 7: Representative Preferences

This example describes use of the inventive method and system by a representative who enters a representative preference to identify and secure or obtain a preferred conveyance service request. For purposes of this example, reference is made to FIGS. 1-3.

Using an example in a freight delivery industry segment, a conveyance client 1 can be a company that orders biohazardous material, a representative 2 can be a truck driver, and a preferred conveyance service request 15 can be a freight delivery service request.

A central server 9 can receive conveyance service requests 13 from an external server 10 continuously or repeatedly in real time or near real time and can pre-categorize conveyance service requests 13 by city. A central server 9 can store, standardize, aggregate, or a combination thereof, conveyance service requests 13 in any order. A representative 2 can input or provide one or more representative preference 3, the real time or near real time geographical location of a representative 2, or a combination thereof, to a central server 9.

A central server 9 can compare pre-categorized conveyance service requests 13 to the real time or near real time geographical location of a representative 2 and discard or ignore conveyance service requests 13 being in a different city other than a representative 2. A subset of conveyance service requests 13 within the city of a representative 2 that also matches or satisfies a freight preference can be identified as filtered conveyance service requests 14.

To illustrate, a freight preference can be given a weight of 100% and can be set to include only conveyance service requests 13 relating to conveying biohazardous materials. A filtered conveyance service request 14 relating to conveying biohazardous materials can be assigned a score of 10 out of 10 by a central server 9. A filtered conveyance service request 14 not relating to conveying biohazardous materials can be assigned a score of 0 out of 10 by a central server 9.

A filtered conveyance service request 14 in a freight delivery industry segment that relates to conveying biohazardous materials can be calculated or determined by a central server 9 as having a weighted average of (100% of 10) that can equal 10 based on a freight preference. A maximum function can be utilized to identify a filtered conveyance service request 14 having the highest weighted average in comparison to other filtered conveyance service requests 14 with lower weighted averages as a preferred conveyance service request 15. A representative 2 can secure or obtain the preferred conveyance service request 15.

Example 8: Conveyance Client Preferences

This example illustrates the use of the inventive system and method by a conveyance client who enters one or more conveyance client preference to identify and secure or obtain a preferred conveyance service offering. For purposes of this example, reference can be made to FIGS. 6-8.

In a sample application to a food delivery industry segment, a conveyance client 1 can be a person that can order food, a representative 2 can be a driver, and a preferred conveyance service offering 18 can be a food delivery service offering.

A central server 9 can receive conveyance service offerings 16 from an external server 10 continuously or repeatedly in real time or near real time and can pre-categorize conveyance service offerings 16 by zip code. A central server 9 can store, standardize, aggregate, or a combination thereof, conveyance service offerings 16 in any order. A conveyance client 1 can input or provide one conveyance client preference 4, the real time or near real time geographical location of a conveyance client 1, or a combination thereof, to a central server 9.

A central server 9 can compare pre-categorized conveyance service offerings 16 to the real time or near real time geographical location of a conveyance client 1 and discard or ignore conveyance service offerings 16 being in a different zip code area other than a conveyance client 1. A subset of conveyance service offerings 16 within the zip code area of a conveyance client 1 that also matches or satisfies an estimated time of arrival preference can be identified as filtered conveyance service offerings 17.

In this example, an estimated time of arrival preference can be given a weight of 100% and can be set to less than twenty minutes by a conveyance client 1. A filtered conveyance service offering 17 with an estimated time of arrival of more than twenty minutes can be assigned a score of 10 out of 10 by a central server 9. A filtered conveyance service offering 17 with an estimated time of arrival of less than or equal to twenty minutes can be assigned a score of 0.5 per minute by a central server 9. A filtered conveyance service offering 17 with an estimated time of arrival of fourteen minutes can be assigned a score of 7 out of 10 or a filtered conveyance service offering 17 with an estimated time of arrival of six minutes can be assigned a score of 3 out of 10.

A filtered conveyance service offering 17 in a food delivery industry segment with an estimated time of arrival of four minutes can be calculated or determined by a central server 9 as having a weighted average of (100% of 2) that can equal 2 based on an estimated time of arrival preference. A minimum function can be utilized to identify a filtered conveyance service offering 17 having the lowest weighted average in comparison to other filtered conveyance service offerings 17 with higher weighted averages as a preferred conveyance service offering 18. A conveyance client 1 can secure or obtain the preferred conveyance service offering 18.

The following description provides additional definitions, examples, and embodiments of aspects of the inventive system and method:

Standardizing Conveyance Service Offerings: Where all or some of the plurality of conveyance service offerings, the real time or near real time geographical location of the conveyance client, or a combination thereof, are structured in a different format, there are standardized or converted into a uniform format.

All or some of the plurality of conveyance service offerings may be structured in a uniform format prior to being transmitted from the external server to the central server by way of a link between the external server and the central server and are not standardized.

Transmitting Conveyance Client Preference and Geographical Location: An additional embodiment includes one in which the conveyance client preference, once inputted or provided into the application, is stored or cached on the application, the computer readable memory of the central server, or a combination thereof, and the conveyance client preference is not inputted or provided again into the application by the conveyance client.

An embodiment of the present invention includes, wherein the conveyance client preference is stored or cached in the computer readable memory of the central server and the conveyance client preference is not transmitted again from the application to the central server.

Another embodiment of the present invention includes, wherein the conveyance client preference, the real time or near real time geographical location of the conveyance client, or a combination thereof, is transmitted from the application to the central server at any time prior to filtering all or some of the plurality of conveyance service offerings.

Filtering Plurality of Conveyance Service Offerings: In one embodiment, all or some of the plurality of conveyance service offerings are filtered relating to the conveyance client preference and the real time or near real time geographical location of the conveyance client, to identify all or some of the plurality of filtered conveyance service offerings by a process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

Another embodiment of the present invention includes, wherein all or some of the plurality of conveyance service offerings are filtered in real time or near real time and the preferred conveyance service offering is identified in real time or near real time from all or some of the plurality of filtered conveyance service offerings on the application by transmitting in real time or near real time, all or some of the plurality of conveyance service offerings from the central server to the application by way of a link between the central server and the application; filtering in real time or near real time, all or some of the plurality of conveyance service offerings by using the conveyance client preference and the real time or near real time geographical location of the conveyance client, to identify all or some of the plurality of filtered conveyance service offerings; and identifying in real time or near real time, the preferred conveyance service offering from all or some of the plurality of filtered conveyance service offerings relating to the conveyance client preference.

A further embodiment of the present invention includes, wherein a different geographical location is used other than the real time or near real time geographical location of the conveyance client when filtering all or some of the plurality of conveyance service offerings.

Identifying Preferred Conveyance Service Offering(s): In one embodiment, the preferred conveyance service offering relating to the conveyance client preference is identified from all or some of the plurality of filtered conveyance service offerings by using one or more of a sorting algorithm, a selection algorithm, a search algorithm, a merge algorithm, a maximum function, a minimum function, a graph algorithm, a graph search algorithm, a tree algorithm, a tree search algorithm, a matrix calculation, a matrix algorithm, a comparison, or a combination thereof.

In another embodiment the preferred conveyance service offering is identified from all or some of the plurality of filtered conveyance service offerings relating to a weighted average of the conveyance client preference.

In some embodiments, the visual representation may be compiled on the central server and transmitted to the application by way of a link between the central server and the application.

The visual representation may be displayed on one or more remote display and may include a dynamic map, a heat map, or a combination thereof. The conveyance client utilizes the visual representation to secure or obtain the preferred conveyance service offering in real time or near real time, related to the conveyance client preference, the real time or near real time geographical location of the conveyance client, or a combination thereof.

Another embodiment of the present invention includes, wherein the conveyance client preference is displayed as an icon or visual with or on the visual representation, to allow the conveyance client to analyze or evaluate all or some of the plurality of filtered conveyance service offerings, the preferred conveyance service offering, or a combination thereof, and secure or obtain the preferred conveyance service offering relating to a service provider or a good supplier operating in a conveyance industry segment.

Another embodiment of the present invention includes, wherein the preferred conveyance service offering, the conveyance client preference, or a combination thereof, is displayed in a visually identifiable format compared to all or some of the plurality of filtered conveyance service offerings relating to a service provider or a good supplier operating in a conveyance industry segment.

An additional embodiment of the present invention includes, wherein the dynamic map includes the geographical map that displays in real time or near real time, all or some of the plurality of filtered conveyance service offerings, the preferred conveyance service offering, the conveyance client preference, or a combination thereof.

An embodiment of the present invention includes, wherein all or some of the plurality of filtered conveyance service offerings, the preferred conveyance service offering, the conveyance client preference, or a combination thereof, relating to a service provider or a good supplier operating in a conveyance industry segment, is displayed individually as a mobile or transitory icon or a mobile or transitory visual and updates or changes in real time or near real time.

An embodiment of the present invention includes, wherein all or some of the plurality of filtered conveyance service offerings, the preferred conveyance service offering, the conveyance client preference, or a combination thereof, relating to an individual service provider or an individual good supplier operating in a conveyance industry segment, is displayed as a distinguishable icon or visual and updates or changes in real time or near real time.

An embodiment of the present invention includes, wherein all or some of the plurality of filtered conveyance service offerings, the preferred conveyance service offering, the conveyance client preference, the conveyance client preference, or a combination thereof, relating to an individual service provider or an individual good supplier operating in a conveyance industry segment, is displayed as an icon or visual and updates or changes in real time or near real time.

An embodiment of the present invention includes, wherein all or some of the plurality of filtered conveyance service offerings, the preferred conveyance service offering, the conveyance client preference, or a combination thereof, relating to an individual service provider or an individual good supplier is displayed as or with one or more of a different icon, symbol, color, shading, pattern, visual, or a combination thereof.

An embodiment of the present invention includes, wherein all or some of the plurality of filtered conveyance service offerings, the preferred conveyance service offering, the conveyance client preference, or a combination thereof, relating to an individual service provider or an individual good supplier is displayed as or with one or more of a similar icon, symbol, color, shading, pattern, visual, or a combination thereof.

An embodiment of the present invention includes, wherein the conveyance client updates, modifies, or changes the conveyance client preference and the dynamic map displays in real time or near real time, all or some of the plurality of filtered conveyance service offerings, the preferred conveyance service offering, the conveyance client preference, or a combination thereof, based on the updated, modified, or changed the conveyance client preference.

Another embodiment of the present invention includes, wherein the heat map includes the geographical map that displays a visual depiction of one or more statistical variable of all or some of the plurality of conveyance service offerings; all or some of the plurality of filtered conveyance service offerings; all or some of the preferred conveyance service offering; the conveyance client preference; or a combination thereof.

A further embodiment of the present invention includes, wherein the statistical variable includes one or more of a measurement of conveyance service availability, pricing, elevated pricing, conveyance service offering density, filtered conveyance service offering density, preferred conveyance service offering density, preferred good supplier density, a preferred conveyance industry segment, conveyance industry segment density, level of service density, a conveyance service distance, an estimated time of arrival, preferred representative density, representative density, conveyance client density, service provider density, good supplier density, or a combination thereof.

Another embodiment of the present invention includes, wherein an area of the heat map is distinguished in proportion to a measurement of the statistical variable and displayed as having one or more of a distinguishable hue, shade, saturation, opacity, color, color value, pattern, fill, shape, image, animation, or a combination thereof.

An additional embodiment of the present invention includes, wherein the preferred conveyance service offering is not identified prior to compiling the heat map, a real time or near real time heat map, a historical heat map, a predictive heat map, or a combination thereof.

An embodiment of the present invention includes, wherein a real time or near real time heat map is compiled from the statistical variable of all or some of the plurality of conveyance service offerings, all or some of the plurality of filtered conveyance service offerings, all or some of the preferred conveyance service offering, the conveyance client preference, or a combination thereof.

Another embodiment of the present invention includes, wherein a historical heat map is compiled from the statistical variable of all or some of past the plurality of conveyance service offerings, all or some of past the plurality of filtered conveyance service offerings, all or some of past the preferred conveyance service offering, the conveyance client preference, or a combination thereof.

A further embodiment of the present invention includes, wherein a predictive heat map is compiled from the statistical variable of all or some of past the plurality of conveyance service offerings, all or some of past the plurality of filtered conveyance service offerings, all or some of past the preferred conveyance service offering, all or some of the plurality of conveyance service offerings, all or some of the plurality of filtered conveyance service offerings, all or some of the preferred conveyance service offering, the conveyance client preference, or a combination thereof.

An additional embodiment of the present invention includes, wherein the predictive heat map identifies or estimates one or more of future conveyance service availability, future pricing, future elevated pricing, future conveyance service offering density, future filtered conveyance service offering density, future preferred conveyance service offering density, future level of service density, future conveyance industry segment density, future representative density, future conveyance client density, future service provider density, future good supplier density, future level of service supply, future conveyance industry segment supply, future conveyance service supply, future service provider supply, future good supplier supply, future conveyance service demand, future conveyance client demand, or a combination thereof.

An embodiment of the present invention includes, wherein the predictive heat map generates a visual notification or an audio notification to notify the conveyance client of a future change or update to the statistical variable, the measurement of the statistical variable, or a combination thereof.

An embodiment of the present invention includes, wherein a function of the central server or the external server is performed by the application. In another embodiment, the application operates on the central server. In still another embodiment, a function of the application is performed by the central server or the external server(s).

An additional embodiment of the present invention includes, wherein the conveyance client, the central server, the application, or a combination thereof, secures or obtains the preferred conveyance service offering in a conveyance industry segment.

An embodiment of the present invention includes, wherein all or some of the plurality of conveyance service offerings are sourced or provided by a service provider or a good supplier operating in a conveyance industry segment.

Another embodiment of the present invention includes, wherein the conveyance client secures or obtains more than one the representatives or more than one the autonomous vehicles for the preferred conveyance service offering.

A further embodiment of the present invention includes, wherein the conveyance client secures or obtains the filtered conveyance service offering other than the preferred conveyance service offering.

An additional embodiment of the present invention includes, wherein the preferred conveyance service offering, all or some of the plurality of filtered conveyance service offerings, all or some of the plurality of conveyance service offerings, all or some of subsequent or additional the plurality of filtered conveyance service offerings, all or some of subsequent or additional the preferred conveyance service offering, all or some of the real time or near real time geographical location of the conveyance client, the conveyance client preference, the beginning service geographical location, the ending service geographical location, or a combination thereof, is identified or updated in real time or near real time as the real time or near real time geographical location of the conveyance client updates or changes or as traffic information updates or changes.

An embodiment of the present invention includes, wherein the plurality of conveyance service offerings is a single conveyance service offering.

Another embodiment of the present invention includes, wherein the plurality of filtered conveyance service offerings is a single filtered conveyance service offering.

A further embodiment of the present invention includes, wherein the conveyance client browses or navigates an area of the visual representation to identify and then secure or obtain the preferred conveyance service offering or the filtered conveyance service offering by selecting or accepting the preferred conveyance service offering, the filtered conveyance service offering, the conveyance client preference, or a combination thereof.

Another embodiment of the present invention includes, wherein the central server is located on or associated with the terminal.

Another embodiment of the present invention includes, wherein the application, the terminal, the central server, the external server, a link, or a combination thereof, is combined or integrated.

Another embodiment of the present invention includes, wherein the beginning service geographical location, the ending service geographical location, the conveyance client preference, or a combination thereof, is provided prior to receiving all or some of the plurality of conveyance service offerings on or at the central server.

Another embodiment of the present invention includes, herein the preferred conveyance service offering, all or some of the plurality of filtered conveyance service offerings, all or some of the plurality of conveyance service offerings, all or some of the real time or near real time geographical location of the conveyance client, the conveyance client preference, all or some of subsequent or additional the plurality of filtered conveyance service offerings, all or some of subsequent or additional the preferred conveyance service offering, a secured or obtained preferred conveyance service offering, the beginning service geographical location, the ending service geographical location, or a combination thereof, is transmitted in real time or near real time between the application and the central server and updated in real time or near real time by way of a link between the application and the central server.

Another embodiment of the present invention includes, wherein the preferred conveyance service offering, all or some of the plurality of filtered conveyance service offerings, all or some of the plurality of conveyance service offerings, all or some of the real time or near real time geographical location of the conveyance client, the conveyance client preference, all or some of subsequent or additional the plurality of filtered conveyance service offerings, all or some of subsequent or additional the preferred conveyance service offering, a secured or obtained preferred conveyance service offering, the beginning service geographical location, the ending service geographical location, or a combination thereof, is transmitted in real time or near real time between the application and the external server and updated in real time or near real time by way of a link between the application and the external server.

Another embodiment of the present invention includes, wherein the preferred conveyance service offering, all or some of the plurality of filtered conveyance service offerings, all or some of the plurality of conveyance service offerings, all or some of the real time or near real time geographical location of the conveyance client, the conveyance client preference, all or some of subsequent or additional the plurality of filtered conveyance service offerings, all or some of subsequent or additional the preferred conveyance service offering, a secured or obtained preferred conveyance service offering, the beginning service geographical location, the ending service geographical location, or a combination thereof, is transmitted in real time or near real time between the central server and the external server and updated in real time or near real time by way of a link between the central server and the external server.

The following provides further definitions and examples of terms and concepts used herein:

Near Real Time: The following are illustrative, non-limiting examples of "near-real time" as used in the invention disclosure:

Near real time can pertain to a delay introduced, by automated data processing, between an occurrence of an event and use of the processed data. Near real time can refer to the timeliness of data or information, which can be delayed by the time required for electronic communication and automatic data processing. Near real time can imply no significant delays. Near real time can refer to the highest level of development or state of the art.

Near real time can be in or similar to real time. Near real time can depict an event or a situation as it existed at the current time less the processing time. A function of a system, a method, or a combination thereof, can be performed in real time or near real time. A real time or near real time geographical location of an autonomous vehicle can be updated in real time or near real time. A real time or near real time geographical location of a conveyance client can be updated in real time or near real time. A real time or near real time geographical location of a representative can be updated in real time or near real time.

Conveyance Client: The following are illustrative, non-limiting examples of a "conveyance client" as used in the present disclosure:

A conveyance client includes one or more of a person, an entity, a robot, a machine, or a combination thereof, that can analyze or evaluate and then secure or obtain a preferred conveyance service offering. A conveyance client does not have to be a consumer of a conveyance service. A conveyance client can secure or obtain a conveyance service offering for one or more of another person, another machine, another conveyance client, or a combination thereof. A conveyance client or a consumer of a service can receive or request a conveyance service.

A conveyance client can input or provide a conveyance client preference to be used to filter a conveyance service offering. A conveyance client can input or provide a conveyance client preference used to identify one or more of a preferred conveyance service offering, a filtered conveyance service offering, or a combination thereof. A conveyance client can perform a function in real time or near real time being updated or refreshed in the highest level of development or state of the art.

A conveyance client can secure or obtain a preferred conveyance service offering via one or more of a terminal, an application, a central server, an external server, or a combination thereof. A conveyance client can secure or obtain a conveyance service offering, a filtered conveyance service offering, a preferred conveyance service offering, or a combination thereof, relating to a service provider in a conveyance industry segment.

A conveyance client can input or generate a conveyance service request, which can become a filtered conveyance service request and/or a preferred conveyance service request for or with one or more of a representative, an autonomous vehicle, an owner or controller of an autonomous vehicle, a service provider, a good supplier, a fleet manager, a logistics provider, a logistics supplier, a map provider, a third party, or a combination thereof.

To provide a few examples, a conveyance client can secure or obtain a filtered conveyance service offering other than a preferred conveyance service offering. A conveyance client can be a digital personal assistant or a machine, capable of securing or obtaining a preferred conveyance service offering. A conveyance client can be a passenger in the ride-hail industry segment. A conveyance client can be a consumer of a good in the food delivery industry segment. A conveyance client can be a consumer of freight in the freight delivery industry segment. A conveyance client can use a scooter or a bicycle. A conveyance client can secure or obtain a conveyance service offering, a filtered conveyance service offering, a preferred conveyance service offering, or a combination thereof, relating to an individual service provider in an individual conveyance industry segment.

A conveyance client can use a visual representation such as a dynamic map, a heat map, or a combination thereof, to analyze or evaluate and then secure or obtain a preferred conveyance service offering. A conveyance client can secure or obtain more than one representative or more than one autonomous vehicle for a preferred conveyance service offering. A conveyance client can utilize or perform a function of a visual representation the same or similar as a representative.

Service Provider: The following are illustrative, non-limiting examples of a "service provider" as used in the present disclosure:

A service provider can be an entity or business that can retain or contract with one or more of a representative, an autonomous vehicle, an owner or controller of an autonomous vehicle, a good supplier, a fleet manager, a logistics provider, a logistics supplier, a map provider, a third party, or a combination thereof, to provide a conveyance service. A service provider can facilitate a conveyance service between a representative, an autonomous vehicle, an owner or controller of an autonomous vehicle, a good supplier, a fleet manager, a conveyance client, a logistics provider, a logistics supplier, a map provider, a third party, or a combination thereof. A service provider can be an entity or business that can provide or perform a service, a delivery service, or a combination thereof.

A service provider, via one or more external server, can be a source or provider of some or all conveyance service requests with corresponding conveyance data, all or some conveyance service offerings with corresponding conveyance data, or a combination thereof, relating to a conveyance industry segment. A service provider can use a central server, an external server, an application, or a combination thereof, to facilitate and perform a conveyance service.

A service provider can operate in one or more conveyance industry segment. A service provider can independently control or operate a conveyance network of one or more of a representative, an autonomous vehicle, a good supplier, a map provider, a third party, a conveyance client, or a combination thereof. A service provider can utilize Information Technology infrastructure relating to one or more of a service provider, a good supplier, an owner or controller of an autonomous vehicle, a fleet manager, a logistics provider, a logistics supplier, a map provider, a third party, or a combination thereof. A service provider can perform a function in real time or near real time being updated or refreshed in the highest level of development or state of the art. A service provider can accept or decline a preferred conveyance service request or a preferred conveyance service offering.

A service provider can use a visual representation, a dynamic map, a heat map, or a combination thereof, to facilitate, operate, or manage a conveyance service. A service provider can use a visual representation, a dynamic map, a heat map, or a combination thereof, to facilitate, operate, or manage a conveyance service for a conveyance client or a representative. A service provider can use a visual representation, a dynamic map, a heat map, or a combination thereof, as a tool for a conveyance client or a representative to secure or obtain a preferred conveyance service offering or a preferred conveyance service request. A map provider can use a visual representation, a dynamic map, a heat map, or a combination thereof, to facilitate, operate, or manage a conveyance service for a service provider operating in a conveyance industry segment.

A service provider can own, operate, or control an autonomous vehicle. A service provider can operate, own, or control an autonomous vehicle on behalf of a third party. A service provider can optionally be perceived or referred to as an owner or controller of an autonomous vehicle. A service provider can operate, own, or control a network to facilitate a conveyance service in a conveyance industry segment. A service provider can operate, own, or control an autonomous vehicle, a representative, or a combination thereof, on a network. A service provider can operate, own, or control an autonomous vehicle, a representative, or a combination thereof, on another network. A service provider can operate, own, or control an autonomous vehicle, a representative, or a combination thereof, on behalf of a third party on a network.

To provide further examples, a service provider can be a vehicle that can have or utilize a designated locker, or the like, that can be a good supplier or an autonomous vehicle. A service provider can be a vehicle that can have or utilize a compartment or the like, that can be a mobile good supplier, a mobile autonomous vehicle, a mobile store front, a last mile delivery vehicle, a mobile logistics provider, a mobile logistics supplier, or a combination thereof.

Further examples of service providers include a rideshare service controller, a ride-hail service controller, a car-share service controller, a taxi service controller, a shuttle service controller, a person delivery service controller, a food delivery service controller, a good delivery service controller, an animal delivery service controller, a medical service and delivery controller, a courier service controller, an item delivery service controller, a freight delivery service controller, a peer-to-peer conveyance service controller, a delivery service controller, a transportation service controller, or a combination thereof.

A service provider can be perceived or referred to as a representative when utilizing an autonomous vehicle. A provider can be perceived or referred to as an autonomous vehicle, a representative, a good supplier, a fleet manager, an owner or controller of an autonomous vehicle, a logistics provider, a logistics supplier, a map provider, a third party, or a combination thereof.

A service provider can operate in an individual conveyance industry segment. A service provider can be a source or provider of one or more conveyance service request(s), conveyance service offering(s), real time or near real time geographical location(s) of a representative, real time or near real time geographical location(s) of a conveyance client, conveyance data relating to an autonomous vehicle, real time or near real time geographical location of an autonomous vehicle, or a combination thereof. A service provider can provide a scooter service or a bicycle service.

Providing further illustrative examples, a service provider can have or utilize an API that can provide all or some conveyance service requests, all or some conveyance service offerings, all or some of real time or near real time geographical location of a representative, all or some of real time or near real time geographical location of a conveyance client, all or some of conveyance data relating to an autonomous vehicle, all or some of real time or near real time geographical location of an autonomous vehicle, or a combination thereof. A service provider can have or generate all or some of conveyance data.

A service provider can operate or control an autonomous vehicle for or on behalf of an OEM or an auto manufacturer to provide a conveyance service. A service provider can control or operate an autonomous vehicle or a fleet of autonomous vehicles for or on behalf of an OEM on a network that can operate in a conveyance industry segment. A service provider can utilize one or more external server for or with a conveyance industry segment. A service provider can lease or sublease an autonomous vehicle. A service provider can lease or sublease a fleet of autonomous vehicles. A service provider can lease or sublease an autonomous vehicle or a fleet of autonomous vehicles from a third party.

A service provider can have a conveyance service request displayed on a visual representation that can be provided by a map provider or a map provider application. A service provider can have a conveyance service offering displayed on a visual representation that can be provided by a map provider or a map provider application.

Good Supplier: The following are illustrative, non-limiting examples of a "good supplier" as used in the present disclosure:

A good supplier can be an entity or a business that can provide or supply a good, an article, a thing, an item, or a combination thereof, to be conveyed in a conveyance service. A good supplier can be an entity or a business that provides or supplies a service, a delivery service, or a combination thereof.

A good supplier can be an entity or a business that can retain or contract with one or more of a representative, an autonomous vehicle, an owner or a controller of an autonomous vehicle, a service provider, a fleet manager, a logistics provider, a logistics supplier, a map provider, a third party, or a combination thereof, to provide a conveyance service. A good supplier can facilitate a conveyance service between one or more of a representative, an autonomous vehicle, an owner or a controller of an autonomous vehicle, a service provider, a fleet manager, a logistics provider, a logistics supplier, a conveyance client, a map provider, a third party, or a combination thereof.

A good supplier can utilize an external server that can be a source or a provider of a conveyance service request with corresponding conveyance data, a conveyance service offering with corresponding conveyance data, or a combination thereof, relating to a conveyance industry segment. A good supplier can use one or more of a central server, an external server, an application, or a combination thereof, to facilitate and perform a conveyance service.

A good supplier can operate in a conveyance industry segment. A good supplier can operate for or with a service provider or the like. A good supplier can independently control or operate one or more of a conveyance network of a representative, an autonomous vehicle, a good supplier, a map provider, a third party, a conveyance client, or a combination thereof. A good supplier can utilize Information Technology infrastructure relating to one or more of a good supplier, a service provider, an owner or a controller of an autonomous vehicle, a fleet manager, a logistics provider, a logistics supplier, a map provider, a third party, or a combination thereof. A good supplier can perform a function in real time or near real time being updated or refreshed in the highest level of development or state of the art. A good supplier can accept or decline a preferred conveyance service request or a preferred conveyance service offering.

A good supplier can use a visual representation, a dynamic map, a heat map, or a combination thereof, to facilitate, operate, or manage a conveyance service. A good supplier can use a visual representation, a dynamic map, a heat map, or a combination thereof, to facilitate, operate, or manage a conveyance service for a conveyance client or a representative. A good supplier can use a visual representation, a dynamic map, a heat map, or a combination thereof, as a tool for a conveyance client or a representative to secure or obtain a preferred conveyance service offering or a preferred conveyance service request. A map provider can use a visual representation, a dynamic map, a heat map, or a combination thereof, to facilitate, operate, or manage a conveyance service for a good supplier operating in a conveyance industry segment.

A good supplier can operate, own, or control an autonomous vehicle. A good supplier can operate, own, or control an autonomous vehicle on behalf of a third party. A good supplier can operate, own, or control a network to facilitate a conveyance service in a conveyance industry segment. A good supplier can operate, own, or control an autonomous vehicle on a network. A good supplier can operate, own, or control an autonomous vehicle on another network. A good supplier can operate, own, or control an autonomous vehicle on behalf of a third party on a network.

A good supplier can be a vehicle that can have or utilize a designated locker, or the like, that can be a service provider or an autonomous vehicle. A good supplier can be a vehicle that can have or utilize a compartment, or the like, that can be a mobile service provider, a mobile autonomous vehicle, a mobile store front, a last mile delivery vehicle, a mobile logistics provider, a mobile logistics supplier, or a combination thereof.

A good supplier can be a food delivery service controller, a good delivery service controller, an animal delivery service controller, a medical service and delivery controller, a courier service controller, an item delivery service controller, a freight delivery service controller, a peer-to-peer conveyance service controller, a delivery service controller, a transportation service controller, or a combination thereof.

A good supplier can be perceived or referred to as a service provider. A good supplier can optionally be perceived or referred to as an autonomous vehicle, a representative, a service provider, a fleet manager, an owner or a controller of an autonomous vehicle, a logistics provider, a logistics supplier, a map provider, at least on third party, or a combination thereof.

A good supplier can be a food truck. A good supplier can be an entity that produces or supplies freight. A good supplier can provide or perform a conveyance service relating to a food item. A good supplier can operate in an individual conveyance industry segment. A good supplier can operate for an individual service provider. A good supplier can be a source or a provider of a conveyance service request, a conveyance service offering, a real time or near real time geographical location of a representative, a real time or near real time geographical location of a conveyance client, all or some of conveyance data relating to an autonomous vehicle, a real time or near real time geographical location of an autonomous vehicle, or a combination thereof.

A good supplier can optionally retain and/or contract with a representative, an autonomous vehicle, or a combination thereof. A good supplier can use one or more of a central server, an external server, an application, or a combination thereof, to facilitate a conveyance service.

A good supplier can have or utilize an API that can provide all or some of a conveyance service request, all or some of a conveyance service offering, all or some of a real time or near real time geographical location of a representative, all or some of a real time or near real time geographical location of a conveyance client, all or some of conveyance data relating to an autonomous vehicle, all or some of a real time or near real time geographical location of an autonomous vehicle, or a combination thereof. A good supplier can have or generate all or some of conveyance data.

A good supplier can utilize an external server for or with a conveyance industry segment. A good supplier can lease or sublease an autonomous vehicle. A good supplier can lease or sublease a fleet of an autonomous vehicle. A good supplier can lease or sublease an autonomous vehicle or a fleet of an autonomous vehicle from a third party.

A good supplier can have a conveyance service request displayed on a visual representation that can be provided by a map provider or a map provider application. A good supplier can have a conveyance service offering displayed on a visual representation that can be provided by a map provider or a map provider application.

Representative: The following are illustrative, non-limiting examples of a "representative" as used in the present disclosure:

A representative can be a person, an entity, a robot, a machine, or the like, that can secure or obtain a preferred conveyance service request, a filtered conveyance service request, a conveyance service request, or a combination thereof. A representative can provide or perform a conveyance service of one or more of a person, a good, an article, a thing, an item, a conveyance client, or a combination thereof. A representative can be retained by or contracted with a service provider, a good supplier, an owner or a controller of an autonomous vehicle, a fleet manager, a logistics provider, a logistics supplier, or a combination thereof. A representative can be an entity or a person that can provide or perform a service, a delivery service, or a combination thereof. A representative can own, operate, or control an autonomous vehicle.

A representative can, at any time, sign on and/or sign off of one or more of a service provider network, an owner or a controller of an autonomous vehicle network, a fleet manager network, a logistics provider network, a logistics supplier network, an application, a central server, an external server, or a combination thereof. A representative can sign in to one or more of a service provider network, an owner or a controller of an autonomous vehicle network, a fleet manager network, a logistics provider network, a logistics supplier network, a central server, an external server, or a combination thereof. Once a beginning service geographical location, an ending service geographical location, pricing information, or a combination thereof, is known, a conveyance service offering relating to a representative can be generated.

A representative can input or provide a representative preference to be used to filter a conveyance service request. A representative can input or provide a representative preference used to identify one or more of a preferred conveyance service request, a filtered conveyance service request, or a combination thereof.

A representative can use an application to access a service provider network, a good supplier network, an owner or a controller of an autonomous vehicle network, a fleet manager network, a logistics provider network, a logistics supplier network, or a combination thereof, via including a terminal, a central server, an external server, an application, or a combination thereof, to facilitate a conveyance service. A representative can provide a conveyance service in a conveyance industry segment. A representative can provide a conveyance service for a service provider, a good supplier, an owner or a controller of an autonomous vehicle, a fleet manager, a logistics provider, a logistics supplier, or a combination thereof. A representative can use Information Technology infrastructure relating to one or more of a service provider, a good supplier, an owner or a controller of an autonomous vehicle, a fleet manager, a logistics provider, a logistics supplier, or a combination thereof. A representative can perform a function in real time or near real time being updated or refreshed in the highest level of development or state of the art.

A representative can secure or obtain a filtered conveyance service request other than a preferred conveyance service request. A representative can secure or obtain a preferred conveyance service request using an application, a central server, an external server, or a combination thereof. A representative can use a visual representation such as a dynamic map, a heat map, or a combination thereof, to analyze or evaluate and then secure or obtain a preferred conveyance service request.

A representative can be perceived or referred to as a service provider or the like when utilizing an autonomous vehicle. A representative can be perceived or referred to as an owner or a controller of an autonomous vehicle or the like when utilizing an autonomous vehicle. A representative can be perceived or referred to as an autonomous vehicle, an owner or a controller of an autonomous vehicle, a service provider, a good supplier, a fleet manager, a logistics provider, a logistics supplier, a third party, or a combination thereof. A representative can use an autonomous vehicle to perform a conveyance service. A representative can be perceived or referred to as a good supplier or the like when utilizing an autonomous vehicle. A representative can use a scooter or a bicycle.

A representative can be an independent third party. A representative can be an independent contractor. In the ride-hail/ride-share industry segment, a representative can be a driver. In the food delivery industry segment, a representative can be a driver picking up a food item and dropping a food item off to a conveyance client. In the courier industry segment, a representative can be a person picking up and dropping off a good, a thing, an article, or a combination thereof. A representative can provide a conveyance service in an individual conveyance industry segment. A representative can provide a conveyance service for an individual service provider.

A representative can utilize or perform a function of a visual representation the same or similar as a conveyance client. A representative can be managed or operated with an autonomous vehicle or a fleet of an autonomous vehicle to perform a conveyance service. A service provider, a fleet manager, a logistics provider, a logistics supplier, or the like, can use a representative and an autonomous vehicle to perform a conveyance service in a conveyance industry segment. A representative can have or generate all or some of conveyance data.

A representative can perform all or some of a conveyance service. A representative can perform all or some of a conveyance service in conjunction with an autonomous vehicle. A representative can perform part of a conveyance service and an autonomous vehicle can perform another part of a conveyance service. A representative can perform part of a conveyance service during a waypoint and an autonomous vehicle can perform another part of a conveyance service.

A representative can pick up food and put the food in an autonomous vehicle to be delivered. A representative can order food and put the food in an autonomous vehicle to be delivered. A representative can put food in an autonomous vehicle, such as a drone to be delivered. A representative can put food in an autonomous vehicle, such as an autonomous ground vehicle to be delivered. A representative can be perceived as or similar to a scooter, a scooter service, a bicycle, a bicycle service, or the like.

Visual Representation: The following are illustrative, non-limiting examples of a "visual representation" and uses thereof as used in the present disclosure, and augment prior descriptions provided herein:

A visual representation can facilitate an operation or a function to secure or obtain a preferred conveyance service request or a preferred conveyance service offering. A visual representation can be utilized or operated by a conveyance client, a representative, a service provider, a good supplier, a fleet manager, an owner or a controller of an autonomous vehicle, a logistics provider, a logistics supplier, a map provider, a third party, or a combination thereof.

A visual representation can be a tool used to assist a representative analyze or evaluate a conveyance service request or a conveyance service request metric on a geographical map to secure or obtain a preferred conveyance service request. A visual representation can be a tool used to assist a conveyance client analyze or evaluate a conveyance service offering or a conveyance service offering metric on a geographical map to secure or obtain a preferred conveyance service offering. A visual representation can be viewed from a perspective, a point of reference, a point of interest, or a combination thereof. A visual representation can be one or more dynamic map, real time or near real time heat map, historical heat map, predictive heat map, or a combination thereof.

A visual representation can facilitate securing or obtaining a preferred conveyance service request or a preferred conveyance service offering. A visual representation can be used to facilitate securing or obtaining a preferred conveyance service request or a preferred conveyance service offering. A visual representation can facilitate securing or obtaining a preferred conveyance service request or a preferred conveyance service offering utilizing an application. A visual representation can facilitate securing or obtaining a preferred conveyance service request or a preferred conveyance service offering, utilizing a service provider application, a third party application, or the like.

A visual representation can be a geographical map that can display one or more preferred conveyance service request, filtered conveyance service request, conveyance service request, preferred conveyance service offering, filtered conveyance service offering, conveyance service offering, metric relating to a respective request or offering, real time or near real time geographical location of a representative, real time or near real time geographical location of an autonomous vehicle, real time or near real time geographical location of a service provider, real time or near real time geographical location of a good supplier, real time or near real time geographical location of a fleet manager, real time or near real time geographical location of a conveyance client, real time or near real time geographical location of a logistics provider, real time or near real time geographical location of a logistics supplier, conveyance client preference, representative preference, or a combination thereof.

A visual representation can be a geographical map that can display one or more preferred conveyance service offering, filtered conveyance service offering, conveyance service offering, metric relating to a respective offering, or a combination thereof.

A visual representation can be displayed in or on an autonomous vehicle. A visual representation can be displayed in or on an autonomous vehicle to show a route or a path for an autonomous vehicle. A visual representation can be utilized by a conveyance client in an autonomous vehicle. A visual representation can have or be associated with a commercial or an advertisement. A visual representation can be an interactive map. A visual representation can be an interactive map that can be used by a conveyance client. A visual representation can be an interactive map that can be used by a representative.

A visual representation can be an interactive map that can be used by a conveyance client to communicate with one or more of a service provider, a good supplier, a fleet manager, an owner or a controller of an autonomous vehicle, a logistics provider, a logistics supplier, an autonomous vehicle, a map provider, a third party, a representative, or a combination thereof. A visual representation can be an interactive map that can be used by a representative to communicate with one or more of a service provider, a good supplier, a fleet manager, an owner or a controller of an autonomous vehicle, a logistics provider, a logistics supplier, an autonomous vehicle, a map provider, a third party, a conveyance client, or a combination thereof.

A visual representation can be utilized and updated in real time or near real time by communicating information or data including all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured or obtained preferred conveyance service request, a secured or obtained preferred conveyance service offering, or the like. A visual representation can be utilized and updated in real time or near real time by communicating information or data with a central server, an external server, an application, or a combination thereof.

A visual representation can be compiled on one or more of an application, a central server, or a combination thereof. A visual representation can be displayed on an application, a central server, a remote display, or a combination thereof. A visual representation can be in any form or format, preferably visual. A variation in the form, format, and order of a visual representation component is within the scope of the present invention. A visual representation can be updated or refreshed in real time or near real time and can refer to being updated or refreshed in the highest level of development or state of the art. A visual representation can perform a function in real time or near real time and can refer to being updated or refreshed in the highest level of development or state of the art.

A representative can use a visual representation to apply a representative preference to display one or more of a preferred conveyance service request, a filtered conveyance service request, or a combination thereof, that can relate to a representative preference. Applying or using a representative preference can allow a representative to filter out, hide, or remove a conveyance service request from a visual representation that do not match a representative preference, to better identify a preferred conveyance service request or a geographical area to secure or obtain a preferred conveyance service request. A representative can browse or navigate an area of a visual representation to identify and then secure or obtain a preferred conveyance service request or a filtered conveyance service request by selecting a preferred conveyance service request or a filtered conveyance service request.

A conveyance client can use a visual representation to apply a conveyance client preference to display one or more of a preferred conveyance service offering, a filtered conveyance service offering, or a combination thereof, that can relate to a conveyance client preference. Applying or using a conveyance client preference can allow a conveyance client to filter out, hide, or remove a conveyance service offering from a visual representation that do not match a conveyance client preference, to better identify a preferred conveyance service offering or a geographical area to secure or obtain a preferred conveyance service offering. A conveyance client can browse or navigate an area of a visual representation to identify and then secure or obtain a preferred conveyance service offering or a filtered conveyance service offering by selecting a preferred conveyance service offering or a filtered conveyance service offering.

A visual representation can display one or more of a conveyance service request, a conveyance service request metric, a conveyance service offering, a conveyance service offering metric, or a combination thereof, in a conveyance industry segment on a geographical map respectively. A visual representation can be a tool that can display one or more of a conveyance service request, a conveyance service request metric, a conveyance service offering, a conveyance service offering metric, or a combination thereof, relating to a service provider on a geographical map respectively. A visual representation can display a route from a representative to a beginning service geographical location and then to an ending service geographical location.

A service provider, a good supplier, a fleet manager, an owner or a controller of an autonomous vehicle, a logistics provider, a logistics supplier, a map provider, a third party, or a combination thereof, can be displayed on or with a visual representation that can display a level of service preference. An owner or a controller of an autonomous vehicle, a service provider, a good supplier, a fleet manager, a logistics provider, a logistics supplier, a map provider, a third party, or a combination thereof, can be displayed on or with a dynamic map that can display a level of service preference. An owner or a controller of an autonomous vehicle, a service provider, a good supplier, a fleet manager, a logistics provider, a logistics supplier, a map provider, a third party, or a combination thereof, can be displayed on or with a heat map that can display a level of service preference.

A visual representation can comprise a dynamic map and can display a level of service preference relating to a service provider, a good supplier, an owner or a controller of an autonomous vehicle, a fleet manager, a logistics provider, a logistics supplier, a map provider, a third party, or a combination thereof, operating in a conveyance industry segment. A visual representation can display a dynamic map with a level of service preference as a tab or an icon relating to a service provider, a good supplier, an owner or a controller of an autonomous vehicle, a fleet manager, a logistics provider, a logistics supplier, a map provider, a third party, or a combination thereof, operating in a conveyance industry segment.

A visual representation can display one or more of a dynamic map, a conveyance client preference, a conveyance service offering, a filtered conveyance service offering, a preferred conveyance service offering, real time or near real time geographical location of a conveyance client, or a combination thereof. A visual representation can display a dynamic map, a conveyance client preference, a conveyance service offering, a filtered conveyance service offering, a preferred conveyance service offering, or a combination thereof, relating to a real time or near real time geographical location of a conveyance client. A visual representation can display a dynamic map, a conveyance client preference, a conveyance service offering, a filtered conveyance service offering, a preferred conveyance service offering, all or some of a real time or near real time geographical location of a conveyance client, or a combination thereof, relating to a conveyance client preference.

A visual representation can utilize an application, a terminal, a central server, an external server, a link, or a combination thereof, that can be combined or integrated. A visual representation can utilize an application, a terminal, a central server, an external server, a link, or a combination thereof, that can be combined or integrated on a smartphone. A visual representation can utilize an application, an autonomous vehicle, a terminal, a central server, an external server, a link, or a combination thereof, that can be combined or integrated.

A representative can use a visual representation to analyze or evaluate a historical preferred conveyance service request relating to a service provider. A conveyance client can use a visual representation to analyze or evaluate a historical preferred conveyance service offering relating to a service provider. A visual representation can be compiled on a third party server such as a map provider server. A representative and/or a conveyance client can use a visual representation to analyze or evaluate pricing information or another metric from a service provider respectively. A visual representation can be used to analyze or evaluate an area on a geographical map that can show a metric relating to an individual conveyance industry segment. A visual representation can be used to analyze or evaluate an area on a geographical map that can show a metric relating to an individual service provider.

A visual representation can be compiled with information or data from a map provider. A level of service preference can be used by a conveyance client to identify a luxury vehicle, an environmentally friendly vehicle, a driverless vehicle, or the like. A visual representation can display a scooter, a bicycle, a mobility option, or the like.

A level of service preference can be displayed on or with a visual representation to identify different levels of service that a service provider, a good supplier, an owner or a controller of an autonomous vehicle, a fleet manager, a logistics provider, a logistics supplier, a map provider, a third party, or a combination thereof, can provide. A level of service preference can be displayed as an icon or a visual with or on a visual representation to allow a selection of different levels of service that a service provider, a good supplier, an owner or a controller of an autonomous vehicle, a fleet manager, a logistics provider, a logistics supplier, a map provider, a third party, or a combination thereof, can provide. A level of service preference can be displayed on a visual representation to identify different levels of service that a service provider, a good supplier, an owner or a controller of an autonomous vehicle, a fleet manager, a logistics provider, a logistics supplier, a map provider, a third party, or a combination thereof, can provide.

A visual representation can facilitate securing or obtaining a preferred conveyance service request or a preferred conveyance service offering utilizing more than one application. A third party can provide a visual representation on a third party application that can be used to facilitate securing or obtaining a preferred conveyance service request on a service provider application or the like. A third party can provide a visual representation on a third party application that can be used to facilitate securing or obtaining a preferred conveyance service offering on a service provider application or the like.

Dynamic Map: The following are illustrative, non-limiting examples of a "dynamic map" as used in the present disclosure:

A dynamic map can be a visual representation that can facilitate an operation or a function to secure or obtain a preferred conveyance service request or a preferred conveyance service offering. A dynamic map can be a visual representation that can be utilized or operated by a conveyance client, a representative, a service provider, a good supplier, a fleet manager, an owner or a controller of an autonomous vehicle, a logistics provider, a logistics supplier, a map provider, a third party, or a combination thereof.

A dynamic map can be a geographical map that can display one or more of a conveyance service request, a filtered conveyance service request, a preferred conveyance service request, or a combination thereof. A dynamic map can be a geographical map that can display one or more of a conveyance service offering, a filtered conveyance service offering, a preferred conveyance service offering, or a combination thereof. A dynamic map can be a geographical map that can display one or more of a real time or near real time geographical location of an autonomous vehicle, a real time or near real time geographical location of a representative, a real time or near real time geographical location of a conveyance client, or a combination thereof.

A dynamic map can be used by a representative or the like to analyze or evaluate and then preferably secure or obtain a preferred conveyance service request. A dynamic map can be used by a representative or the like to find or identify and preferably secure or obtain a preferred conveyance service request for a representative relating to a service provider or the like operating in a conveyance industry segment. A dynamic map can be used by a conveyance client or the like to analyze or evaluate and then preferably secure or obtain a preferred conveyance service offering. A dynamic map can be used by a conveyance client or the like to find or identify and preferably secure or obtain a preferred conveyance service offering for a conveyance client relating to a service provider or the like operating in a conveyance industry segment.

A dynamic map can be a geographical map that can display a distinguishable conveyance client, a distinguishable representative, a distinguishable autonomous vehicle, a distinguishable service provider, a distinguishable good supplier, or the like. A preferred conveyance service request, a filtered conveyance service request, a preferred conveyance service offering, a filtered conveyance service offering, a conveyance client, a representative, an autonomous vehicle, a service provider, a good supplier, an owner or a controller of an autonomous vehicle, a fleet manager, a logistics provider, a logistics supplier, a map provider, a third party, or a combination thereof, can be displayed individually as a mobile or transitory icon or a mobile or transitory visual on a dynamic map. A dynamic map can be compiled on one or more of an application, a central server, an external server, or a combination thereof. A dynamic map can be in any form or format, preferably visual. A variation in the form, format, and order of a dynamic map component is within the scope of the present invention.

A dynamic map can be viewed from one or more of a perspective, a point of reference, a point of interest, or a combination thereof. A real time or near real time geographical location of one or more of a conveyance client, a representative, an autonomous vehicle, a service provider, a good supplier, an owner or a controller of an autonomous vehicle, a fleet manager, a logistics provider, a logistics supplier, a map provider, a third party, or a combination thereof, can change and can be updated in real time or near real time and can optionally reflect their availability status. A dynamic map can be updated or refreshed in real time or near real time and can refer to being updated or refreshed in the highest level of development or state of the art. A dynamic map can perform a function in real time or near real time and can refer to being updated or refreshed in the highest level of development or state of the art.

A dynamic map can be used to analyze or evaluate an area on a geographical map that can show a different service provider or another conveyance service metric relating to a service provider. A dynamic map can be used to analyze or evaluate an area on a geographical map that can show an available service provider or another conveyance service metric relating to a conveyance industry segment. A dynamic map can be used to analyze or evaluate a location of one or more of a conveyance client, a representative, an autonomous vehicle, a service provider, a good supplier, an owner or a controller of an autonomous vehicle, a fleet manager, a logistics provider, a logistics supplier, a map provider, a third party, or a combination thereof, from a service provider. A dynamic map can be combined with a heat map.

A preferred conveyance service request can be displayed in a visually identifiable format compared to a filtered conveyance service request. A preferred conveyance service offering can be displayed in a visually identifiable format compared to a filtered conveyance service offering.

A representative can use a dynamic map to analyze or evaluate a filtered conveyance service request, a preferred conveyance service request, a conveyance client, a good supplier, a conveyance service metric, or a combination thereof, relating to a service provider or the like across a conveyance industry segment. A conveyance client can use a dynamic map to analyze or evaluate one or more of a filtered conveyance service offering, a preferred conveyance service offering, a representative, an autonomous vehicle, a good supplier, a conveyance service metric, or a combination thereof, relating to a service provider or the like across a conveyance industry segment.

A dynamic map can facilitate securing or obtaining a preferred conveyance service request or a preferred conveyance service offering. A dynamic map can be used to facilitate securing or obtaining a preferred conveyance service request or a preferred conveyance service offering. A dynamic map can facilitate securing or obtaining a preferred conveyance service request or a preferred conveyance service offering utilizing an application. A dynamic map can facilitate securing or obtaining a preferred conveyance service request or a preferred conveyance service offering, utilizing a service provider application, a third party application, a map provider application, or the like.

A service provider, a good supplier, a fleet manager, an owner or a controller of an autonomous vehicle, a logistics provider, a logistics supplier, a representative, a conveyance client, a map provider, a third party, or a combination thereof, can be displayed on or with a dynamic map that can display a level of service preference.

An individual service provider can be displayed as a different icon, a different symbol, a different color, a different shading, a different visual, or the like. An individual service provider can be displayed as a similar icon, a similar symbol, a similar color, a similar shading, a similar visual, or the like for a conveyance service, a level of service, or a combination thereof. A service provider can be displayed on a dynamic map with a similar or different icon, a similar or different symbol, a similar or different color, a similar or different shading, a similar or different visual, or the like but can be identifiably different.

A dynamic map can be compiled on a central server and then transmitted to and displayed on an application. A dynamic map can be used for an individual conveyance industry segment. A dynamic map can be used for an individual service provider or the like. A dynamic map can have one car icon or the like represent a service provider as half black/half white. A dynamic map can display an icon or the like to show that a conveyance client has inputted or generated a conveyance service request to a service provider by displaying a conveyance client and/or a conveyance service request as half red and half blue. A dynamic map can display an icon or the like to show that a representative or an autonomous vehicle can work for an additional service provider or the like by displaying a car icon or the like and/or a conveyance service offering as half black and half pink. A dynamic map can display a scooter, a scooter service, a bicycle, a bicycle service, or the like.

A dynamic map can utilize an application, a terminal, a central server, an external server, a link, or a combination thereof, that can be combined or integrated. A dynamic map can utilize an application, a terminal, a central server, an external server, a link, or a combination thereof, that can be combined or integrated on a smartphone.

A map provider can provide or utilize a dynamic map that can display an individual service provider, an individual good supplier, or the like, with associated conveyance service offerings or associated conveyance service requests.

A conveyance client can visually identify a service provider, a good supplier, or the like, and the corresponding a conveyance service offering associated on a dynamic map. A conveyance client can visually identify three service providers on a dynamic map with the associated conveyance service offerings along with pricing information. A representative can visually identify a service provider, a good supplier, or the like, and the corresponding a conveyance service request associated on a dynamic map. A representative can visually identify four good suppliers on a dynamic map with the associated conveyance service requests along with pricing information.

A level of service preference can be displayed on a dynamic map to identify different levels of service that a service provider or the like can provide. An owner or a controller of an autonomous vehicle, a service provider, a good supplier, a fleet manager, a logistics provider, a logistics supplier, a conveyance client, a representative, a third party, or a combination thereof, can be displayed on or with a dynamic map that can display a level of service preference and can be represented by a mobile or transitory icon.

A dynamic map can facilitate securing or obtaining a preferred conveyance service offering utilizing more than one application. A third party can provide a dynamic map on a third party application that can be used to facilitate securing or obtaining a preferred conveyance service offering on a service provider application or the like. A dynamic map can facilitate securing or obtaining a preferred conveyance service request utilizing more than one application. A third party can provide a dynamic map on a third party application that can be used to facilitate securing or obtaining a preferred conveyance service request on a service provider application or the like.

Heat Map: The following are illustrative, non-limiting examples of a "heat map" as used in the present disclosure:

A heat map can be a visual representation that can facilitate an operation or a function to secure or obtain a preferred conveyance service request or a preferred conveyance service offering. A heat map can be a visual representation that can be utilized or operated by a conveyance client, a representative, a service provider, a good supplier, a fleet manager, an owner or a controller of an autonomous vehicle, a logistics provider, a logistics supplier, a map provider, a third party, or a combination thereof.

A heat map can provide an improved way to visualize how a metric varies across a geographical area or can show a level of variability within a geographical region of a metric. A heat map can be a geographical map in which an area can be shaded or patterned in proportion to a measurement of a statistical variable being displayed on a geographical map. A heat map can be used by a representative to analyze or evaluate and then preferably secure or obtain a preferred conveyance service request. A heat map can be used by a conveyance client to analyze or evaluate and then preferably secure or obtain a preferred conveyance service offering.

A statistical variable can be aggregated or not aggregated. A statistical variable can be quantitative, qualitative, or a combination thereof. A statistical variable can be one or more of a measurement of conveyance service availability, pricing, elevated pricing, conveyance service offering density, filtered conveyance service offering density, preferred conveyance service offering density, conveyance service request density, filtered conveyance service request density, preferred conveyance service request density, preferred good supplier density, a preferred conveyance industry segment, conveyance industry segment density, level of service density, a conveyance service distance, an estimated time of arrival, preferred representative density, representative density, conveyance client density, service provider density, good supplier density, or a combination thereof.

A metric can be a basis for comparison or a reference point against which another thing can be evaluated. A metric can be a standard of measurement by which value, efficiency, performance, progress or quality of a process, a product or a variable can be assessed.

A distinguishable pricing metric, a distinguishable conveyance service metric, a distinguishable conveyance client metric, a distinguishable representative metric, a distinguishable autonomous vehicle metric, a distinguishable service provider metric, and/or a distinguishable good supplier metric can optionally be aggregated and/or differentiated on a heat map. A variation in the form, format, and order of a heat map component is within the scope of the present invention. A heat map can be in any form or format, preferably visual. A heat map can be viewed from one or more of a perspective, a point of reference, a point of interest, or a combination thereof. A heat map can be compiled on one or more of an application, a central server, or a combination thereof.

A heat map can be a geographical map that can display a visual depiction of a statistical variable of one or more of a conveyance service request, a filtered conveyance service request, a preferred conveyance service request, or a combination thereof. A heat map can be a geographical map that can display a visual depiction of a statistical variable of one or more of a conveyance service offering, a filtered conveyance service offering, a preferred conveyance service offering, or a combination thereof.

A heat map can be updated or refreshed in real time or near real time and can refer to being updated or refreshed in the highest level of development or state of the art. A heat map can perform a function in real time or near real time and can refer to being updated or refreshed in the highest level of development or state of the art.

A heat map can be used to analyze or evaluate an area on a geographical map that can show a pricing metric or another conveyance service metric relating to a service provider, a good supplier, or the like. A heat map can be used to analyze or evaluate an area on a geographical map that can show a pricing metric or another conveyance service metric relating to a conveyance industry segment. A heat map can be combined with a dynamic map.

A representative can use a heat map to analyze or evaluate a measurement of a statistical variable from a service provider, a good supplier, or the like, across a conveyance industry segment. A conveyance client can use a heat map to analyze or evaluate a measurement of a statistical variable from a service provider, a good supplier, or the like, across a conveyance industry segment.

A heat map can be one or more of a real time or near real time heat map, a historical heat map, a predictive heat map, or a combination thereof.

A real time or near real time heat map, a historical heat map, a predictive heat map, or a combination thereof, can be a tool to aid a representative or a conveyance client when analyzing or evaluating a conveyance service metric. A real time or near real time heat map can display a time frame in seconds, minutes, hours, days, or any other increment of time. A historical heat map can display a time frame in seconds, minutes, hours, days, or any other increment of time. A predictive heat map can provide an estimate in seconds, minutes, hours, days, or any other increment of time. A predictive heat map can incorporate a feedback mechanism to improve quality of a future estimate. A predictive heat map can incorporate a feedback mechanism from one or more of a representative, an autonomous vehicle, a conveyance client, a good supplier, a service provider, an owner or a controller of an autonomous vehicle, a fleet manager, a logistics provider, a logistics supplier, a map provider, a third party, or a combination thereof.

A heat map can be viewed from one or more of a perspective, a point of reference, a point of interest, or a combination thereof. A heat map can be a geographical map that can display one or more of a real time or near real time geographical location of an autonomous vehicle, a real time or near real time geographical location of a representative, a real time or near real time geographical location of a conveyance client, a real time or near real time geographical location of a service provider, a real time or near real time geographical location of a good supplier, a real time or near real time geographical location of a fleet manager, a real time or near real time geographical location of a third party, or a combination thereof.

A service provider, a good supplier, a fleet manager, an owner or a controller of an autonomous vehicle, a logistics provider, a logistics supplier, a representative, a conveyance client, a map provider, a third party, or a combination thereof, can be displayed on or with a heat map that can display a level of service preference.

A heat map can facilitate securing or obtaining a preferred conveyance service request or a preferred conveyance service offering. A heat map can be used to facilitate securing or obtaining a preferred conveyance service request or a preferred conveyance service offering. A heat map can facilitate securing or obtaining a preferred conveyance service request or a preferred conveyance service offering utilizing an application. A heat map can facilitate securing or obtaining a preferred conveyance service request or a preferred conveyance service offering, utilizing a service provider application, a third party application, a map provider application, or the like.

A heat map can be used by a representative or the like to analyze or evaluate and then preferably secure or obtain a preferred conveyance service request. A heat map can be used by a representative or the like to find or identify and preferably secure or obtain a preferred conveyance service request for a representative relating to a service provider or the like operating in a conveyance industry segment. A heat map can be used by a conveyance client or the like to analyze or evaluate and then preferably secure or obtain a preferred conveyance service offering. A heat map can be used by a conveyance client or the like to find or identify and preferably secure or obtain a preferred conveyance service offering for a conveyance client relating to a service provider or the like operating in a conveyance industry segment.

A heat map can be used to analyze or evaluate an area on a geographical map that can show a different service provider or another conveyance service metric relating to a service provider, a good supplier, or the like. A heat map can be used to analyze or evaluate an area on a geographical map that can show another conveyance service metric, an available service provider, an available good supplier, or the like, relating to a conveyance industry segment. A heat map can be used to analyze or evaluate a location of one or more of a conveyance client, a representative, an autonomous vehicle, a service provider, a good supplier, an owner or a controller of an autonomous vehicle, a fleet manager, a logistics provider, a logistics supplier, a map provider, a third party, or a combination thereof, from a service provider.

A statistical variable can be one or more of conveyance service availability, pricing, elevated pricing, conveyance service request density, conveyance service offering density, filtered conveyance service request density, filtered conveyance service offering density, preferred conveyance service request density, preferred conveyance service offering density, level of service density, a conveyance service distance, an estimated time of arrival, preferred conveyance client density, preferred representative density, preferred good supplier density, a preferred conveyance industry segment, conveyance industry segment density, representative density, conveyance client density, service provider density, good supplier density, or a combination thereof. A statistical variable can preferably be displayed as one or more of a distinguishable hue, shade, saturation, opacity, color, color value, pattern, hatch fill, fill, shape, image, animation, or a combination thereof.

A heat map can optionally be a geographical map that can be separate or can be a layer on a dynamic map. A heat map can be compiled on a central server and then transmitted to and displayed on an application or a remote display. A heat map can be a choropleth map or the like. A heat map can be a thematic map or the like.

A map provider can provide or utilize a heat map that can display a metric or a statistical variable relating to an individual service provider, an individual good supplier, or the like. A heat map can depict a pricing metric or another relevant conveyance service metric. A heat map can depict an estimated time of arrival. A heat map can depict an estimated time of arrival relating to a conveyance service request, a filtered conveyance service request, a preferred conveyance service request, a conveyance service offering, a filtered conveyance service offering, a preferred conveyance service offering, a representative, a conveyance client, a service provider, a good supplier, an owner or a controller of an autonomous vehicle, a fleet manager, a logistics provider, a logistics supplier, a map provider, a third party, or a combination thereof.

A central server or an application can generate prediction data based on a conveyance service request and/or a conveyance service offering and can transmit to an application to create a predictive heat map. A heat map can be used for an individual conveyance industry segment. A heat map can be used for an individual service provider, an individual good supplier, or the like.

A preferred conveyance service request is not identified prior to compiling a heat map, a real time or near real time heat map, a historical heat map, a predictive heat map, or a combination thereof. A preferred conveyance service offering is not identified prior to compiling a heat map, a real time or near real time heat map, a historical heat map, a predictive heat map, or a combination thereof.

A real time or near real time heat map can be compiled from a statistical variable of a conveyance service request, a filtered conveyance service request, a preferred conveyance service request, or a combination thereof. A real time or near real time heat map can be compiled from a statistical variable of a conveyance service offering, a filtered conveyance service offering, a preferred conveyance service offering, or a combination thereof. A real time or near real time heat map can display one or more of current conveyance client density, current representative density, current autonomous vehicle density, current service provider density, current good supplier density, or a combination thereof, based on a current or historical estimated time of arrival.

A historical heat map can be compiled from a statistical variable of a past conveyance service request, a past filtered conveyance service request, a past preferred conveyance service request, or a combination thereof. A historical heat map can be compiled from a statistical variable of a past conveyance service offering, a past filtered conveyance service offering, a past preferred conveyance service offering, or a combination thereof. A historical heat map can be used to analyze or evaluate a historical trend relating to a conveyance industry segment. A historical heat map can display one or more of historical conveyance client density, historical representative density, historical autonomous vehicle density, historical service provider density, historical good supplier density, or a combination thereof, based on a historical estimated time of arrival.

A predictive heat map can be compiled from a statistical variable of a real time or near real time conveyance service request, a past conveyance service request, a real time or near real time filtered conveyance service request, a past filtered conveyance service request, real time or near real time preferred conveyance service request, a past preferred conveyance service request, or a combination thereof.

A predictive heat map can be compiled from a statistical variable of a real time or near real time conveyance service offering, a past conveyance service offering, a real time or near real time filtered conveyance service offering, a past filtered conveyance service offering, a real time or near real time preferred conveyance service offering, a past preferred conveyance service offering, or a combination thereof. A predictive heat map can display one or more of future conveyance client density, future representative density, future autonomous vehicle density, future service provider density, future good supplier density, or a combination thereof, based on a current and historical estimated time of arrival.

A predictive heat map can utilize a neural network or the like. A predictive heat map can utilize machine learning technology or the like. A predictive heat map can utilize quantum computing or the like. A predictive heat map can be used by a representative or a conveyance client to find a potential upcoming area with elevated pricing.

A predictive heat map can identify or estimate future conveyance service availability, future pricing, future elevated pricing, future conveyance service request density, future conveyance service offering density, future filtered conveyance service request density, future filtered conveyance service offering density, future preferred conveyance service request density, future preferred conveyance service offering density, future level of service density, future conveyance industry segment density, future representative density, future conveyance client density, future service provider density, future good supplier density, future level of service demand, future conveyance industry segment demand, future conveyance service demand, future service provider demand, future good supplier demand, future conveyance service supply, future representative supply, or a combination thereof.

A predictive heat map can generate a visual notification or an audio notification to notify a representative or a conveyance client of a future change or update of a statistical variable, a measurement of a statistical variable, or a combination thereof.

A heat map can utilize an application, a terminal, a central server, an external server, a link, or a combination thereof, that can be combined or integrated. A heat map can utilize an application, a terminal, a central server, an external server, a link, or a combination thereof, that can be combined or integrated on a smartphone. A real time or near real time heat map can utilize an application, a terminal, a central server, an external server, a link, or a combination thereof, that can be combined or integrated. A historical heat map can utilize an application, a terminal, a central server, an external server, a link, or a combination thereof, that can be combined or integrated. A predictive heat map can utilize an application, a terminal, a central server, an external server, a link, or a combination thereof, that can be combined or integrated.

An owner or a controller of an autonomous vehicle, a service provider, a good supplier, a fleet manager, a logistics provider, a logistics supplier, or a combination thereof, can be displayed on or with a heat map that can display a level of service preference.

A conveyance client can visually identify a metric or a statistical variable relating to a service provider, a good supplier, a map provider, or the like, associated with a heat map. A conveyance client can visually identify two service providers or the like on a heat map with the different pricing information. A representative can visually identify a metric or a statistical variable relating to a service provider, a good supplier, a map provider, or the like, associated with a heat map. A representative can visually identify three good suppliers or the like on a heat map with different elevated pricing information.

A level of service preference can be displayed on a heat map to identify a metric or a statistical variable relating to a service provider, a good supplier, a map provider, or the like. A service provider, a good supplier, a fleet manager, an owner or a controller of an autonomous vehicle, a logistics provider, a logistics supplier, a conveyance client, a representative, a third party, or a combination thereof, can be displayed on or with a heat map that can display a level of service preference. A heat map can display a scooter, a scooter service, a bicycle, a bicycle service, or the like.

A heat map can facilitate securing or obtaining a preferred conveyance service offering utilizing more than one application. A third party can provide a heat map on a third party application that can be used to facilitate securing or obtaining a preferred conveyance service offering on a service provider application or the like. A heat map can facilitate securing or obtaining a preferred conveyance service request utilizing more than one application. A third party can provide a heat map on a third party application that can be used to facilitate securing or obtaining a preferred conveyance service request on a service provider application or the like.

Application: The following are illustrative, non-limiting examples of an "application":

An application can be a software that can facilitate an operation or a function to secure or obtain a preferred conveyance service request or a preferred conveyance service offering. An application can be a software that can be utilized or operated by a conveyance client, a representative, an owner or a controller of an autonomous vehicle, a service provider, a good supplier, a fleet manager, a logistics provider, a logistics supplier, a map provider, a third party, or a combination thereof. An application can be a software such as a smartphone application, a computer application, a computer program, an API, a website, a web application, a smartphone application, a cloud application, a service, or the like.

An application can be software that can facilitate analyzing, evaluating, securing, obtaining, accepting, declining, canceling, displaying, communicating, or a combination thereof, a preferred conveyance service request, a preferred conveyance service offering, a real time or near real time geographical location of a conveyance client, a real time or near real time geographical location of a representative, or a combination thereof. An application can be provided in any form or format, such as any appropriate tangible or intangible medium of expression but can preferably be provided in an electronic form. An application can be associated with one or more of a central server, a link, an external server, an application, a good supplier, a service provider, an owner or a controller of an autonomous vehicle, a good supplier, a fleet manager, a logistics provider, a logistics supplier, a map provider, a third party, a conveyance client, a representative, or a combination thereof.

An application can be software appropriate for communicating to or with one or more of a central server, an external server, an application, a good supplier, an autonomous vehicle, a terminal, a service provider, a good supplier, a fleet manager, a logistics provider, a logistics supplier, a representative, a conveyance client, a map provider, a third party, or a combination thereof. An application can operate on one or more of a terminal, a central server, an external server, or a combination thereof. An application can standardize or convert a conveyance service request or a conveyance service offering, a real time or near real time geographical location of a conveyance client, a real time or near real time geographical location of a representative, or a combination thereof structured in a different format, into a uniform format. A representative can input or provide a representative preference into an application. A conveyance client can input or provide a conveyance client preference into an application.

An application can provide one or more of a real time or near real time geographical location of a representative, a real time or near real time geographical location of a conveyance client, a real time or near real time geographical location of a service provider, a real time or near real time geographical location of a good supplier, a real time or near real time geographical location of a fleet manager, a real time or near real time geographical location of a logistics provider, a real time or near real time geographical location of a logistics supplier, a real time or near real time geographical location of a map provider, a real time or near real time geographical location of a third party, or a combination thereof, using a geographical location module of a terminal. Information and/or data inputted or discovered by an application can be cached. An application can be updated or refreshed in real time or near real time and can refer to being updated or refreshed in the highest level of development or state of the art. An application can perform a function in real time or near real time and can refer to being updated or refreshed in the highest level of development or state of the art.

An application can communicate information or data relating to all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured or obtained preferred conveyance service request, a secured or obtained preferred conveyance service offering, or the like. An application can communicate all or some of information or data with a central server, an external server, an application, or a combination thereof.

An application can filter and identify all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured or obtained preferred conveyance service request, a secured or obtained preferred conveyance service offering, or a combination thereof, together or separately.

An application can be a software that can facilitate an operation or a function to secure or obtain a conveyance service request, a filtered conveyance service request, a preferred conveyance service request, a conveyance service offering, a filtered conveyance service offering, a preferred conveyance service offering, or a combination thereof. A conveyance service offering or a conveyance service request can be pre-filtered or pre-categorized on a central server, an external server, an application, or a combination thereof.

An application can be used to analyze, evaluate, secure, or obtain, accept, decline, cancel, or communicate a preferred conveyance service request or a preferred conveyance service offering. An application can be used by one or more of a representative, a conveyance client, a service provider, a good supplier, a fleet manager, a logistics provider, a logistics supplier, a map provider, a third party, or a combination thereof. An application can be used, accessed, controlled, or operated by one or more of a representative, a conveyance client, a service provider, a good supplier, a fleet manager, a logistics provider, a logistics supplier, a map provider, a third party, or a combination thereof, to optionally analyze or evaluate and then preferably secure or obtain a preferred conveyance service request, a preferred conveyance service offering, or a combination thereof.

An application can display a visual representation of one or more of a dynamic map, a heat map, or a combination thereof. An application can display a secured or obtained preferred conveyance service request. An application can display a secured or obtained preferred conveyance service offering. An application can display conveyance data relating to one or more of a conveyance service request, a filtered conveyance service request, a preferred conveyance service request, a conveyance service offering, a filtered conveyance service offering, a preferred conveyance service offering, or a combination thereof.

An application, a terminal, a central server, an external server, a link, or a combination thereof, can be combined or integrated. There can be a different variation of the application used by one or more of a representative, a conveyance client, a service provider, a good supplier, a fleet manager, a logistics provider, a logistics supplier, a map provider, a third party, or a combination thereof. An application can transmit an inertial Measurement Unit (IMU) reading of a terminal to a central server to determine an orientation or a direction of a representative, a conveyance client, a service provider, a good supplier, a fleet manager, a logistics provider, a logistics supplier, a map provider, a third party, or a combination thereof. An application can be in a form of a mobile application, a non-mobile application, a website, a plugin, or a combination thereof.

An application can operate on a central server, an external server, or a combination thereof. An application can perform a central server function or an external server function. An application can perform a similar function as a central server or an external server function to identify a preferred conveyance service request or a preferred conveyance service offering. A different application can be used by a representative, a conveyance client, a service provider, a good supplier, a fleet manager, a logistics provider, a logistics supplier, a map provider, a third party, or a combination thereof.

A preferred conveyance service request or a preferred conveyance service offering can be transmitted to an application and can be displayed as a pop-up, an icon, a visual, a symbol, a pattern, a marker, a notification, an alert, a message, a short message service, a multimedia messaging service, a smart messaging service, an extended message service, or a combination thereof.

An application can secure or obtain a preferred conveyance service request, a filtered conveyance service request, a conveyance service request, a preferred conveyance service offering, a filtered conveyance service offering, a conveyance service offering, or a combination thereof, and can communicate directly or indirectly with a central server, an external server, an application, a service provider, a good supplier, a fleet manager, a logistics provider, a logistics supplier, a map provider, a third party, a representative, a conveyance client, or a combination thereof.

An application can secure or obtain a preferred conveyance service request, a filtered conveyance service request, a preferred conveyance service offering, a filtered conveyance service offering, or a combination thereof, and can communicate indirectly with an external server or a service provider via a central server. An application can secure or obtain a preferred conveyance service request, a filtered conveyance service request, a preferred conveyance service offering, a filtered conveyance service offering, or a combination thereof, and can communicate directly with an external server, a service provider, or the like.

An application can be a service provider application, a good supplier application, an owner or a controller of an autonomous vehicle application, a fleet manager application, a logistics provider application, a logistics supplier application, a representative application, a conveyance client application, a map provider application, a third party application, or a combination thereof. A map provider can provide an application that can be utilized by a conveyance client or a representative. A map provider can provide a visual representation on an application that can be utilized by a conveyance client or a representative.

An application can be accessed, controlled, or operated remotely by a service provider, a good supplier, a fleet manager, a logistics provider, a logistics supplier, a representative, a conveyance client, a map provider, a third party, or a combination thereof, to optionally analyze or evaluate and then preferably secure or obtain a preferred conveyance service request or a preferred conveyance service offering.

An application can manage or process a conveyance service offering the same as a conveyance service request. An application can manage or process a conveyance service request the same as a conveyance service offering. A conveyance service request or a conveyance service offering can be filtered in real time or near real time on an application. A preferred conveyance service request can be identified in real time, from a filtered conveyance service request on an application. A preferred conveyance service offering can be identified in real time or near real time, from a filtered conveyance service offering on an application.

A different geographical location can be used other than a real time or near real time geographical location of a representative or the like when filtering a conveyance service request. A different geographical location can be used other than a real time or near real time geographical location of a conveyance client or the like when filtering a conveyance service offering. An application can expose or be accessed through an API relating to a service provider, a good supplier, a fleet manager, a logistics provider, a logistics supplier, a map provider, a third party, or the like.

There can be one or more applications on or associated with an autonomous vehicle. There can be one or more applications with different function that can reside on or be associated with one autonomous vehicle. For example, there can be two different applications on or associated with one autonomous vehicle, the first being a dealership application allowing for vehicle maintenance and the second being an application integrated with a central server that facilitates conveyance services. An application can be associated with a single autonomous vehicle or a fleet of autonomous vehicles.

The following provides different examples of an application that might be used by various parties:

A conveyance client can access an application via a terminal. A conveyance client can analyze or evaluate and then preferably secure or obtain a preferred conveyance service offering.

A representative can access an application via a terminal. A representative can analyze or evaluate and then secure or obtain a preferred conveyance service request.

A map provider can provide a visual representation via an application. A representative can analyze or evaluate and then secure or obtain a preferred conveyance service request. A conveyance client can analyze or evaluate and then preferably secure or obtain a preferred conveyance service offering.

Terminal: The following are illustrative, non-limiting examples of a "terminal" as used in the present disclosure:

A terminal can be a hardware that can facilitate an operation or a function to secure or obtain a preferred conveyance service request or a preferred conveyance service offering. A terminal can be a hardware that can be utilized or operated by a conveyance client, a representative, a map provider, a third party, an owner or a controller of an autonomous vehicle, a service provider, a good supplier, a fleet manager, a logistics provider, a logistics supplier, or a combination thereof.

A terminal can be a device that can facilitate operating an application. A terminal can be capable of communicating with a central server, an external server, an application, or a combination thereof, by way of a link. A terminal can be an electronic computing device that can include a computer processor, a computer readable memory, an input source, a geographical location module, a display, a network interface, or a combination thereof. A terminal can encompass hardware and/or software alone or in a combination.

A terminal can be a smartphone or the like that can be utilized to combine or integrate an application, a central server, an external server, a terminal, a link, or a combination thereof. A terminal can be used to access one or more of an application. An application can operate on a terminal. An operating system can run on a terminal. A terminal can facilitate one or more of a display function, an input function, an operation, or a combination thereof, of an application. An application can provide a real time or near real time geographical location of one or more of a representative, a conveyance client, a service provider, a good supplier, a fleet manager, a logistics provider, a logistics supplier, a map provider, a third party, an owner or a controller of an autonomous vehicle, or a combination thereof, using a geographical location module of a terminal. A terminal can be associated with a display or a remote display.

A terminal can be a computer, a smartphone device, a plug-in device, a mobile computing device, a handheld computing device, a tablet computing device, a laptop computing device, a wearable computing device, a portable computing device, a fixed computing device, a non-fixed computing device, a physiologically embedded computing device, a biologically integrated computing device, an in-Vehicle infotainment device, an internet of Things (IoT) device, a projecting device, a computing device embedded in a vehicle, a head-up display, a voice recognition, a voice control, or a combination thereof.

An Inertial Measurement Unit (IMU) reading of a terminal can be used to determine an orientation or a direction least one representative, a conveyance client, a service provider, a good supplier, a fleet manager, a logistics provider, a logistics supplier, a map provider, a third party, an owner or a controller of an autonomous vehicle, or a combination thereof. A geographical location module of a terminal can include a Global Positioning System (GPS), a satellite tracking, a RFID tracking, a radiolocation, a WiFi positioning system, geofencing, a global system for mobile communications, a cell phone triangulation, an internet tracking, or a combination thereof.

An application, a central server, an external server, a link, or a combination thereof, can be combined or integrated on a terminal, such as a smartphone. A terminal does not need a physical connection to be associated or communicate with an application, a link, a terminal, a central server, an external server, an autonomous vehicle, or a combination thereof.

A central server can optionally be located on a terminal. An input source of a terminal can be a touchscreen, a keypad, a keyboard, a voice controlled input, or a combination thereof. A visual representation can be displayed on an application using a display of a terminal. A terminal can be a smartphone that can be used by a representative, a conveyance client, an owner or a controller of an autonomous vehicle, a service provider, a good supplier, a fleet manager, a logistics provider, a logistics supplier, a map provider, a third party, or a combination thereof.

Link: The following are illustrative, non-limiting examples of a "link" as used in the present disclosure:

A link can be a software and/or a hardware that can facilitate an operation or a function to secure or obtain a preferred conveyance service request or a preferred conveyance service offering. A link can be a software and/or a hardware that can be utilized or operated by a conveyance client, a representative, an owner or a controller of an autonomous vehicle, a service provider, a good supplier, a fleet manager, a logistics provider, a logistics supplier, a map provider, a third party, or a combination thereof.

A link can be a connection or an association with a software function, a software operation, a software component, a software module, or a combination thereof. A link can connect or be associated with a software function or a software operation. At least one link can connect or be associated with a software module. A link can include an electronic communication network channel. A link can be an appropriate link that can allow an efficient, rapid, accurate, or the like transmission of information or data. A link can be a combination of a connection between a central server, an external server, a terminal, an application, an autonomous vehicle, or a combination thereof. Preferably, a link between one or more of a central server, an external server, a terminal, an application, or a combination thereof, can be via the Internet, preferably secure, and can be more preferably encrypted. The definition of a link can encompass hardware and/or software alone or in a combination.

A link can be utilized by a representative, a conveyance client, an owner or a controller of an autonomous vehicle, a service provider, a good supplier, a fleet manager, a logistics provider, a logistics supplier, a map provider, a third party, or a combination thereof, to communicate a conveyance service request. A link can be utilized by a representative, a conveyance client, an owner or a controller of an autonomous vehicle, a service provider, a good supplier, a fleet manager, a logistics provider, a logistics supplier, a map provider, a third party, or a combination thereof, to communicate a conveyance service offering.

A link can be utilized by a service provider, a good supplier, a fleet manager, an owner or a controller of an autonomous vehicle, a logistics provider, a logistics supplier, a representative, a conveyance client, a map provider, a third party, or a combination thereof, to facilitate a conveyance service.

A link can be utilized to communicate information or data relating to all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured or obtained preferred conveyance service request, a secured or obtained preferred conveyance service offering, or the like.

A link can communicate or provide data or information in real time or near real time and can refer to the highest level of development or state of the art. A link can be updated or refreshed in real time or near real time and can refer to being updated or refreshed in the highest level of development or state of the art. A link can perform a function in real time or near real time and can refer to being updated or refreshed in the highest level of development or state of the art.

A link can be in a form of a software interface or API. A link can be an inter-process communication. A link can be utilized to connect to or be associated with an application, a terminal, a central server, an external server, or a combination thereof, on one software application. A central server can connect to or communicate with an application, a terminal, a central server, an external server, or a combination thereof, on the same software application. A link can be utilized to connect to or be associated with an application, a terminal, a central server, an external server, or a combination thereof, to secure or obtain a preferred conveyance service offering, or a combination thereof. A link does not need a physical connection to connect or communicate with an application, a terminal, a central server, an external server, an autonomous vehicle, or a combination thereof.

A link can be any appropriate connection, such as one or more of type of connection selected from WiFi, a wireless, an ethernet, LTE, 3G, 4G, 5G, 6G or 7G, RFID, Bluetooth, BLE, PAN, LAN, MAN, WAN, WLAN, GSM, GPRS, UMTS, dial-up, broadband, mobile, DSL, cable, wired, satellite, ISDN, fiber-optic, infrared, client-server network such as a cloud computing network, another appropriate method, means, hardware and/or software capable of conveying information, or a combination thereof.

Examples are a link include a combination of a connection between a central server, an external server, a terminal, an application, or a combination thereof, that can be integrated or combined on a terminal, being a smartphone. An application, a central server, an external server, a link, or a combination thereof, can be combined or integrated on a terminal, such as a smartphone.

A link can be a combination of a connection between a central server, an external server, a terminal, an autonomous vehicle, an application, an application associated with an autonomous vehicle, or a combination thereof.

A link can be utilized by a representative, a conveyance client, an owner or a controller of an autonomous vehicle, a service provider, a good supplier, a fleet manager, a logistics provider, a logistics supplier, a map provider, a third party, or a combination thereof, to communicate a conveyance service request in conjunction with conveyance data, a filtered conveyance service request in conjunction with conveyance data, a preferred conveyance service request in conjunction with conveyance data, a conveyance service offering in conjunction with conveyance data, a filtered conveyance service offering in conjunction with conveyance data, a preferred conveyance service offering in conjunction with conveyance data, or a combination thereof, with one or more of a central server, an external server, a terminal, an autonomous vehicle, an application, an application associated with an autonomous vehicle, a map provider, a third party, a representative, a conveyance client, or a combination thereof.

A link can be a combination of a connection between a central server, an external server, a terminal, an autonomous vehicle, an application, an application associated with an autonomous vehicle, or a combination thereof. A link can connect a central server with another central server. A link can be utilized by an owner or a controller of an autonomous vehicle, a service provider, a good supplier, a fleet manager, a logistics provider, a logistics supplier, or a combination thereof, to communicate with a map provider or a third party indirectly or directly.

Central Server: The following are illustrative, non-limiting examples of a "central server":

A central server can be a software and/or a hardware that can facilitate an operation or a function to secure or obtain a preferred conveyance service request or a preferred conveyance service offering. A central server can be a software and/or a hardware that can be utilized or operated by a conveyance client, a representative, a service provider, a good supplier, a fleet manager, a logistics provider, a logistics supplier, a map provider, a third party, or a combination thereof. A central server can be a software and/or a hardware, a smartphone application, a computer application, a computer program, a website, a web application, a cloud application, a service, or the like.

A central server can facilitate an operation or a function to secure or obtain a preferred conveyance service request or a preferred conveyance service offering. A central server can include a computer processor, a computer readable memory, a network interface, or a combination thereof. A central server can be a computer network system. A central server can preferably encompass hardware and/or software alone or in a combination.

A central server can be associated with one or more of an external server, a link, a good supplier, an autonomous vehicle, an application, a central server, a service provider, a representative, a conveyance client, or a combination thereof. A central server can encompass different hardware and/or software alone or in a combination. A central server can include or connect to a database. A computer readable memory of a central server can be or include a database that a central server can use or connect to. A central server can store, retrieve, or utilize any information or data from a database, a real time database, a near real time database, a database trigger, a database table, a database row, a database column, a database result set, a database node, a database edge, a database property, a blockchain, a blockchain technology, or a combination thereof. A central server can store or retrieve any information or data in a database, a schema-less database, a graph database, a relational database, a non-relational database, a distributed database, a parallel database, or the like.

A central server can connect to or communicate with one or more of an application, an external server, a central server, a terminal, or a combination thereof, by way of a link. A central server can control at least one flow of information or data between one or more of an application, an external server, a central server, or a combination thereof, in either direction. A central server can be a server in an individual geographical location or an additional geographical location. A central server can preferably relate to a single Internet location, but that need not be the case.

A central server can communicate information or data relating to all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured or obtained preferred conveyance service request, a secured or obtained preferred conveyance service offering, or the like. A central server can communicate all or some of information or data with a central server, an external server, an application, or a combination thereof.

A central server can filter and identify all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured or obtained preferred conveyance service request, a secured or obtained preferred conveyance service offering, or a combination thereof, together or separately.

A central server can be a software and/or a hardware that can facilitate an operation or a function to secure or obtain a conveyance service request, a filtered conveyance service request, a preferred conveyance service request, a conveyance service offering, a filtered conveyance service offering, a preferred conveyance service offering, or a combination thereof.

A central server can secure or obtain a preferred conveyance service request, a filtered conveyance service request, a conveyance service request, a preferred conveyance service offering, a filtered conveyance service offering, a conveyance service offering, or a combination thereof, and can communicate directly or indirectly with a central server, an external server, an application, a terminal, an autonomous vehicle, an owner or a controller of an autonomous vehicle, a service provider, a good supplier, a fleet manager, a logistics provider, a logistics supplier, a third party, a map provider, a conveyance client, a representative, or a combination thereof.

A central server can standardize or convert a conveyance service request, structured in a different format, into a uniform format. A central server can standardize or convert a conveyance service offering, structured in a different format, into a uniform format. A central server can preferably be a secure server. A central server can be made secure using hardware and/or software commercially available. Additionally, a central server can include encryption software such that communications entering or exiting a server are encrypted. Encryption hardware and/or software are commercially available. A central server can be updated or refreshed in real time or near real time and can refer to being updated or refreshed in the highest level of development or state of the art. A central server can perform a function in real time or near real time and can refer to being updated or refreshed in the highest level of development or state of the art. A central server can use machine learning technology or the like to identify a pattern that can improve a visual representation.

A central server can use a database, a database table, a result set, or the like, to filter a conveyance service request or a conveyance service offering. A central server can use a database, a database table, a result set, or the like, to identify a preferred conveyance service request or a preferred conveyance service offering.

A central server can filter a conveyance service request relating to a representative preference and preferably a real time or near real time geographical location of a representative, to identify a filtered conveyance service request by a process of one or more of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

A central server can filter a conveyance service offering relating to a conveyance client preference and preferably a real time or near real time geographical location of a conveyance client, to identify a filtered conveyance service offering by a process of one or more of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

A central server can filter, categorize, or the like, a conveyance service request upon being received. A central server can filter, categorize, or the like, a conveyance service offering upon being received. A central server can filter, or the like, a conveyance service request or a conveyance service offering more than once. A central server can receive, transmit, store, standardize, aggregate, or a combination thereof, a conveyance service request in any order prior to filtering a conveyance service request. A central server can receive, transmit, store, standardize, aggregate, or a combination thereof, a conveyance service offering in any order prior to filtering a conveyance service offering.

A central server can identify a preferred conveyance service request from a filtered conveyance service request or a pre-filtered conveyance service request. A central server can identify a preferred conveyance service offering from a filtered conveyance service offering or a pre-filtered conveyance service offering.

A preferred conveyance service request relating to a representative preference can be identified from a filtered conveyance service request by using one or more of a sorting algorithm, a selection algorithm, a search algorithm, a merge algorithm, a maximum function, a minimum function, a graph algorithm, a graph search algorithm, a tree algorithm, a tree search algorithm, a matrix calculation, a matrix algorithm, a comparison, or a combination thereof.

A preferred conveyance service offering relating to a conveyance client preference can be identified from a filtered conveyance service offering by using one or more of a sorting algorithm, a selection algorithm, a search algorithm, a merge algorithm, a maximum function, a minimum function, a graph algorithm, a graph search algorithm, a tree algorithm, a tree search algorithm, a matrix calculation, a matrix algorithm, a comparison, or a combination thereof.

A central server can preferably sort, or the like, a filtered conveyance service request using a representative preference to identify a preferred conveyance service request. A filtered conveyance service request can preferably be sorted relating to a weighted average of a representative preference however, sorting is not required to identify a preferred conveyance service request. A central server can preferably sort, or the like, a filtered conveyance service offering using a conveyance client preference to identify a preferred conveyance service offering. A filtered conveyance service offering can preferably be sorted relating to a weighted average of a conveyance client preference however, sorting is not required to identify a preferred conveyance service offering. A central server can preferably sort, or the like, a filtered conveyance service request or a filtered conveyance service offering more than once to identify a preferred conveyance service request or a preferred conveyance service offering respectively.

A central server can preferably sort, or the like, a filtered conveyance service request in an order relating to a weighted average of a representative preference to identify a preferred conveyance service request. A central server can preferably sort, or the like, a filtered conveyance service offering in an order relating to a weighted average of a conveyance client preference to identify a preferred conveyance service offering.

A central server can process or facilitate one or more of a conveyance service request, a filtered conveyance service request, a preferred conveyance service request, or a combination thereof, relating to a service provider operating in a conveyance industry segment. A central server can process or facilitate one or more of a conveyance service offering, a filtered conveyance service offering, a preferred conveyance service offering, or a combination thereof, relating a service provider operating in a conveyance industry segment. A central server can use or have a default representative preference, a default conveyance client preference, or a combination thereof.

If a conveyance service request is pre-filtered or pre-categorized, then a conveyance service request can be perceived or referred to as a filtered conveyance service request and a central server can identify a preferred conveyance service request. If a conveyance service offering is pre-filtered or pre-categorized, then a conveyance service offering can be perceived or referred to as a filtered conveyance service offering and a central server can identify a preferred conveyance service offering.

A computer readable memory of a central server can be a database, a database table, a database result set, a cloud storage, a hard disk drive, a solid state drive, an optical disk drive, a flash memory, a random Access Memory (RAM), a tape, or a combination thereof.

A central server can include a distinct server operably linked in the same or a different geographical location. A central server can optionally be part of a terminal. A central server can optionally be part of an application. A central server can optionally be located on a terminal. An application can optionally operate on a central server. A function of a central server or an external server can be performed by an application. A function of an application can be performed by a central server or an external server. A function of a central server can be performed by an external server. A central server can include or utilize quantum computing. A central server can include or utilize a neural network. A central server can include or utilize machine learning technology or the like. A central server can be dispersed across a geographical location such as Los Angeles and New York.

A central server can aggregate a conveyance service request, a conveyance service offering, or a combination thereof, within a service provider, an owner or a controller of an autonomous vehicle, a good supplier, a fleet manager, a logistics provider, a logistics supplier, a map provider, or a combination thereof. A central server can process or facilitate a conveyance service request, a filtered conveyance service request, a preferred conveyance service request, a conveyance service offering, a filtered conveyance service offering, a preferred conveyance service offering, or a combination thereof, from an individual service provider relating to an individual conveyance industry segment. A central server can compile a visual representation to be transmitted to an application.

A conveyance service request, a conveyance service offering, all or some of a real time or near real time geographical location of a representative, all or some of a real time or near real time geographical location of a conveyance client, or a combination thereof, can be transmitted from an external server to a central server by way of a link. A conveyance service request, a conveyance service offering, all or some of a real time or near real time geographical location of a conveyance client, all or some of a real time or near real time geographical location of a representative or a combination thereof, can be transmitted from a service provider, an owner or a controller of an autonomous vehicle, a good supplier, a fleet manager, a logistics provider, a logistics supplier, a map provider, or a combination thereof, to a central server by way of a link.

A conveyance service request can be structured in a uniform format prior to being transmitted from an external server and is not needed to be standardized. A conveyance service offering can be structured in a uniform format prior to being transmitted from an external server and is not needed to be standardized.

A central server can execute a function of the present invention for a conveyance client for one or more of receiving, standardizing, aggregating, filtering, and preferably sorting, or the like, a conveyance service offering, and securing or obtaining a preferred conveyance service offering.

A central server can execute a function of the present invention for a representative and/or an autonomous vehicle for one or more of receiving, standardizing, aggregating, filtering and preferably sorting, a conveyance service request, and securing or obtaining a preferred conveyance service request.

A different geographical location can be used other than a real time or near real time geographical location of a representative when filtering a conveyance service request. A different geographical location can be used other than a real time or near real time geographical location of a conveyance client when filtering a conveyance service offering.

A conveyance client preference, preferably a real time or near real time geographical location of a conveyance client, or a combination thereof, can be transmitted to a central server at any time prior to filtering a conveyance service offering. A representative preference, preferably a real time or near real time geographical location of a representative, or a combination thereof, can be transmitted to a central server at any time prior to filtering a conveyance service request.

A central server can use an equal weight or an unequal weight for a representative preference when calculating a weighted average to identify a preferred conveyance service request. A central server can use an equal weight or an unequal weight for a conveyance client preference when calculating a weighted average to identify a preferred conveyance service offering.

When a central server receives a conveyance service request or a conveyance service offering, a central server can categorize or pre-filter a conveyance service request or a conveyance service offering. A central server can obtain or receive a pre-filtered or a pre-categorized conveyance service request relating to a geographical area. A central server can obtain or receive a pre-filtered or a pre-categorized conveyance service request relating to a level of service. A central server can obtain or receive a pre-filtered or a pre-categorized a conveyance service offering relating to a geographical area. A central server can obtain or receive a pre-filtered or a pre-categorized a conveyance service offering relating to a level of service. A conveyance service request or a conveyance service offering can be pre-filtered or pre-categorized on a central server based on a geographical area. A conveyance service request or a conveyance service offering can be pre-filtered or pre-categorized on a central server based on a level of service.

When a central server receives all or some of conveyance service offerings or all or some of conveyance service requests, a central server can categorize or pre-filter all or some of conveyance service offerings or all or some of conveyance service requests. A central server can obtain or receive all or some of pre-filtered conveyance service offerings, or all or some of a pre-categorized conveyance service requests, relating to a geographical area. A central server can obtain or receive all or some of a pre-filtered conveyance service requests or all or some of pre-categorized conveyance service offerings, relating to a level of service. All or some of conveyance service requests or all or some of conveyance service offerings can be pre-filtered or pre-categorized on a central server based on a geographical area. All or some of conveyance service requests or all or some of conveyance service offerings can be pre-filtered or pre-categorized on a central server based on a level of service.

A conveyance service request can be pre-filtered or pre-categorized on an external server or a central server, a conveyance service request can become a filtered conveyance service request and filtering is not required on a central server. If a conveyance service request is pre-filtered or pre-categorized, a central server does not need to filter a conveyance service request and can identify a preferred conveyance service request.

A conveyance service offering can be pre-filtered or pre-categorized on an external server or a central server, a conveyance service offering can become a filtered conveyance service offering and filtering is not required on a central server. If a conveyance service offering is pre-filtered or pre-categorized, a central server does not need to filter a conveyance service offering and can identify a preferred conveyance service offering.

A conveyance service request can be filtered based on a representative preference on a central server after being pre-filtered or pre-categorized. A conveyance service request can be filtered based on a representative preference on a central server after being pre-filtered or pre-categorized on an external server. A conveyance service offering can be filtered based on a conveyance client preference on a central server after being pre-filtered or pre-categorized. A conveyance service offering can be filtered based on a conveyance client preference on a central server after being pre-filtered or pre-categorized on an external server.

When a central server obtains a pre-filtered conveyance service request, a central server can compare a pre-filtered conveyance service request to a representative preference to identify a filtered conveyance service request. When a central server obtains a pre-filtered conveyance service offering, a central server can compare a pre-filtered conveyance service offering to a conveyance client preference to identify a filtered conveyance service offering.

If a conveyance service request or a conveyance service offering is pre-filtered, then a conveyance service request or a conveyance service offering is not filtered. A pre-filtered conveyance service request or a pre-filtered conveyance service offering can be perceived or referred to as a filtered conveyance service request or a filtered conveyance service offering respectively. A central server can filter a conveyance service request or a conveyance service offering at least once. A central server can preferably sort, or the like, a conveyance service request or a conveyance service offering at least once to identify a preferred conveyance service request or a preferred conveyance service offering. A central server can filter a conveyance service request or a conveyance service offering more than once based on a pricing preference and then a service provider preference. A conveyance service request or a conveyance service offering can be categorized by a geographical location after being received on a central server.

A filtered conveyance service request can preferably be sorted in an ascending or descending order relating to a weighted average of a representative preference to identify a preferred conveyance service request. A filtered conveyance service offering can preferably be sorted in an ascending or descending order relating to a weighted average of a conveyance client preference to identify a preferred conveyance service offering.

A preferred conveyance service request, a filtered conveyance service request, or a combination thereof, can be identified or updated in real time or near real time as a real time or near real time geographical location of a representative updates or changes. A preferred conveyance service offering, a filtered conveyance service offering, or a combination thereof, can be identified or updated in real time or near real time as a real time or near real time geographical location of a conveyance client updates or changes.

A preferred conveyance service request, a preferred conveyance service offering, a filtered conveyance service request, a filtered conveyance service offering, a conveyance client preference, a representative preference, a secured or obtained preferred conveyance service request, a secured or obtained preferred conveyance service offering, or a combination thereof, can be identified or updated in real time or near real time as traffic information updates or changes.

A central server can secure or obtain a preferred conveyance service request, a filtered conveyance service request, or a combination thereof, and can communicate directly with an external server or a service provider. A central server can secure or obtain a preferred conveyance service offering, a filtered conveyance service offering, or a combination thereof, and can communicate directly with an external server or a service provider.

A secured or obtained preferred conveyance service request or a secured or obtained preferred conveyance service offering can be sent to one or more of a service provider, an external server, a good supplier, a fleet manager, a logistics provider, a logistics supplier, a representative, a conveyance client, a map provider, or a combination thereof.

A central server, an external server, an application, a terminal, a link, or a combination thereof, can be combined or integrated. A central server can manage or process a conveyance service offering the same as a conveyance service request. A central server can manage or process a conveyance service request the same as a conveyance service offering. A conveyance service offering or a conveyance service request can be pre-filtered or pre-categorized on a central server, an external server, an application, or a combination thereof.

A central server can use a graph database to identify a preferred conveyance service request, a preferred conveyance service offering, or a combination thereof, that can be in the closest proximity. A central server can utilize a directed graph or an undirected graph with a node and/or an edge to identify an autonomous vehicle within the shortest travel time to a conveyance client, a preferred conveyance service request, a preferred conveyance service offering, or a combination thereof.

System: The following are illustrative, non-limiting examples of a "system":

A system can be a collection of elements of the present invention that can secure or obtain a preferred conveyance service request or a preferred conveyance service offering. A system can be a collection of elements of the present invention, where an element can be associated or integrated with another element. The collection of elements or individual elements can be in the same or different locations. A system can be a computer program product.

In embodiments of the present invention, conveyance client, an application, a representative, a terminal, a link, a central server, an external server, a service provider, a good supplier, a map provider, an autonomous vehicle, a visual representation, a dynamic map, a heat map, a real time or near real time heat map, a historical heat map, a predictive heat map, a representative preference, a conveyance client preference, conveyance data, a conveyance service request, a filtered conveyance service request, a preferred conveyance service request, a conveyance service offering, a filtered conveyance service offering, and a preferred conveyance service offering can all be in a similar geographical location, or spread out in a distant location, including a cross-border location.

A system can be used to analyze or evaluate and preferably secure or obtain a preferred conveyance service request or a preferred conveyance service offering relating to a service provider or the like operating in a conveyance industry segment. A system can be updated or refreshed in real time or near real time and can refer to being updated or refreshed in the highest level of development or state of the art. A system can perform a function in real time or near real time and can refer to being updated or refreshed in the highest level of development or state of the art.

Method: The following are illustrative, non-limiting examples of a "method" as used in the present disclosure:

A method can be a collection of elements of the present invention that can secure or obtain a preferred conveyance service request or a preferred conveyance service offering. A method can be a collection of elements of the present invention in which an element can be associated or integrated with another element. The collection of elements or individual elements can be in the same or different locations. A method can be a computer program product.

In some embodiments, a conveyance client, an application, a representative, a terminal, a link, a central server, an external server, a service provider, a good supplier, a map provider, an autonomous vehicle, a visual representation, a dynamic map, a heat map, a real time or near real time heat map, a historical heat map, a predictive heat map, a representative preference, a conveyance client preference, conveyance data, a conveyance service request, a filtered conveyance service request, a preferred conveyance service request, a conveyance service offering, a filtered conveyance service offering, and a preferred conveyance service offering can all be in a similar geographical location, or spread out in a distant location, including a cross-border location.

A method can be used to analyze or evaluate and preferably secure or obtain a preferred conveyance service request or a preferred conveyance service offering relating to a service provider or the like operating in a conveyance industry segment. A method can be updated or refreshed in real time or near real time and can refer to being updated or refreshed in the highest level of development or state of the art. A method can perform a function in real time or near real time and can refer to being updated or refreshed in the highest level of development or state of the art.

External Server: The following are illustrative, non-limiting examples of an "external server" as used in the present disclosure. As previously noted, "external server" may be one or more than one external server.

An external server can be a software and/or a hardware that can facilitate an operation or a function to secure or obtain a preferred conveyance service request or a preferred conveyance service offering. An external server can be a software and/or a hardware that can be utilized or operated by a conveyance client, a representative, a service provider, a good supplier, a fleet manager, an owner or a controller of an autonomous vehicle, a logistics provider, a logistics supplier, a map provider, a third party, or a combination thereof. An external server can be a software and/or a hardware, a computer application, a computer program, an API, a smartphone application, a website, a web application, a smartphone application, a cloud application, a service, or the like.

An external server can communicate information or data relating to all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured or obtained preferred conveyance service request, a secured or obtained preferred conveyance service offering, or the like. An external server can communicate all or some of information or data with a central server, an external server, an application, or a combination thereof.

An external server can be a software and/or a hardware that can facilitate an operation or a function to secure or obtain a conveyance service request, a filtered conveyance service request, a preferred conveyance service request, a conveyance service offering, a filtered conveyance service offering, a preferred conveyance service offering, or a combination thereof.

An external server can expose or be accessed through an API relating to a service provider, a good supplier, an owner or a controller of an autonomous vehicle, a fleet manager, a logistics provider, a logistics supplier, a map provider, a third party, or the like.

All or some of conveyance data relating to a conveyance service request or a conveyance service offering can be sourced or provided by an external server that can be associated with a service provider, a good supplier, a fleet manager, a logistics provider, a logistics supplier, an owner or a controller of an autonomous vehicle, a map provider, a third party, or a combination thereof. All or some of conveyance data relating to an autonomous vehicle can be sourced or provided by an external server that can also have or provide a conveyance service request, a conveyance service offering, or a combination thereof. All or some of conveyance data relating to an autonomous vehicle can be sourced or provided by an external server that does not have or does not provide a conveyance service request, a conveyance service offering, or a combination thereof. An autonomous vehicle, all or some of conveyance data relating to an autonomous vehicle, or a combination thereof, can be sourced or provided by a third party.

An external server can include a source of a conveyance service request, a conveyance service offering, or a combination thereof. An external server can be a source of a real time or near real time conveyance service request. An external server can be a source of a real time or near real time conveyance service offering. An external server can be a computer network system. An external server can include a computer processor, a computer readable memory, and a network interface. An external server preferably can encompass hardware and/or software alone or in a combination.

All or some of conveyance data relating to a conveyance service request or a conveyance service offering can be transmitted to or communicated with a central server, an external server, an application, an application that can be associated with an autonomous vehicle, a terminal, an autonomous vehicle, an owner or a controller of an autonomous vehicle, a service provider, a good supplier, a fleet manager, a logistics provider, a logistics supplier, a map provider, a third party, a conveyance client, a representative, or a combination thereof.

A preferred conveyance service request or a preferred conveyance service offering can be secured or obtained through or by a central server, an application, an external server, a terminal, a link, or a combination thereof. An external server can have or be associated with a database based on a data point. An external server can have or be associated with a database for a conveyance service request, a conveyance service offering, or a combination thereof. An external server can have or be associated with a database based on a conveyance client preference, a representative preference, or a combination thereof. An external server can have or be associated with a database for a conveyance industry segment. An external server can have or be associated with a conveyance industry segment.

An external server can be a server that can connect to or communicate with a central server, an application, or a combination thereof, by way of a link. An external server can transmit in real time or near real time one or more of a conveyance service request in conjunction with conveyance data, a conveyance service offering in conjunction with conveyance data, or a combination thereof, to a central server or an application by way of a link. An external server can encompass different hardware and/or software alone or in a combination. An external server can include or connect to a database. A computer readable memory of an external server can be a database that an external server can connect to.

An external server can have or be associated with one or more of a central server, an external server, a link, a terminal, a good supplier, an autonomous vehicle, an application, a service provider, a good supplier server, a fleet manager server, an owner or a controller of an autonomous vehicle server, a logistics provider, a logistics supplier, a map provider, a third party, a conveyance client, a representative, or a combination thereof. An external server can optionally be perceived or referred to as a service provider server, a good supplier server, a fleet manager server, an owner or a controller of an autonomous vehicle server, a logistics provider server, a logistics supplier server, a map provider server, a third party server, or the like.

An external server can be a server in an individual geographical location or an additional geographical location. An external server can preferably relate to a single Internet location, but that need not be the case. Preferably, an external server can be a secure server. An external server can be made secure using hardware and/or software commercially available. Additionally, an external server can include encryption software such that communications entering or exiting an external server are encrypted. Encryption hardware and/or software are commercially available.

An external server can be associated with an Application Program Interface (API) or the like. An external server Application Program Interface (API) or the like can be used to facilitate communication between one or more of a central server, an external server, an application, a terminal, a conveyance client, a representative, a map provider, a third party, a service provider, a good supplier, an owner or a controller of an autonomous vehicle, a fleet manager, a logistics provider, a logistics supplier, or a combination thereof. An external server can provide a conveyance service request in conjunction with conveyance data, a conveyance service offering in conjunction with conveyance data, or a combination thereof, relating to a service provider or the like operating in a conveyance industry segment. An external server can be updated or refreshed in real time or near real time and can refer to being updated or refreshed in the highest level of development or state of the art. An external server can perform a function in real time or near real time and can refer to being updated or refreshed in the highest level of development or state of the art.

An external server being a source of a conveyance service request, a conveyance service offering, or a combination thereof, can be associated with an individual service provider, an individual good supplier, an individual fleet manager, an individual owner or an individual controller of an autonomous vehicle, an individual logistics provider, an individual logistics supplier, an individual map provider, an individual third party, an individual representative, an individual conveyance client, or the like.

An individual service provider, an individual map provider, or the like can be associated with an external server that can use or have a database based on a data point. An individual service provider, an individual map provider, or the like can be associated with an external server that can use or have a database for a conveyance service request, a conveyance service offering, or a combination thereof. An individual service provider, an individual map provider, or the like can be associated with an external server that can use or have a database based on a conveyance client preference or a representative preference. An individual service provider, an individual map provider, or the like can be associated with an external server that can use or have a database for a conveyance industry segment. An individual service provider, an individual map provider, or the like can use or have an external server relating to a conveyance industry segment being a ride-hail industry segment and another external server relating to a conveyance industry segment being a freight industry segment. An individual service provider, an individual map provider, or the like can use or have an external server for a conveyance service request, a conveyance service offering, or a combination thereof.

An external server can operate on a central server. An external server can include a distinct server operably linked in the same or a different geographical location. An external server can optionally be perceived or referred to as a peer-to-peer network. An external server can transmit a conveyance service request, a conveyance service offering, or a combination thereof, that can be pre-standardized to or with a central server or an application. An external server can be a server that can connect to or communicate with an application, a central server, or a combination thereof, by way of a link. A function of an external server can be performed by a central server.

A conveyance service request can be filtered based on a representative preference on a central server, an external server, an application, or a combination thereof, after being pre-filtered or pre-categorized on a central server, an external server, or an application, or a combination thereof. A conveyance service offering can be filtered based on a conveyance client preference on a central server, an external server, an application, or a combination thereof, after being pre-filtered or pre-categorized on a central server, an external server, or an application, or a combination thereof.

An external server can pre-filter or pre-categorize a conveyance service request, a filtered conveyance service request, a preferred conveyance service request, a conveyance service offering, a filtered conveyance service offering, a preferred conveyance service offering, or a combination thereof. An external server can pre-filter or pre-categorize a conveyance service request, a filtered conveyance service request, a preferred conveyance service request, a conveyance service offering, a filtered conveyance service offering, a preferred conveyance service offering, or a combination thereof, and a central server or an application does not need to filter or identify as preferred. An external server can pre-filter or pre-categorize a conveyance service request, a filtered conveyance service request, a preferred conveyance service request, a conveyance service offering, a filtered conveyance service offering, a preferred conveyance service offering, or a combination thereof, relating to a geographical area. An external server can pre-filter or pre-categorize a conveyance service request, a filtered conveyance service request, a preferred conveyance service request, a conveyance service offering, a filtered conveyance service offering, a preferred conveyance service offering, or a combination thereof, relating to a level of service preference.

An external server can filter and identify one or more of all or some of a preferred conveyance service request, all or some of a filtered conveyance service request, all or some of a conveyance service request, all or some of a preferred conveyance service offering, all or some of a filtered conveyance service offering, all or some of a conveyance service offering, all or some of subsequent or additional plurality of filtered conveyance service offerings, all or some of subsequent or additional a preferred conveyance service offering, a beginning service geographical location, an ending service geographical location, all or some of a real time or near real time geographical location of a representative, all or some of a real time or near real time geographical location of a conveyance client, a representative preference, a conveyance client preference, a secured or obtained preferred conveyance service request, a secured or obtained preferred conveyance service offering, or a combination thereof, together or separately.

An external server, a central server, an application, a terminal, a link, or a combination thereof, can be combined or integrated. An external server, a central server, an application, a terminal, a link, or a combination thereof, can be combined or integrated on a smartphone. An external server can manage or process a conveyance service offering the same or similar as a conveyance service request. An external server can manage or process a conveyance service request the same or similar as a conveyance service offering.

An external server can secure or obtain a preferred conveyance service request, a filtered conveyance service request, a conveyance service request, a preferred conveyance service offering, a filtered conveyance service offering, a conveyance service offering, or a combination thereof, and can communicate directly or indirectly with a central server, an external server, an application, an autonomous vehicle, an owner or a controller of an autonomous vehicle, a service provider, a good supplier, a fleet manager, a logistics provider, a logistics supplier, a map provider, a third party, a representative, a conveyance client, or a combination thereof.

A preferred conveyance service request or a preferred conveyance service offering can be secured or obtained by a central server or an external server through an application. A preferred conveyance service request or a preferred conveyance service offering can be secured or obtained and transmitted between an application and a central server by way of a link. A preferred conveyance service request or a preferred conveyance service offering can be secured or obtained and transmitted between an application and an external server by way of a link. A preferred conveyance service request or a preferred conveyance service offering can be secured or obtained and transmitted between an application and an external server through a central server by way of a link. An external server can connect to or communicate with two central servers belonging to two different entities. A secured or obtained preferred conveyance service request, a secured or obtained preferred conveyance service offering, or a combination thereof, can be transmitted from an application to an external server or a central server through a link.

Conveyance Data: The following are illustrative, non-limiting examples of "conveyance data" as used in the present disclosure:

Conveyance data can preferably be in real time or near real time and may include one or more of a beginning service geographical location, a ending service geographical location, pricing information, elevated pricing information, a representative preference, a conveyance client preference, a distance parameter, an estimated time of arrival, a time to destination, a conveyance client geographical location, a conveyance client review, a conveyance client rating, a conveyance client detail, a conveyance service detail, a conveyance service route, a preferred conveyance client, a sensor data, a representative geographical location, a representative review, a representative rating, a representative detail, an autonomous vehicle geographical location, an autonomous vehicle review, an autonomous vehicle rating, an autonomous vehicle detail, a preferred autonomous vehicle, a route planning preference, a fuel economy preference, a battery longevity preference, a vehicle capacity preference, a vehicle diagnostic preference, a conveyance data preference, a service provider geographical location, a service provider review, a service provider rating, a service provider detail, a preferred service provider, a good supplier geographical location, a good supplier review, a good supplier rating, a good supplier detail, a preferred good supplier, an owner or controller of an autonomous vehicle geographical location, an owner or controller of an autonomous vehicle review, an owner or controller of an autonomous vehicle rating, an owner or controller of an autonomous vehicle detail, a preferred owner or controller of an autonomous vehicle, a fleet manager geographical location, a fleet manager review, a fleet manager rating, a fleet manager detail, a preferred fleet manager, a logistics provider geographical location, a logistics provider review, a logistics provider rating, a logistics provider detail, a preferred logistics provider, a logistics supplier geographical location, a logistics supplier review, a logistics supplier rating, a logistics supplier detail, a preferred logistics supplier, a conveyance industry segment detail, a preferred conveyance industry segment, a good detail, an item detail, a type of vehicle detail, a vehicle detail, a measurement of one or more statistical variable, a level of service detail, fuel consumption, battery level, vehicle diagnostic, vehicle capacity, or a combination thereof.

Conveyance data can be information or data that can be used to facilitate an operation or a function to secure or obtain a preferred conveyance service request or a preferred conveyance service offering. Conveyance data can be information or data that can be utilized or managed by a representative, a conveyance client, a service provider, a good supplier, an owner or a controller of an autonomous vehicle, a fleet manager, a logistics provider, a logistics supplier, a map provider, a third party, or a combination thereof.

Conveyance data can be data or information corresponding to a past metric, a current metric, a future metric, or a combination thereof, relating to a request or offering for transporting a person, a good, an article, a thing, or a combination thereof from a geographical location to another geographical location.

Conveyance data relating to a representative, a conveyance service request, a real time or near real time geographical location of a representative, or a combination thereof, can be sourced or provided from an external server, a central server, an application, or the like. Conveyance data relating to a representative, a conveyance service request, a real time or near real time geographical location of a representative, or a combination thereof, can be sourced or provided by a service provider, a good supplier, an owner or a controller of an autonomous vehicle, a fleet manager, a logistics provider, a logistics supplier, a map provider, a third party, a representative, or the like.

Conveyance data relating to a conveyance client, a conveyance service offering, a real time or near real time geographical location of a conveyance client, or a combination thereof, can be sourced or provided from an external server, a central server, an application, or the like. Conveyance data relating to a conveyance client, a conveyance service offering, a real time or near real time geographical location of a conveyance client, or a combination thereof, can be sourced or provided by a service provider, a good supplier, an owner or a controller of an autonomous vehicle, a fleet manager, a logistics provider, a logistics supplier, a map provider, a third party, a conveyance client, or the like.

Conveyance data relating to a representative, a conveyance service request, a real time or near real time geographical location of a representative, or a combination thereof, can be generated by an external server, a central server, an application, or the like. Conveyance data relating to a representative, a conveyance service request, a real time or near real time geographical location of a representative, or a combination thereof, can be generated by a service provider, a good supplier, an owner or a controller of an autonomous vehicle, a fleet manager, a logistics provider, a logistics supplier, a map provider, a third party, a representative, or the like.

Conveyance data relating to a conveyance client, a conveyance service offering, a real time or near real time geographical location of a conveyance client, or a combination thereof, can be generated by an external server, a central server, an application, or the like. Conveyance data relating to a conveyance client, a conveyance service offering, a real time or near real time geographical location of a conveyance client, or a combination thereof, can be generated by a service provider, a good supplier, an owner or a controller of an autonomous vehicle, a fleet manager, a logistics provider, a logistics supplier, a map provider, a third party, a conveyance client, or the like.

Conveyance data can be sourced, provided, or generated by a technology, a software, a hardware, or a combination thereof, relating to a representative or a conveyance client. All or some of conveyance data relating to a conveyance service request or a conveyance service offering can be used by a service provider, a good supplier, a fleet manager, an owner or a controller of an autonomous vehicle, a logistics provider, a logistics supplier, a map provider, a third party, a conveyance client, a representative, or a combination thereof, to analyze or evaluate and then secure or obtain a preferred conveyance service request or a preferred conveyance service offering.

Conveyance data can be any data or information corresponding to a conveyance service request, a filtered conveyance service request, a preferred conveyance service request, or a combination thereof, that can be transmitted between an external server, a central server, an application, a terminal, or a combination thereof, by way of a link. Conveyance data can be any data or information corresponding to a conveyance service offering, a filtered conveyance service offering, a preferred conveyance service offering, or a combination thereof, that can be transmitted between an external server, a central server, an application, a terminal, or a combination thereof, by way of a link. Conveyance data can be, used by a representative, a conveyance client, or a combination thereof, to analyze or evaluate and then secure or obtain a conveyance service.

Conveyance data can be transmitted from an external server to a central server, an application, an external server, or a combination thereof. Conveyance data retrieved from an external server can be cached on a central server, an application, an external server, or a combination thereof, to provide enhanced performance and better avoid a relevant limitation one or more of a central server limitation, an external server limitation, a service provider or the like limitation, a link limitation, and any involved service provider or the like limitation.

Conveyance data can be stored or cached in a database. Conveyance data can be stored or cached in a database table. Conveyance data can be updated or refreshed in real time or near real time and can refer to being updated or refreshed in the highest level of development or state of the art. Conveyance data can correspond to a preferred conveyance service request, a filtered conveyance service request, a conveyance service request, or a combination thereof, relating to a service provider, a good supplier, an owner or a controller of an autonomous vehicle, a fleet manager, a logistics provider, a logistics supplier, a map provider, a third party, a conveyance client, a representative, or a combination thereof, operating in a conveyance industry segment. Conveyance data can correspond to a preferred conveyance service offering, a filtered conveyance service offering, a conveyance service offering, or a combination thereof, relating to a service provider, a good supplier, an owner or a controller of an autonomous vehicle, a fleet manager, a logistics provider, a logistics supplier, a map provider, a third party, a conveyance client, a representative, or a combination thereof, operating in a conveyance industry segment.

All or some of conveyance data can be any data or information relating to a conveyance service request, a filtered conveyance service request, a preferred conveyance service request, or a combination thereof, that can be used to filter a conveyance service request into a filtered conveyance service request. All or some of conveyance data can be any data or information relating to a conveyance service offering, a filtered conveyance service offering, a preferred conveyance service offering, or a combination thereof, that can be used to filter a conveyance service offering into a filtered conveyance service offering.

All or some of conveyance data can be any data or information relating to a conveyance service request, a filtered conveyance service request, a preferred conveyance service request, or a combination thereof, that can be used to identify a preferred conveyance service request from a filtered conveyance service request. All or some of conveyance data can be any data or information relating to a conveyance service offering, a filtered conveyance service offering, a preferred conveyance service offering, or a combination thereof, that can be used to identify a preferred conveyance service offering from a filtered conveyance service offering.

All or some of conveyance data can be any data or information relating to a conveyance service request, a filtered conveyance service request, a preferred conveyance service request, a conveyance service offering, a filtered conveyance service offering, a preferred conveyance service offering, or a combination thereof, can be stored, aggregated, standardized, filtered, identified as preferred, or the like.

All or some of conveyance data can be any data or information relating to a conveyance service request, a filtered conveyance service request, a preferred conveyance service request, a conveyance service offering, a filtered conveyance service offering, a preferred conveyance service offering, or a combination thereof, can be pre-filtered or pre-categorized. All or some of conveyance data relating to a conveyance service request, a filtered conveyance service request, a preferred conveyance service request, a conveyance service offering, a filtered conveyance service offering, a preferred conveyance service offering, or a combination thereof, can be pre-filtered or pre-categorized based on all or some of a real time or near real time geographical location of a representative or a conveyance client respectfully.

Conveyance data can be used by a central server, an external server, an application, a representative, a conveyance client, or a combination thereof, to analyze or evaluate and then secure or obtain a preferred conveyance service request or a preferred conveyance service offering.

Conveyance data can be optimized to identify a preferred conveyance service request or a preferred conveyance service offering. Conveyance data can include optimization data that can come from an autonomous vehicle, an autonomous vehicle sensor, a sensor data, a third party provider, a mapping provider, a remote server, an external server, a service provider, a conveyance client, a representative, or the like. Conveyance data can include demographic data relating to a geographical area, a conveyance service request, a conveyance service offering, all or some of conveyance data, all or some of conveyance data relating to an autonomous vehicle, a conveyance client, a representative, an autonomous vehicle, an owner or a controller of an autonomous vehicle, a service provider, a good supplier, a fleet manager, a logistics provider, a logistics supplier, a map provider, a third party, or the like.

Conveyance data can include a statistical variable of a filtered conveyance service request or a filtered conveyance service offering. Conveyance data can include a statistical variable of a preferred conveyance service request or a preferred conveyance service offering.

All or some of conveyance data can be communicated with an application, a terminal, a central server, an external server, a link, or a combination thereof, that can be combined or integrated. Conveyance data can include a vehicle detail or an autonomous vehicle detail, which can be used to identify a preferred vehicle type, a preferred vehicle service, or a combination thereof. Conveyance data relating to a conveyance service offering or a conveyance service request can be sourced or provided by an external server relating to an owner or a controller of an autonomous vehicle, a service provider, a good supplier, a fleet manager, a logistics provider, a logistics supplier, a map provider, a third party, or the like. All or some of conveyance data can be related to a scooter, a scooter service, a bicycle, a bicycle service, or the like.

Conveyance data can be generated or provided from a central server, an application, an external server, a terminal, or a combination thereof. Conveyance data relating to a statistical variable can be used to compile a heat map. Conveyance data relating to a statistical variable can comprise a measurement of an of conveyance service availability, pricing, elevated pricing, conveyance service request density, filtered conveyance service request density, preferred conveyance service request density, conveyance service offering density, filtered conveyance service offering density, preferred conveyance service offering density, level of service density, a conveyance service distance, an estimated time of arrival, preferred conveyance client density, preferred good supplier density, a preferred conveyance industry segment, conveyance industry segment density, representative density, conveyance client density, service provider density, good supplier density, or a combination thereof.

All or some of conveyance data relating to a conveyance service offering or a conveyance service request, can include optimization data that can be provided by a third party map provider to be utilized with route planning and identifying a preferred conveyance service offering or a preferred conveyance service request. Conveyance data can relate to a battery level of a device or a terminal belonging to a conveyance client. Conveyance data can include milestones, awards, incentives, number of rides completed, monetary earnings, financial information, or scheduling information.

A sensor data relating to an autonomous vehicle can be communicated to another autonomous vehicle, a service provider, a good supplier, an owner or a controller of an autonomous vehicle, a fleet manager, a logistics provider, a logistics supplier, a map provider, a third party, a conveyance client, a representative, or a combination thereof. A sensor data can be used to communicate a status of an autonomous vehicle. A real time or near real time geographical location of an autonomous vehicle can be based on or related to a sensor data. Conveyance data relating to an autonomous vehicle such as a real time or near real time geographical location of an autonomous vehicle can be sourced or provided by an external server. All or some of conveyance data sourced or provided by an autonomous vehicle can be sourced from a various type of input such as a sensor, a transceiver, a receiver, an interface, an application, a terminal, or the like.

Conveyance Service Request: The following are illustrative, non-limiting examples of a "conveyance service request" as used in the present disclosure A conveyance service request can be a request from a conveyance client or an entity for the transportation of one or more of a person, a good, an article, a thing, or a combination thereof from a geographical location to another geographical location. Once a beginning service geographical location, an ending service geographical location, or a combination thereof, is inputted or provided into an application, a central server or an external server, a conveyance service request relating to a conveyance client can be generated. When a conveyance service request is considered, a conveyance service request can also be considered.

A conveyance service request can be sourced or provided from one or more of an external server, a service provider, a good supplier, a fleet manager, a map provider, a third party, or the like. A conveyance service request can be stored or cached in a computer readable memory and/or a database of a central server. A conveyance service request can relate to a conveyance industry segment. A conveyance service request can relate to a service provider, a good supplier, a fleet manager, an owner or a controller of an autonomous vehicle, a logistics provider, a logistics supplier, a map provider, a third party, a representative, a conveyance client, or a combination thereof.

All or some of a conveyance service request can have or be associated with corresponding conveyance data. All or some of a conveyance service request can have or be associated with intrinsic conveyance data that can be stored in a database. All or some of a conveyance service request can be associated with or inherently have associated conveyance data that can be used to filter and identify a preferred conveyance service request to be secured or obtained.

A conveyance service request can be updated or refreshed in real time or near real time and can refer to being updated or refreshed in the highest level of development or state of the art. A conveyance service request can be pre-filtered or pre-categorized on a central server, an external server, an application, or a combination thereof. A conveyance service request can be a filtered conveyance service request, a preferred conveyance service request, or a combination thereof, relating to a representative preference. A conveyance service request can become a filtered conveyance service request, a preferred conveyance service request, or a combination thereof, based on a representative preference inputted or provided by a representative, a service provider, a good supplier, a fleet manager, a logistics provider, a logistics supplier, a map provider, a third party, or the like. A conveyance service request can be filtered once or more than once.

A conveyance service request can be a ride-hail service request, a ride-share service request, a car-share service request, a peer-to-peer conveyance service request, a transportation service request, a scooter service request, a bicycle service request, a person delivery service request, a taxi service request, a shuttle service request, a good delivery service request, an item delivery service request, a medical service and delivery request, a food delivery service request, a courier delivery service request, a freight delivery service request, an animal delivery service request, a delivery service request, or a combination thereof.

A conveyance service request can be perceived or referred to as a filtered conveyance service request or a preferred conveyance service request. A conveyance service request can be identified or referred to as a filtered conveyance service request or a preferred conveyance service request for or with a representative, a service provider, a good supplier, a fleet manager, a logistics provider, a logistics supplier, a map provider, a third party, or a combination thereof. A conveyance service request can include a waypoint. A conveyance service request can include a waypoint where a conveyance client can walk to a designated area to be picked up for a conveyance service. If a conveyance service request is secured or obtained, that same secured or obtained conveyance service request can be referred to or identified as a preferred conveyance service request.

A conveyance service request can be pre-scheduled. A thing to be conveyed can include a personal item such as keys or documents. A conveyance service request can include special request information. A conveyance service request can be stored or cached in a computer readable memory and/or a database of an application. A conveyance service request can relate to an individual conveyance industry segment. A conveyance service request can relate to an individual service provider, an individual map provider, an individual third party, an individual good supplier, an individual fleet manager, or the like. A conveyance service request can be a pre-filtered conveyance service request. A plurality of conveyance service requests can be a single conveyance service request. A conveyance service request can be pre-filtered or pre-categorized on a central server based on a geographical location.

Filtered Conveyance Service Request: The following are illustrative, non-limiting examples of a "filtered conveyance service request" as used in the present disclosure.

A filtered conveyance service request can be a conveyance service request that can be filtered with including a representative preference, a real time or near real time geographical location of a representative, or a combination thereof. When a filtered conveyance service request is considered, a filtered conveyance service request can also be considered.

A filtered conveyance service request can be stored or cached in a computer readable memory and/or a database of a central server. When a representative preference is updated, modified, added, removed, and/or refreshed, a new set of a filtered conveyance service request can be generated. A filtered conveyance service request can relate to a conveyance industry segment. A filtered conveyance service request can relate to a service provider, a good supplier, a fleet manager, an owner or a controller of an autonomous vehicle, a logistics provider, a logistics supplier, a map provider, a third party, a representative, a conveyance client, or a combination thereof.

All or some of a filtered conveyance service request can have or be associated with corresponding conveyance data. All or some of a filtered conveyance service request can have or be associated with intrinsic conveyance data that can be stored in a database. All or some of a filtered conveyance service request can be associated with or inherently have associated conveyance data that can be used to identify a preferred conveyance service request to be secured or obtained.

A filtered conveyance service request can be updated or refreshed in real time or near real time and can refer to being updated or refreshed in the highest level of development or state of the art. A filtered conveyance service request can be pre-filtered or pre-categorized on a central server, an external server, an application, or a combination thereof. A filtered conveyance service request can be filtered more than once. A filtered conveyance service request can be a conveyance service request that matches or satisfies a representative preference. A filtered conveyance service request can become a preferred conveyance service request based on a representative preference inputted or provided by a representative, a service provider, a good supplier, a fleet manager, a logistics provider, a logistics supplier, a map provider, a third party, or the like.

A filtered conveyance service request can be displayed on an application. A filtered conveyance service request can be displayed on a geographical map of a visual representation. A filtered conveyance service request can relate to an individual conveyance industry segment. A filtered conveyance service request can relate to an individual service provider, an individual map provider, an individual third party, an individual good supplier, an individual fleet manager, or the like. If a representative secures or obtains a filtered conveyance service request, that same a secured or obtained filtered conveyance service request can be referred to or identified as a preferred conveyance service request. A filtered conveyance service request can be a pre-filtered conveyance service request. A filtered conveyance service request can be perceived or referred to as a conveyance service request. A plurality of filtered conveyance service requests can be a single filtered conveyance service request. A filtered conveyance service request can be related to a scooter, a scooter service, a bicycle, a bicycle service, or the like.

Preferred Conveyance Service Request: The following are illustrative, non-limiting examples of a "preferred conveyance service request" as used in the present disclosure.

A preferred conveyance service request can be a request for transporting one or more of a person, a good, a thing, an article, or a combination thereof, from a geographical location to another geographical location that can be identified from a filtered conveyance service request. A preferred conveyance service request can be request that a central server, a representative, an application, a good supplier, a fleet manager, a logistics provider, a logistics supplier, a map provider, a third party, or a combination thereof, identifies as preferred. When a preferred conveyance service request is considered, a preferred conveyance service request can also be considered.

A preferred conveyance service request can be stored or cached in a computer readable memory and/or a database of a central server. A preferred conveyance service request can be originally sourced or provided by an external server, a service provider, a good supplier, a fleet manager, a map provider, a third party, or the like. A preferred conveyance service request can be a conveyance service request or a filtered conveyance service request that matches or satisfies a representative preference. A filtered conveyance service request can be identified as preferred by a representative, an application, an owner or a controller of an autonomous vehicle, an autonomous vehicle, a service provider, a good supplier, a fleet manager, a logistics provider, a logistics supplier, a map provider, a third party, or a combination thereof, and then a filtered conveyance service request can become a preferred conveyance service request.

A preferred conveyance service request can be updated or changed in real time or near real time as a real time or near real time geographical location of a representative changes or updates. A preferred conveyance service request can relate to a conveyance industry segment. A preferred conveyance service request can relate to a service provider, a good supplier, a fleet manager, a logistics provider, a logistics supplier, a map provider, a third party, or a combination thereof. A preferred conveyance service request can be updated or refreshed in real time or near real time and can refer to being updated or refreshed in the highest level of development or state of the art. A preferred conveyance service request can be identified as preferred with the highest weighted average of a representative preference. When a representative preference is updated, modified, added, removed, and/or refreshed, a new set of a preferred conveyance service request can be generated or identified.

A conveyance service request can be filtered in real time or near real time by using a representative preference to create a set of a filtered conveyance service request. A filtered conveyance service request can preferably be sorted in real time or near real time relating to a weighted average of a representative preference to identify a preferred conveyance service request.

A preferred conveyance service request can be updated in real time or near real time as traffic information changes or updates. A different geographical location can be used other than a real time or near real time geographical location of a representative or the like, when filtering a conveyance service request, to identify a preferred conveyance service request. An application can secure or obtain a preferred conveyance service request. A preferred conveyance service request can relate to an individual service provider, an individual map provider, an individual third party, an individual good supplier, an individual fleet manager, or the like.

A preferred conveyance service request can be visually identifiable from a filtered conveyance service request displayed on a visual representation. A preferred conveyance service request can be displayed on a geographical map of a visual representation. A preferred conveyance service request can be displayed on an application. A preferred conveyance service request can relate to an individual conveyance industry segment. A central server, an application, a representative, or a combination thereof, can secure or obtain a preferred conveyance service request for or with a representative. A preferred conveyance service request can be pre-filtered or pre-categorized on a central server, an external server, an application, or a combination thereof.

A preferred conveyance service request can be identified from a filtered conveyance service request that has the highest weighted average of a representative preference. A representative preference can have an equal weight or an unequal weight when using a weighted average to identify a preferred conveyance service request. A preferred conveyance service request can be perceived or referred to as a conveyance service request or a filtered conveyance service request. More than one preferred conveyance service request can be secured or obtained concurrently. A preferred conveyance service request can be related to a scooter, a scooter service, a bicycle, a bicycle service, or the like.

Conveyance Service Offering: The following are illustrative, non-limiting examples of a "conveyance service offering" as used in the present disclosure.

A conveyance service offering can be an offering from a representative, an autonomous vehicle, a service provider or the like for the transportation of one or more of a person, a good, an article, a thing, or a combination thereof, from a geographical location to another geographical location. Once a beginning service geographical location, an ending service geographical location, pricing information, or a combination thereof, is known, a conveyance service offering relating to a representative or an autonomous vehicle can be generated. When a conveyance service offering is considered, a conveyance service offering can also be considered.

A conveyance service offering can be sourced or provided from one or more of an external server, a service provider, a good supplier, a fleet manager, a map provider, a third party, or the like. A conveyance service offering can be stored or cached in a computer readable memory and/or a database of a central server. A conveyance service offering can relate to a conveyance industry segment. A conveyance service offering can relate to a service provider, a good supplier, a fleet manager, an owner or a controller of an autonomous vehicle, a logistics provider, a logistics supplier, a map provider, a third party, a representative, a conveyance client, or a combination thereof.

All or some of a conveyance service offering can have or be associated with corresponding conveyance data. All or some of a conveyance service offering can have or be associated with intrinsic conveyance data that can be stored in a database. All or some of a conveyance service offering can be associated with or inherently have associated conveyance data that can be used to filter and identify a preferred conveyance service offering to be secured or obtained.

A conveyance service offering can be updated or refreshed in real time or near real time and can refer to being updated or refreshed in the highest level of development or state of the art. A conveyance service offering can be pre-filtered or pre-categorized on a central server, an external server, an application, or a combination thereof. A conveyance service offering can be a filtered conveyance service offering, a preferred conveyance service offering, or a combination thereof, relating to a conveyance client preference. A conveyance service offering can become a filtered conveyance service offering, a preferred conveyance service offering, or a combination thereof, based on a conveyance client preference inputted or provided by a conveyance client. A conveyance service offering can be filtered once or more than once.

A conveyance service offering can be a ride-hail service offering, a ride-share service offering, a car-share service offering, a peer-to-peer conveyance service offering, a transportation service offering, a scooter service offering, a bicycle offering, a person delivery service offering, a taxi service offering, a shuttle service offering, a good delivery service offering, an item delivery service offering, a medical service and delivery offering, a food delivery service offering, a courier delivery service offering, a freight delivery service offering, an animal delivery service offering, a delivery service offering, or a combination thereof.

A conveyance service offering can be perceived or referred to as a filtered conveyance service offering or a preferred conveyance service offering. A conveyance service offering can be identified or referred to as a filtered conveyance service offering or a preferred conveyance service offering for or with a conveyance client. A conveyance service offering can include a waypoint. A conveyance service offering can include a waypoint where a conveyance client can walk to a designated area to be picked up for a conveyance service. If a conveyance service offering is secured or obtained, that same a secured or obtained conveyance service offering can be referred to or identified as a preferred conveyance service offering.

A conveyance service offering can be pre-scheduled. A thing to be conveyed can include a personal item such as a clothing item or a purse. A conveyance service offering can include special offering information. A conveyance service offering can relate to an individual conveyance industry segment. A conveyance service offering can relate to an individual service provider, an individual map provider, an individual third party, an individual good supplier, an individual fleet manager, or the like. A conveyance service offering can be a pre-filtered conveyance service offering. A plurality of conveyance service offerings can be a single conveyance service offering. A conveyance service offering can be pre-filtered or pre-categorized on a central server based on a geographical location.

Filtered Conveyance Service Offering: The following are illustrative, non-limiting examples of a "filtered conveyance service offering" as used in the present disclosure.

A filtered conveyance service offering can be a conveyance service offering that can be filtered with including a conveyance client preference, a real time or near real time geographical location of a conveyance client, or a combination thereof. When a filtered conveyance service offering is considered, a filtered conveyance service offering can also be considered.

A filtered conveyance service offering can be stored or cached in a computer readable memory and/or a database of a central server. When a conveyance client preference is updated, modified, added, removed, and/or refreshed, a new set of a filtered conveyance service offering can be generated. A filtered conveyance service offering can relate to a conveyance industry segment. A filtered conveyance service offering can relate to a service provider, a good supplier, a fleet manager, an owner or a controller of an autonomous vehicle, a logistics provider, a logistics supplier, a map provider, a third party, a representative, a conveyance client, or a combination thereof.

All or some of a filtered conveyance service offering can have or be associated with corresponding conveyance data. All or some of a filtered conveyance service offering can have or be associated with intrinsic conveyance data that can be stored in a database. All or some of a filtered conveyance service offering can be associated with or inherently have associated conveyance data that can be used to identify a preferred conveyance service offering to be secured or obtained.

A filtered conveyance service offering can be updated or refreshed in real time or near real time and can refer to being updated or refreshed in the highest level of development or state of the art. A filtered conveyance service offering can be pre-filtered or pre-categorized on a central server, an external server, an application, or a combination thereof. A filtered conveyance service offering can be filtered more than once. A filtered conveyance service offering can be a conveyance service offering that matches or satisfies a conveyance client preference. A filtered conveyance service offering can become a preferred conveyance service offering based on a conveyance client preference inputted or provided by a conveyance client or the like.

A filtered conveyance service offering can be displayed on an application. A filtered conveyance service offering can be displayed on a geographical map of a visual representation. A filtered conveyance service offering can relate to an individual conveyance industry segment. A filtered conveyance service offering can relate to an individual service provider, an individual map provider, an individual third party, an individual good supplier, an individual fleet manager, or the like. If a conveyance client secures or obtains a filtered conveyance service offering, that same a secured or obtained filtered conveyance service offering can be referred to or identified as a preferred conveyance service offering. A filtered conveyance service offering can be a pre-filtered conveyance service offering. A filtered conveyance service offering can be perceived or referred to as a conveyance service offering. A plurality of filtered conveyance service offerings can be a single filtered conveyance service offering. A filtered conveyance service offering can be related to a scooter, a scooter service, a bicycle, a bicycle service, or the like.

Preferred Conveyance Service Offering: The following are illustrative, non-limiting examples of a "preferred conveyance service offering" as used in the present disclosure.

A preferred conveyance service offering can be an offering for transporting one or more of a person, a good, a thing, an article, or a combination thereof, from a geographical location to another geographical location that can be identified from a filtered conveyance service offering. A preferred conveyance service offering can be an offering that including a conveyance client, a central server, an application, a good supplier, a fleet manager, a logistics provider, a logistics supplier, a map provider, a third party, or a combination thereof, identifies as preferred. When a preferred conveyance service offering is considered, a preferred conveyance service offering can also be considered.

A preferred conveyance service offering can be stored or cached in a computer readable memory and/or a database of a central server. A preferred conveyance service offering can be originally sourced or provided by an external server, a service provider, a good supplier, a fleet manager, a map provider, a third party, or the like. A preferred conveyance service offering can be a conveyance service offering or a filtered conveyance service offering that can match or satisfy a conveyance client preference. A filtered conveyance service offering can be identified as preferred by a conveyance client, a service provider, a good supplier, a fleet manager, a logistics provider, a logistics supplier, a map provider, a third party, or a combination thereof, and then preferably a filtered conveyance service offering can become a preferred conveyance service offering.

A preferred conveyance service offering can be updated or changed in real time or near real time as a real time or near real time geographical location of a conveyance client changes or updates. A preferred conveyance service offering can relate to a conveyance industry segment. A preferred conveyance service offering can relate to a service provider, a good supplier, a fleet manager, a logistics provider, a logistics supplier, a map provider, a third party, or a combination thereof. A preferred conveyance service offering can be updated or refreshed in real time or near real time and can refer to being updated or refreshed in the highest level of development or state of the art. A preferred conveyance service offering can be identified as preferred with the highest weighted average of a conveyance client preference. When a conveyance client preference is updated, modified, added, removed, and/or refreshed, a new set of a preferred conveyance service offering can be generated or identified.

A conveyance service offering can be filtered in real time or near real time by using to a conveyance client preference to create a set of a filtered conveyance service offering. A filtered conveyance service offering can preferably be sorted in real time or near real time relating to a weighted average of a conveyance client preference to identify a preferred conveyance service offering.

A preferred conveyance service offering can be updated in real time or near real time as traffic information changes or updates. A different geographical location can be used other than a real time or near real time geographical location of a conveyance client or the like, when filtering a conveyance service offering, to identify a preferred conveyance service offering. An application can secure or obtain a preferred conveyance service offering. A preferred conveyance service offering can be visually identifiable from a filtered conveyance service offering displayed on a visual representation. A preferred conveyance service offering can relate to an individual conveyance industry segment. A preferred conveyance service offering can relate to an individual service provider, an individual map provider, an individual third party, an individual good supplier, an individual fleet manager, or the like.

A preferred conveyance service offering can be identified from a filtered conveyance service offering that has the highest weighted average of a conveyance client preference. A conveyance client preference can have an equal weight or an unequal weight when using a weighted average to identify a preferred conveyance service offering. A preferred conveyance service offering can be perceived or referred to as a conveyance service offering or a filtered conveyance service offering. More than one representative or more than one autonomous vehicle can be secured or obtained for an individual preferred conveyance service offering.

A preferred conveyance service offering can be displayed on a geographical map of a visual representation. A preferred conveyance service offering can be displayed on an application. A central server, an application, a conveyance client, or a combination thereof, can secure or obtain a preferred conveyance service offering for or with a conveyance client. A preferred conveyance service offering can be pre-filtered or pre-categorized on a central server, an external server, an application, or a combination thereof.

A level of service preference can be used by a conveyance client to identify a luxury vehicle, an environmentally friendly vehicle, a driverless vehicle, or the like. A level of service preference can be utilized to identify a newer vehicle over an older vehicle. A preferred conveyance service offering can be related to a scooter, a scooter service, a bicycle, a bicycle service, or the like.

Representative Preference: The following are illustrative, non-limiting examples of a "representative preference" as used in the present disclosure A representative preference can be a rule or a parameter that can be used to facilitate an operation or a function to secure or obtain a preferred conveyance service request. A representative preference can be a rule or a parameter that can be utilized or operated by a representative, a service provider, a good supplier, a fleet manager, a logistics provider, a logistics supplier, a map provider, a third party, or a combination thereof. A representative preference can be any rule or parameter that can be used or utilized during a process of filtering and/or identifying a preferred conveyance service request.

A representative preference can be a rule or a parameter that can optimize all or some of conveyance data, a conveyance service request, or a combination thereof. A representative preference can relate directly or indirectly to a preferred conveyance service request. A representative preference can be associated with or have a feature or a various feature that can be used to match a representative for or with a preferred conveyance service request, a conveyance client, or a combination thereof. A representative preference can be a rule implemented in a rules-based system, a rules-based method, or a combination thereof.

A representative preference can be used by a representative, a good supplier, a fleet manager, a logistics provider, a logistics supplier, a map provider, a third party, or a combination thereof, to identify and preferably secure or obtain a preferred conveyance service request for or with a representative. A representative preference or a set of a representative preference can be used to filter, identify as preferred, secure or obtain, or a combination thereof, a preferred conveyance service request.

A representative preference can be refined or customized by a representative, a service provider, a good supplier, a fleet manager, a logistics provider, a logistics supplier, a map provider, a third party, or a combination thereof. A representative preference can be fixed or built-in on a central server, an external server, an application, or a combination thereof. A representative preference can be made non-editable. A representative preference can be a digit or a number.

A representative preference can be a tool, a rule or a parameter to filter, identify, secure or obtain, or a combination thereof, a preferred conveyance service request, a filtered conveyance service request, a conveyance service request, or a combination thereof.

A representative preference can be used to match or satisfy a preferred conveyance service request, a filtered conveyance service request, a conveyance service request, or a combination thereof, with or for a representative. A representative preference can be used to match or satisfy a representative for or with a preferred conveyance service request, a filtered conveyance service request, a conveyance service request, or a combination thereof. A representative preference can be utilized by a representative, a service provider, a good supplier, an owner or a controller of an autonomous vehicle, a fleet manager, a logistics provider, a logistics supplier, a map provider, a third party, or a combination thereof, to identify and preferably secure or obtain a preferred conveyance service request.

A representative preference can include an option selected or provided by a representative, a good supplier, a fleet manager, a logistics provider, a logistics supplier, a map provider, a third party, or a combination thereof, to filter and/or preferably sort a conveyance service request in real time or near real time in order to identify a preferred conveyance service request. A representative preference can be used to filter and identify a preferred conveyance service request and then filter and identify a representative that can be identified as preferred, all or some of conveyance data relating to a representative, or a combination thereof, and preferably be secured or obtained together. A representative preference can have or be associated with a set of preferences or a set of parameters that can be used to filter and identify a preferred conveyance service request, a filtered conveyance service request, a conveyance service request, or a combination thereof.

A representative preference can be used to filter a conveyance service request in any order prior to securing or obtaining a match between a preferred conveyance service request and a representative. A representative preference can be used to identify a preferred conveyance service request in any order prior to securing or obtaining a match between a preferred conveyance service request and a representative.

A representative preference can be pre-set on one or more of a central server, an external server, an application, a terminal or a combination thereof. A representative preference can be either inclusive or exclusive for filtering or the like a conveyance service request. An individual representative preference can have an equal weight or an unequal weight when calculating a weighted average to identify a preferred conveyance service request. A filtered conveyance service request can preferably be sorted in real time or near real time in an order relating to a weighted average of a representative preference to identify a preferred conveyance service request.

A representative, a good supplier, a fleet manager, a logistics provider, a logistics supplier, a map provider, a third party, or a combination thereof, can optionally choose a weight for a representative preference to have an equal weight or an unequal weight. A representative, a good supplier, a fleet manager, a logistics provider, a logistics supplier, a map provider, a third party, or a combination thereof, can optionally choose a weight for a representative preference to filter, identify, secure or obtain, or a combination thereof, a preferred conveyance service request.

A representative preference can be used to filter a conveyance service request into a filtered conveyance service request. A representative preference can be used to identify a preferred conveyance service request from a filtered conveyance service request. A representative preference can be used to filter all or some of conveyance data relating to a representative.

A representative preference can be stored or cached on one or more of a central server, an application, an external server, a terminal, or a combination thereof. A representative preference can be stored or cached on or transmitted to a central server, an external server, a terminal, an application, or a combination thereof. A representative preference can be stored on or retrieved from a server that can be remote from a central server, an external server, an application, or a combination. A representative preference can be stored or cached in a database. A representative preference can be used in a database to filter and identify a preferred conveyance service request, a filtered conveyance service request, a conveyance service request, or a combination thereof.

A representative, an owner or a controller of an autonomous vehicle, a service provider, a good supplier, a fleet manager, a logistics provider, a logistics supplier, a map provider, a third party, or a combination thereof, can use a representative preference to filter and identify a preferred conveyance service request, a filtered conveyance service request, a conveyance service request, or a combination thereof.

A representative can input or provide a representative preference into an application, a central server, an external server, or a combination thereof, that can be used to identify and preferably secure or obtain a preferred conveyance service request. A representative, an owner or a controller of an autonomous vehicle, a service provider, a good supplier, a fleet manager, a logistics provider, a logistics supplier, a map provider, a third party, or a combination thereof, can input or provide a representative preference into an application, a central server, or an external server that can be used to identify and preferably secure or obtain a preferred conveyance service request for or with a representative.

A representative, an owner or a controller of an autonomous vehicle, a service provider, a good supplier, a fleet manager, a logistics provider, a logistics supplier, a map provider, a third party, or a combination thereof, can use a representative preference to manage, control, or operate an at least one autonomous vehicle, a representative, or a combination thereof.

A representative preference can be updated or refreshed in real time or near real time and can refer to being updated or refreshed in the highest level of development or state of the art. A representative preference can be used to perform a function in real time or near real time being updated or refreshed in the highest level of development or state of the art. A representative preference can be updated or changed and a new or different set of filtered conveyance service request(s), preferred conveyance service request(s), or a combination thereof, can be identified.

A central server, an application, an external server, or a combination thereof, can filter out, hide, or remove a conveyance service request that does not meet or match the representative preference criteria for a representative. A representative preference can be used in conjunction with a real time or near real time geographical location of a representative or a different geographical location to filter a conveyance service request into a filtered conveyance service request.

A representative preference can be used to identify a preferred conveyance service request from a filtered conveyance service request or a pre-filtered conveyance service request. A representative preference can be used by a representative, a service provider, a good supplier, an owner or a controller of an autonomous vehicle, a fleet manager, a logistics provider, a logistics supplier, a map provider, a third party, or a combination thereof, operating in a conveyance industry segment.

A representative preference can be a rule or a parameter that can utilize a route planning information. A representative preference can be learned over time relating to a conveyance service request, all or some of conveyance data, a conveyance client, a representative, an autonomous vehicle, an owner or a controller of an autonomous vehicle, a service provider, a good supplier, a fleet manager, a logistics provider, a logistics supplier, a map provider, a third party, or a combination thereof. A representative preference can be a predictive preference that can utilize machine learning technology and/or quantum computing or the like.

A level of service preference can be used to identify, for example, a vehicle type, a service type, a vehicle detail, an autonomous vehicle detail, or the like. A representative preference can have or relate to a cultural trait of a regional area or a country. A representative preference can be a capacity preference that can be utilized to manage or monitor a capacity level relating to a vehicle, an autonomous vehicle, a representative, an owner or a controller of an autonomous vehicle, a service provider, a good supplier, a fleet manager, a logistics provider, a logistics supplier, a map provider, a third party, or a combination thereof.

A representative preference can be one or more preferences selected from or relating to pricing, elevated pricing, geographical location, distance, route, service duration, beginning service geographical location, ending service geographical location, time, predictive, historical, efficiency, sensor(s), event (inclusion or exclusion), traffic-based, road condition, weather condition, transportation, route planning, fuel economy, battery longevity, vehicle capacity, vehicle diagnostic, conveyance data, duration of conveyance service, conveyance service request density, conveyance client density, conveyance client detail, conveyance client rating, representative density, autonomous vehicle density, service provider (inclusion or exclusion), service provider density, level of service, good supplier, good supplier density, owner or controller of an autonomous vehicle, owner or controller of an autonomous vehicle density, fleet manager, fleet manager density, logistics provider, logistics provider density, logistics supplier, logistics supplier density, good detail, conveyance industry segment, freight, waypoint, delivery service, oldest outstanding request, oldest outstanding offering, or a combination thereof.

If an efficiency preference is selected, a representative can accept an additional food delivery service request for the same restaurant to perform an additional conveyance service and earn more money. If a price preference is selected, then preferably a conveyance service request priced higher than a set minimum price can be identified as a preferred conveyance service request. If a distance preference is selected, then preferably a conveyance service request within a selected distance can be identified as a preferred conveyance service request. A good detail preference can include an item being fragile. If a good detail preference is selected, then preferably a conveyance service request for conveying a certain type and/or quantity of a good that a representative is capable of delivering can be identified as a preferred conveyance service request, such as the capability to deliver a refrigerator or a mirror. If a freight preference is selected, then preferably a conveyance service request for conveying freight that a representative is capable of delivering can be identified as a preferred conveyance service request, such as a conveyance service request to deliver a biohazardous material or a flammable material.

A representative preference can be transmitted between or from an application to an external server by way of a link between an application and an external server.

A representative preference can be associated with a database, a database query, a database table, a database result set, or the like. A database query can include or be associated with a representative preference. A representative preference can be related to or associated with another a representative preference. A representative preference can be used to retrieve data from database. A representative preference can be an internal part of a central server. A representative preference can be in a form or a format relating to a SQL parameter, a variable, or the like. Multiple representative preferences can be used multiple times during a process of filtering and/or identifying a preferred conveyance service request for or with a representative. A representative preference can be used with or within a conditional statement, a conditional expression, a conditional construct, or the like. A representative preference can be used for altering a control flow based on a condition.

A representative preference can have or be associated with a different set of preferences or a different set of parameters that can be used to filter and identify a preferred conveyance service request, a filtered conveyance service request, a conveyance service request, or a combination thereof. Some representative preferences can be more relevant than other representative preferences when a central server filters and/or identifies a preferred conveyance service request, a filtered conveyance service request, a conveyance service request, or a combination thereof. A representative preference can be used for filtering a conveyance service request in a food delivery industry segment and a different representative preference can be used for filtering a conveyance service request in a ride-hail industry segment.

Anytime a conveyance service request is going through a process to become filtered or identified as preferred, all or some of conveyance data relating to a representative can go through a same or a similar process. A representative preference can use a sensor data to analyze or evaluate and preferably secure or obtain a preferred conveyance service request with or for a representative. A representative preference can use a sensor data to identify if an autonomous vehicle has enough battery to perform a conveyance service.

A transportation preference can be a parameter or a rule that can identify a conveyance service preference. A transportation preference can identify a conveyance service request that requires handicap assistance. A transportation preference can identify a conveyance service request that requires a luxury vehicle. An efficiency preference can be a parameter or a rule that can optimize vehicle utilization. A representative preference can be stored or cached in a database table. A representative preference can be stored or cached in a database that a central server, an external server, an application, or a combination thereof, can connect to or be associated with.

A predictive preference can be identified or learned over time based on a pattern relating to a conveyance service request, all or some of conveyance data relating to a representative, a conveyance client, a representative, an autonomous vehicle, an owner or a controller of an autonomous vehicle, a service provider, a good supplier, a fleet manager, a logistics provider, a logistics supplier, a map provider, a third party, or a combination thereof.

A time preference can relate to a time range, a pick-up time, a drop-off time, a pre-scheduled time, or the like, during a time of a day, a time of a week, a time of a month, a time of a year, or a combination thereof. A conveyance client detail preference can be a route preference provided by a conveyance client, an application, a central server, an external server, a third party, a map provider, or a combination thereof. A route planning preference can identify a route that can avoid toll roads. A route planning preference can identify an optimal navigational route that can aid in identifying a preferred conveyance service request.

A route preference can be utilized to identify a historical route, a specific route, a favored route, an area, a specific location, a pricing information, or the like. A route preference can be learned over time to avoid traffic congestion on Highway Interstate 5 around 5 PM during the week. A route preference can be to avoid a road, a street, a highway, a neighborhood, or the like, that a conveyance client or a recipient of a conveyance service prefers.

A level of service preference can be displayed as an icon or a visual with or on the visual representation to allow a selection of different levels of service that a representative, an autonomous vehicle, a service provider, a good supplier, or the like can provide or perform.

A level of service preference can be displayed on or with a visual representation to identify different levels of service that an owner or a controller of an autonomous vehicle, a service provider, a good supplier, a fleet manager, a logistics provider, a logistics supplier, a map provider, a third party, a representative, an autonomous vehicle, a conveyance client, or the like, can provide or receive. A level of service preference can be displayed as an icon with or on a visual representation to allow a selection of different levels of service that a representative, an autonomous vehicle, a conveyance client, a service provider, a good supplier, a fleet manager, an owner or a controller of an autonomous vehicle, a logistics provider, a logistics supplier, a map provider, a third party, or the like, can provide or receive.

A level of service preference can be displayed on a dynamic map to identify different levels of service that a representative, an autonomous vehicle, a conveyance client, a service provider, a good supplier, a fleet manager, an owner or a controller of an autonomous vehicle, a logistics provider, a logistics supplier, a map provider, a third party, or the like, can provide or receive. A representative, an autonomous vehicle, a conveyance client, a service provider, a good supplier, a fleet manager, an owner or a controller of an autonomous vehicle, a logistics provider, a logistics supplier, a map provider, a third party, or a combination thereof, can be displayed on or with a dynamic map that can display a level of service preference and can be represented by a mobile or transitory icon.

An event inclusion preference can identify a destination rating with 4 out of 5 stars for or with a representative or the like. An event inclusion preference can identify an event or an area that can be optimal for a representative, a service provider, or the like that can be currently well positioned in or near that event or area, but it may not be optimal for other representatives, service providers, or the like further away from that event or area.

A representative preference can be a good supplier preference that can enable a good supplier to delay or postpone a current or a future conveyance service request. A conveyance client preference or a preference of a recipient of a conveyance service, can be compared to or with a representative preference, to identify a match and preferably secure or obtain a preferred conveyance service request for or with a representative.

A representative preference can have or relate to a cultural trait that can impact a match between a representative and a preferred conveyance service request. A representative preference can have or relate to a cultural trait that can impact all or some of a conveyance service request. For example, Americans may prefer to have a representative preference with a shorter estimated time of arrival compared to Canadians.

A capacity preference can identify a maximum number of passengers or goods in a vehicle or an autonomous vehicle. A conveyance client can utilize a preference to specify if a conveyance client prefers an autonomous vehicle or a representative. A representative preference can be at least carpool preference. A representative preference can be used to identify a conveyance client or a group of a conveyance client that can be pooled together for a conveyance service to an ending service geographical location. A representative preference can relate to safety, for example, a vehicle being handicap friendly.

A delivery service preference can be to filter out deliveries that can add more than 10 minutes to total travel time. A delivery service preference can specify a dimension for a good, an item, or the like. A delivery service preference can be used to identify a representative or a vehicle with a specific feature relating to a good delivery, an item delivery, or the like. A delivery service preference can be used to identify a pre-scheduled conveyance service request or a pre-scheduled conveyance client or the like.

A vehicle diagnostic preference can be to take a vehicle off the road or to not secure or obtain another conveyance service request if a vehicle is due for maintenance. A vehicle diagnostic preference can be to take a vehicle off the road or to not secure or obtain another conveyance service request if criteria regarding a vehicle is met. A vehicle diagnostic preference can be related to a sensor data on a vehicle or an autonomous vehicle.

A central server or an application can use or apply a second representative preference and a process can optionally be referred to or seen as an additional level of filtering. A central server or an application can filter conveyance service requests using a two-step process to first filter conveyance service requests based on a representative preference and then filter a subset of conveyance service requests based on a different representative preference.

A representative preference can be transmitted to or uploaded to an external server. A representative preference can be utilized for pre-filtering conveyance service requests on or at an external server, a central server, an application, or a combination thereof.

For example, when an individual representative preference has an unequal weight, a pricing preference can have 70% weight and a distance preference can have 30% weight which can be used to identify a preferred conveyance service request when determining which a filtered conveyance service request has the highest weighted average.

A representative preference can be used for an individual conveyance industry segment. A representative preference can be used for an individual service provider, a map provider, or the like. A representative can specify a representative preference to work in a given area by using a geographical location preference. A representative can specify a representative preference to work in a six-mile perimeter by using a geographical location preference.

A representative preference, once inputted or provided into an application, can be stored or cached on an application, a computer readable memory of a central server, or a combination thereof, and a representative preference is not inputted or provided again into an application by a representative. A representative preference can be stored or cached in a computer readable memory of a central server and a representative preference is not transmitted again from an application to a central server. A representative preference, a real time or near real time geographical location of a representative, or a combination thereof, can be transmitted from an application to a central server at any time prior to filtering or the like a conveyance service request.

A representative preference can be the same or similar to a conveyance client preference. A representative preference can be the same or have similar logic as a conveyance client preference.

Conveyance Client Preference: The following are illustrative, non-limiting examples of a "conveyance client preference" as used in the present disclosure A conveyance client preference can be a rule or a parameter that can be used to facilitate an operation or a function to secure or obtain a preferred conveyance service offering. A conveyance client preference can be a rule or a parameter that can be utilized or operated by a conveyance client, a service provider, a good supplier, a fleet manager, a logistics provider, a logistics supplier, a map provider, a third party, or a combination thereof. A conveyance client preference can be any rule or parameter that can be used or utilized during a process of filtering and/or identifying a preferred conveyance service offering.

A conveyance client preference can be a rule or a parameter that can optimize all or some of conveyance data, a conveyance service offering, or a combination thereof. A conveyance client preference can relate directly or indirectly to a preferred conveyance service offering. A conveyance client preference can be associated with or have a feature or a various feature that can be used to match a conveyance client for or with a preferred conveyance service offering, a representative, an autonomous vehicle, or a combination thereof. A conveyance client preference can be a rule implemented in a rules based system, a rules based method, or a combination thereof.

A conveyance client preference can be used by a conveyance client, a good supplier, a fleet manager, a logistics provider, a logistics supplier, a map provider, a third party, or a combination thereof, to identify and preferably secure or obtain a preferred conveyance service offering for or with a conveyance client. A conveyance client preference or a set of a conveyance client preference can be used to filter, identify as preferred, secure or obtain, or a combination thereof, a preferred conveyance service offering.

A conveyance client preference can be refined or customized by a conveyance client, a service provider, a good supplier, a fleet manager, a logistics provider, a logistics supplier, a map provider, a third party, or a combination thereof. A conveyance client preference can be fixed or built-in on a central server, an external server, an application, or a combination thereof. A conveyance client preference can be made non-editable. A conveyance client preference can be a digit or a number.

A conveyance client preference can be a tool such as a rule or a parameter to filter, identify, secure or obtain, or a combination thereof, a preferred conveyance service offering, a filtered conveyance service offering, a conveyance service offering, or a combination thereof.

A conveyance client preference can be used to match or satisfy a preferred conveyance service offering, a filtered conveyance service offering, a conveyance service offering, or a combination thereof, with or for a conveyance client. A conveyance client preference can be used to match or satisfy a conveyance client for or with a preferred conveyance service offering, a filtered conveyance service offering, a conveyance service offering, or a combination thereof. A conveyance client preference can be utilized by a conveyance client, a service provider, a good supplier, an owner or a controller of an autonomous vehicle, a fleet manager, a logistics provider, a logistics supplier, a map provider, a third party, or a combination thereof, to identify and preferably secure or obtain a preferred conveyance service offering.

A conveyance client preference can include an option selected or provided by a conveyance client, a good supplier, a fleet manager, a logistics provider, a logistics supplier, a map provider, a third party, or a combination thereof, to filter and/or preferably sort a conveyance service offering in real time or near real time in order to identify a preferred conveyance service offering. A conveyance client preference can be used to filter and identify a preferred conveyance service offering and then filter and identify a conveyance client that can be identified as preferred, all or some of conveyance data relating to a conveyance client, or a combination thereof, and preferably be secured or obtained together. A conveyance client preference can have or be associated with a set of preferences or a set of parameters that can be used to filter and identify a preferred conveyance service offering, a filtered conveyance service offering, a conveyance service offering, or a combination thereof.

A conveyance client preference can be used to filter a conveyance service offering in any order prior to securing or obtaining a match between a preferred conveyance service offering and a conveyance client. A conveyance client preference can be used to identify a preferred conveyance service offering in any order prior to securing or obtaining a match between a preferred conveyance service offering and a conveyance client.

A conveyance client preference can be pre-set on one or more of a central server, an external server, an application, a terminal or a combination thereof. A conveyance client preference can be either inclusive or exclusive for filtering or the like a conveyance service offering. An individual conveyance client preference can have an equal weight or an unequal weight when calculating a weighted average to identify a preferred conveyance service offering. A filtered conveyance service offering can preferably be sorted in real time or near real time in an order relating to a weighted average of a conveyance client preference to identify a preferred conveyance service offering.

A conveyance client, a good supplier, a fleet manager, a logistics provider, a logistics supplier, a map provider, a third party, or a combination thereof, can optionally choose a weight for a conveyance client preference to have an equal weight or an unequal weight. A conveyance client, a good supplier, a fleet manager, a logistics provider, a logistics supplier, a map provider, a third party, or a combination thereof, can optionally choose a weight for a conveyance client preference to filter, identify, secure or obtain, or a combination thereof, a preferred conveyance service offering.

A conveyance client preference can be used to filter a conveyance service offering into a filtered conveyance service offering. A conveyance client preference can be used to identify a preferred conveyance service offering from a filtered conveyance service offering. A conveyance client preference can be used to filter all or some of conveyance data relating to a conveyance client.

A conveyance client preference can be stored or cached on one or more of a central server, an application, an external server, a terminal, or a combination thereof. A conveyance client preference can be stored or cached on or transmitted to a central server, an external server, a terminal, an application, or a combination thereof. A conveyance client preference can be stored on or retrieved from a server that can be remote from a central server, an external server, an application, or a combination. A conveyance client preference can be stored or cached in a database. A conveyance client preference can be used in a database to filter and identify a preferred conveyance service offering, a filtered conveyance service offering, a conveyance service offering, or a combination thereof.

A conveyance client, a service provider, a good supplier, a fleet manager, an owner or a controller of an autonomous vehicle, a logistics provider, a logistics supplier, a map provider, a third party, or a combination thereof, can use a conveyance client preference to filter and identify a preferred conveyance service offering, a filtered conveyance service offering, a conveyance service offering, or a combination thereof.

A conveyance client can input or provide a conveyance client preference into an application, a central server, an external server, or a combination thereof, that can be used to identify and preferably secure or obtain a preferred conveyance service offering. A conveyance client, an owner or a controller of an autonomous vehicle, a service provider, a good supplier, a fleet manager, a logistics provider, a logistics supplier, a map provider, a third party, or a combination thereof, can input or provide a conveyance client preference into an application, a central server, or an external server that can be used to identify and preferably secure or obtain a preferred conveyance service offering for or with a conveyance client.

A conveyance client preference can be updated or refreshed in real time or near real time and can refer to being updated or refreshed in the highest level of development or state of the art. A conveyance client preference can be used to perform a function in real time or near real time being updated or refreshed in the highest level of development or state of the art. A conveyance client preference can be updated or changed and a new or different set of filtered conveyance service offering(s), preferred conveyance service offering(s), or a combination thereof, can be identified.

A central server, an application, an external server, or a combination thereof, can filter out, hide, or remove a conveyance service offering that does not meet or match conveyance client preference criteria for a conveyance client. A conveyance client preference can be used in conjunction with a real time or near real time geographical location of a conveyance client or a different geographical location to filter a conveyance service offering into a filtered conveyance service offering.

A conveyance client preference can be used to identify a preferred conveyance service offering from a filtered conveyance service offering or a pre-filtered conveyance service offering. A conveyance client preference can be used by a conveyance client, a service provider, a good supplier, an owner or a controller of an autonomous vehicle, a fleet manager, a logistics provider, a logistics supplier, a map provider, a third party, or a combination thereof, operating in a conveyance industry segment.

A conveyance client preference can be a rule or a parameter that can utilize a route planning information. A conveyance client preference can be learned over time relating to a conveyance service offering, all or some of conveyance data, a conveyance client, a representative, an autonomous vehicle, an owner or a controller of an autonomous vehicle, a service provider, a good supplier, a fleet manager, a logistics provider, a logistics supplier, a map provider, a third party, or a combination thereof. A conveyance client preference can be a predictive preference that can utilize machine learning technology and/or quantum computing or the like.

A level of service preference can be used to identify, for example, a vehicle type, a service type, a vehicle detail, an autonomous vehicle detail, or the like. A conveyance client preference can have or relate to a cultural trait of a regional area or a country. A conveyance client preference can be a capacity preference that can be utilized to manage or monitor a capacity level relating to a vehicle, an autonomous vehicle, a conveyance client, a representative, an owner or a controller of an autonomous vehicle, a service provider, a good supplier, a fleet manager, a logistics provider, a logistics supplier, a map provider, a third party, or a combination thereof.

A conveyance client preference can be one or more preferences related to pricing, elevated pricing, geographical location, distance, route, service duration, beginning service geographical location, ending service geographical location, time, predictive, historical, efficiency, event inclusion, event exclusion, traffic-based, road condition, weather condition, duration of conveyance service, conveyance service offering density, representative detail, representative rating, representative density, conveyance client density, service provider inclusion, service provider exclusion, service provider density, level of service, good supplier inclusion, a good supplier exclusion, good supplier density, good detail, conveyance industry segment, freight, waypoint, delivery service, oldest outstanding offering, or a combination thereof.

The conveyance client preferences may also be preferences relating to transportation, route planning, fuel economy, battery longevity, vehicle capacity, vehicle diagnostic, conveyance data, conveyance client detail, conveyance client rating, autonomous vehicle density, service provider, good supplier, owner or controller of an autonomous vehicle, owner or controller of an autonomous vehicle density, fleet manager, fleet manager density, logistics provider, logistics provider density, logistics supplier, logistics supplier density, conveyance industry segment, or a combination thereof.

If a price preference is selected as a conveyance client preference, then preferably a conveyance service offering without elevated pricing can be identified as a preferred conveyance service offering. If a level of service preference is selected, then preferably a conveyance service offering with a higher quality of service such as "white glove services" or luxury services can be identified as a preferred conveyance service offering. If a price preference is selected, then preferably a conveyance service offering priced lower than a set maximum price can be identified as a preferred conveyance service offering for a conveyance client.

If a representative rating preference is selected, then preferably a conveyance service offering from a representative with a rating greater than or equal to a set minimum rating can be identified as a preferred conveyance service offering. When an individual conveyance client preference has an unequal weight, a pricing preference can have 90% weight and a service provider inclusion preference can have 10% weight which can be used to identify a preferred conveyance service offering when determining which a filtered conveyance service offering has a highest weighted average. For example, if an additional conveyance client preference were added to a first conveyance client preference, a weight of a conveyance client preference would sum to 100%.

A conveyance client preference can be transmitted between or from an application to an external server by way of a link between an application and an external server.

A conveyance client preference can be associated with a database, a database query, a database table, a database result set, or the like. A database query can include or be associated with a conveyance client preference. A conveyance client preference can be related to or associated with another a conveyance client preference. A conveyance client preference can be used to retrieve data from database. A conveyance client preference can be an internal part of a central server. A conveyance client preference can be in a form or a format relating to a SQL parameter, a variable, or the like. For example, conveyance client preferences can be used multiple times during a process of filtering and/or identifying a preferred conveyance service offering for or with a conveyance client. A conveyance client preference can be used with or within a conditional statement, a conditional expression, a conditional construct, or the like. A conveyance client preference can be used for altering a control flow based on a condition.

A conveyance client preference can have or be associated with a different set of preferences or a different set of parameters that can be used to filter and identify a preferred conveyance service offering, a filtered conveyance service offering, a conveyance service offering, or a combination thereof. Some conveyance client preferences can be more relevant than other conveyance client preferences when a central server filters and/or identifies a preferred conveyance service offering, a filtered conveyance service offering, a conveyance service offering, or a combination thereof. A conveyance client preference can be used for filtering a conveyance service offering in a food delivery industry segment and a different conveyance client preference can be used for filtering a conveyance service offering in a ride-hail industry segment.

Anytime a conveyance service offering is going through a process to become filtered or identified as preferred, all or some of conveyance data relating to a conveyance client can go through a same or a similar process. A conveyance client preference can use a sensor data from a vehicle to analyze or evaluate and preferably secure or obtain a preferred conveyance service offering with or for a conveyance client. A conveyance client preference can use a sensor data to identify if an autonomous vehicle has enough battery to perform a conveyance service.

A transportation preference can be a parameter or a rule that can identify a conveyance service preference. A transportation preference can identify a conveyance service offering that requires handicap assistance. A transportation preference can identify a conveyance service offering that requires a luxury vehicle. An efficiency preference can be a parameter or a rule that can optimize vehicle utilization. A conveyance client preference can be stored or cached in a database table. A conveyance client preference can be stored or cached in a database that a central server, an external server, an application, or a combination thereof, can connect to or be associated with.

A predictive preference can be identified or learned over time based on a pattern relating to a conveyance service offering, all or some of conveyance data relating to a conveyance client, a conveyance client, a representative, an autonomous vehicle, an owner or a controller of an autonomous vehicle, a service provider, a good supplier, a fleet manager, a logistics provider, a logistics supplier, a map provider, a third party, or a combination thereof.

A time preference can relate to a time range, a pick-up time, a drop-off time, a pre-scheduled time, or the like, during a time of a day, a time of a week, a time of a month, a time of a year, or a combination thereof. A conveyance client detail preference can be a route preference provided by a conveyance client, an application, a central server, an external server, a third party, a map provider, or a combination thereof. A route planning preference can identify a route that can avoid toll roads. A route planning preference can identify an optimal navigational route that can aid in identifying a preferred conveyance service offering.

A route preference can be utilized to identify a historical route, a specific route, a favored route, an area, a specific location, a pricing information, or the like. A route preference can be learned over time to avoid traffic congestion on Highway Interstate 5 around 5 PM during the week. A route preference can be to avoid a road, a street, a highway, a neighborhood, or the like, that a conveyance client or a recipient of a conveyance service prefers.

A level of service preference can be displayed as an icon or a visual with or on the visual representation to allow a selection of different levels of service that a representative, an autonomous vehicle, a service provider, a good supplier, or the like can provide or perform.

A level of service preference can be displayed on or with a visual representation to identify different levels of service that an owner or a controller of an autonomous vehicle, a service provider, a good supplier, a fleet manager, a logistics provider, a logistics supplier, a map provider, a third party, a representative, an autonomous vehicle, a conveyance client, or the like, can provide or receive. A level of service preference can be displayed as an icon with or on a visual representation to allow a selection of different levels of service that a representative, an autonomous vehicle, a conveyance client, a service provider, a good supplier, a fleet manager, an owner or a controller of an autonomous vehicle, a logistics provider, a logistics supplier, a map provider, a third party, or the like, can provide or receive. A conveyance client preference can be related to a scooter, a scooter service, a bicycle, a bicycle service, or the like.

A level of service preference can be displayed on a dynamic map to identify different levels of service that a representative, an autonomous vehicle, a conveyance client, a service provider, a good supplier, a fleet manager, an owner or a controller of an autonomous vehicle, a logistics provider, a logistics supplier, a map provider, a third party, or the like, can provide or receive. A representative, an autonomous vehicle, a conveyance client, a service provider, a good supplier, a fleet manager, an owner or a controller of an autonomous vehicle, a logistics provider, a logistics supplier, a map provider, a third party, or a combination thereof, can be displayed on or with a dynamic map that can display a level of service preference and can be represented by a mobile or transitory icon.

A conveyance client preference can be a good supplier preference that can enable a good supplier to rush or advance a current or a future conveyance service offering. A conveyance client preference or a preference of a recipient of a conveyance service, can be compared to or with a representative preference, to identify a match and preferably secure or obtain a preferred conveyance service offering for or with a conveyance client.

A conveyance client preference can have or relate to a cultural trait that can impact a match between a conveyance client and a preferred conveyance service offering. A conveyance client preference can have or relate to a cultural trait that can impact all or some of a conveyance service offering. For example, Americans may prefer to have a conveyance client preference with a shorter estimated time of arrival compared to Canadians.

A capacity preference can identify a maximum number of passengers or goods in a vehicle or an autonomous vehicle. A conveyance client can utilize a preference to specify if a conveyance client prefers an autonomous vehicle or a representative. A conveyance client preference can be at least carpool preference. A conveyance client preference can be used to identify a conveyance client or a group of a conveyance client that can be pooled together for a conveyance service to an ending service geographical location. A conveyance client preference can relate to safety for example, a vehicle being handicap friendly.

A delivery service preference can be to filter out deliveries that can add more than 10 minutes to total travel time. A delivery service preference can specify a dimension for a good, an item, or the like. A delivery service preference can be used to identify a representative or a vehicle with a specific feature relating to a good delivery, an item delivery, or the like. A delivery service preference can be used to identify a pre-scheduled conveyance service offering or a pre-scheduled representative or the like.

A central server or an application can use or apply a second conveyance client preference and a process can optionally be referred to or seen as an additional level of filtering. A central server or an application can filter conveyance service offerings using a two-step process to first filter conveyance service offerings based on a conveyance client preference and then filter a subset of conveyance service offerings based on a different conveyance client preference.

A conveyance client preference can be transmitted to or uploaded to an external server. A conveyance client preference can be utilized for pre-filtering conveyance service offerings on or at an external server, a central server, an application, or a combination thereof. A conveyance client preference can be used for an individual conveyance industry segment. A conveyance client preference can be used for an individual service provider, a map provider, or the like.

A conveyance client preference, once inputted or provided into an application, can be stored or cached on an application, a computer readable memory of a central server, or a combination thereof, and a conveyance client preference is not inputted or provided again into an application by a conveyance client. A conveyance client preference can be stored or cached in a computer readable memory of a central server and a conveyance client preference is not transmitted again from an application to a central server. A conveyance client preference, a real time or near real time geographical location of a conveyance client, or a combination thereof, can be transmitted from an application to a central server at any time prior to filtering or the like a conveyance service offering.

A conveyance client preference can be the same or similar to a representative preference. A conveyance client preference can be the same or have similar logic as a representative preference.

Geographical Location: The following are illustrative, non-limiting examples of a "geographical location" as used in the present disclosure A geographical location of a conveyance client can be a geographical location, a coordinate, a position, or a place where a conveyance client can be at any given point in time. A geographical location of a conveyance client, a representative, an autonomous vehicle, a service provider, a good supplier, or a combination thereof, can be in real time, near real time, static, or non-real time.

A geographical location of any individual person, machine, entity, or a combination thereof, can be related to or have a longitude and a latitude in a decimal point or format. A geographical location of any individual person, machine, entity, or a combination thereof, can be related to or have a longitude and a latitude in a database with a decimal point or format. A geographical location of any individual person, machine, entity, or a combination thereof, can be related to or have a longitude and a latitude in a different decimal point or format. A geographical location of any individual person, machine, entity, or a combination thereof, can be related to or have a longitude and a latitude in a database with a different decimal point or format.

A geographical location of a representative, an autonomous vehicle, a conveyance client, a service provider, a good supplier, a fleet manager, an owner or a controller of an autonomous vehicle, a logistics provider, a logistics supplier, or a combination thereof, can have or utilize a variable precision, that can preferably be standardized in a uniform format. Due to many different systems and methods of coding a geographical location, a variable precision can be preferred to standardize a geographical location. Due to many different systems and methods of coding a real time or near real time geographical location of a conveyance client, a variable precision can be preferred to standardize a digit or a decimal.

A geographical location of a representative can be a geographical location, a coordinate, a position, or a place where a representative can be at any given point in time. A geographical location of an autonomous vehicle can be a geographical location, a coordinate, a position, or a place where an autonomous vehicle can be at any given point in time. A geographical location of a service provider can be a geographical location, a coordinate, a position, or a place where a service provider can be at any given point in time. A geographical location of a good supplier can be a geographical location, a coordinate, a position, or a place where a good supplier can be at any given point in time.

A geographical location of a conveyance client, a representative, an autonomous vehicle, a service provider, a good supplier, a fleet manager, an owner or a controller of an autonomous vehicle, a logistics provider, a logistics supplier, a third party, a map provider, or a combination thereof, can be displayed on a visual representation.

A geographical location of any individual person, machine, entity, or a combination thereof, can be updated or refreshed in real time or near real time and can refer to being updated or refreshed in the highest level of development or state of the art. A geographical location of any individual person, machine, entity, or a combination thereof, can be used to perform a function in real time or near real time being updated or refreshed in the highest level of development or state of the art. A geographical location can be pre-set on one or more of a central server, an external server, an application, a visual representation, or a combination thereof. A geographical location of a conveyance client, a representative, an autonomous vehicle, a service provider, a good supplier, or a combination thereof, can relate to a service provider operating in a conveyance industry segment.

When a geographical location of any individual person, machine, entity, or a combination thereof, is considered, a geographical location of a representative, an autonomous vehicle, a conveyance client, a service provider, a good supplier, a fleet manager, an owner or a controller of an autonomous vehicle, a logistics provider, a logistics supplier, a third party, a map provider, or the like, can also be considered.

A geographical location of a conveyance client, a representative, an autonomous vehicle, a service provider and/or a good supplier can be used for respective density preferences. A geographical location of a conveyance client, a representative, an autonomous vehicle, a service provider, a good supplier, or a combination thereof, can be used for a dynamic map. A geographical location of a conveyance client, a representative, an autonomous vehicle, a service provider, a good supplier, or a combination thereof, can be used for a heat map. A geographical location of a conveyance client, a representative, an autonomous vehicle, a service provider, a good supplier, or a combination thereof, can relate to an individual service provider operating in an individual conveyance industry segment.

A geographical location of a conveyance client, a representative, an autonomous vehicle, a service provider, a good supplier, or a combination thereof, can be static or non-real time. A geographical location of a good supplier can be static or non-real time as it can relate to a brick-and-mortar geographical location.

A geographical location of any individual person, machine, entity, or a combination thereof, can be sourced or provided from three external servers, and can be associated with or have a longitude and a latitude in a database table with a different decimal point or format that can be standardized to have a similar decimal point or format. A geographical location of a representative, an autonomous vehicle, a conveyance client, a service provider, a good supplier, a fleet manager, an owner or a controller of an autonomous vehicle, a logistics provider, a logistics supplier, a third party, a map provider, or a combination thereof, can have or be associated with a variable precision, that can preferably be standardized in a uniform format.

A geographical location of an individual person, an individual machine, an individual entity, a representative, an autonomous vehicle, a conveyance client, a service provider, a good supplier, a fleet manager, an owner or a controller of an autonomous vehicle, a logistics provider, a logistics supplier, a third party, a map provider, or a combination thereof, can have or be associated with a longitude and a latitude in a database table with a decimal point or format. A geographical location of an individual person, an individual machine, an individual entity, a representative, an autonomous vehicle, a conveyance client, a service provider, a good supplier, a fleet manager, an owner or a controller of an autonomous vehicle, a logistics provider, a logistics supplier, a third party, a map provider, or a combination thereof, can have or be associated with a longitude and a latitude in a database table with a different decimal point or format.

Due to many different systems and methods of coding a geographical location of a representative, an autonomous vehicle, a conveyance client, a service provider, a good supplier, a fleet manager, an owner or a controller of an autonomous vehicle, a logistics provider, a logistics supplier, a third party, a map provider, or a combination thereof, a variable precision is preferred to standardize a digit or a decimal.

Beginning Service Geographical Location: The following are illustrative, non-limiting examples of a "beginning service geographical location" as used in the present disclosure A beginning service geographical location can be a geographical location requested by a conveyance client or an entity where a conveyance service begins or is requested. A beginning service geographical location can be modified before and/or during a conveyance service, if utilizing a waypoint. A beginning service geographical location need not be a real time or near real time geographical location of a conveyance client. A beginning service geographical location can be updated or refreshed in real time or near real time and can refer to being updated or refreshed in the highest level of development or state of the art. A beginning service geographical location can be used to perform a function in real time or near real time being updated or refreshed in the highest level of development or state of the art. A beginning service geographical location can be pre-set or pre-determined on a central server, an external server, an application, or a combination thereof. A beginning service geographical location can be associated with a conveyance service request or a conveyance service offering.

A conveyance client can input or provide a beginning service geographical location into an application. A conveyance client can input or provide a beginning service geographical location into an application to find a conveyance service offering, a filtered conveyance service offering, a preferred conveyance service offering, or a combination thereof. A beginning service geographical location can be static or non-real time. A representative or an autonomous vehicle can pick up a conveyance client at a beginning service geographical location.

A beginning service geographical location can have or be associated with a waypoint. A beginning service geographical location can have or be associated with a waypoint, where a conveyance client can walk to a beginning service geographical location. A conveyance client can have or use two or multiple beginning service geographical locations including a waypoint, where a conveyance client can take a public bus from one beginning service geographical location to then be picked up by an autonomous vehicle from a second beginning service geographical location.

A beginning service geographical location can be at a future beginning service geographical location. A beginning service geographical location can used for or with an autonomous vehicle to create a conveyance service offering. A beginning service geographical location can be dynamic. A beginning service geographical location can be associated with latitude and longitude.

Ending Service Geographical Location: The following are illustrative, non-limiting examples of an "ending service geographical location" as used in the present disclosure An ending service geographical location can be a geographical location requested by a conveyance client or an entity where a conveyance service ends. An ending service geographical location can be modified before and/or during a conveyance service. An ending service geographical location can include a waypoint. An ending service geographical location can be updated or refreshed in real time or near real time and can refer to being updated or refreshed in the highest level of development or state of the art. An ending service geographical location can be used to perform a function in real time or near real time being updated or refreshed in the highest level of development or state of the art. An ending service geographical location can be pre-set or pre-determined on a central server, an external server, an application, or a combination thereof. An ending service geographical location can be associated with a conveyance service request or a conveyance service offering.

A conveyance client can input or provide an ending service geographical location into an application. A conveyance client can input or provide an ending service geographical location into an application to find a conveyance service offering, a filtered conveyance service offering, a preferred conveyance service offering, or a combination thereof. An ending service geographical location can be static or non-real time. A representative or an autonomous vehicle can drop off a conveyance client at an ending service geographical location.

An ending service geographical location can have or be associated with a waypoint, where a conveyance client can stop at a coffee shop prior to being dropped off at an ending service geographical location. An ending service geographical location can be at a future ending service geographical location. An ending service geographical location can used for or with an autonomous vehicle to create a conveyance service offering. An ending service geographical location can be dynamic. An ending service geographical location can be associated with latitude and longitude.

Conveyance Industry Segment: The following are illustrative, non-limiting examples of a "conveyance industry segment" as used in the present disclosure.

The conveyance industry can be an industry categorized by the transportation of someone or something from a geographical location to another geographical location. The conveyance industry can be an industry categorized by the transportation of someone or something from a geographical location to another geographical location in real time or near real time. A conveyance industry segment can be a smaller part of the overall conveyance industry as a whole, categorized by different limiting characteristics. A conveyance industry segment can be updated or refreshed in real time or near real time and can refer to being updated or refreshed in the highest level of development or state of the art.

A service provider, an owner or a controller of an autonomous vehicle, a good supplier, a fleet manager, a logistics provider, a logistics supplier, an autonomous vehicle, a third party, a map provider, or a combination thereof, can operate in a conveyance industry segment. An owner or a controller of an autonomous vehicle, a service provider, a good supplier, a fleet manager, a logistics provider, a logistics supplier, a third party, a map provider, or a combination thereof, can manage, control, operate, or the like, an autonomous vehicle or a representative in a conveyance industry segment. A conveyance service request or a conveyance service offering can be associated with a conveyance industry segment.

A conveyance industry segment can be a ride-hail industry segment, a ride-share industry segment, a car-share industry segment, a peer-to-peer conveyance industry segment, a person delivery industry segment, a taxi industry segment, an item delivery industry segment, a good delivery industry segment, a freight industry segment, a medical service and delivery industry segment, a food delivery industry segment, a courier industry segment, an animal delivery industry segment, a transportation industry segment, a mobility industry segment, or a combination thereof.

An individual service provider or the like can operate in an individual conveyance industry segment. By employing features of the present invention, a conveyance client can receive a ride back home in the ride-hail industry segment and order food to be delivered home more or less at the same time from a similar service provider. A transportation industry segment can be related to a scooter service or the like. A transportation industry segment can be related to a bicycle service or the like.

The invention claimed is:

1. A network for communicating and securing one or more conveyance service requests from at least one conveyance client to at least one representative that controls at least one vehicle configured to perform conveyance services, the at least one conveyance client having a conveyance client device in communication with the network, the network comprising:
- a plurality of external servers in communication with the network, each external server associated with a business entity that manages or controls a conveyance service, wherein at least a portion of the plurality of external servers is configured for receiving the one or more conveyance service requests from the at least one conveyance client, and wherein the one or more conveyance service requests comprise conveyance data associated with one or more of persons or objects to be transported, geographical location data, and one or more representative preference;
- at least one central server in communication with the network, the at least one central server configured for receiving the one or more conveyance service requests from the at least at least a portion of the plurality of external servers;
- at least one application associated with the at least one central server, the at least one application configured for entry of one or a combination of the geographical location data and the one or more representative preference via at least one interface having at least one input device and at least one display device;
- wherein the at least one central server is configured to:
  - perform one or more of standardizing and aggregating the one or more conveyance service requests;
  - filter the one or more conveyance service requests by using one or a combination of the one or more representative preference and the geographical location data to identify a filtered subset of conveyance service requests;
  - identify one or more preferred conveyance service requests from the filtered subset of conveyance service requests based on the one or more representative preference; and
- wherein the at least one application is further configured to:
  - generate at least one visual representation associated with one or more selectable request options comprising one or a combination of the filtered subset of conveyance service requests, the one or more preferred conveyance service requests, and the one or more representative preference, wherein the one or more selectable request options is displayed interactively within the at least one visual representation on the at least one display device, wherein the at least one visual representation comprises a dynamic map that is updated in substantially real time to display updated results for the one or more selectable request options; and
  - secure the one or more selectable request options in response to an entry by one or a combination of the at least one representative and the business entity via the at least one input device.

2. The network of claim 1, wherein the business entity operates within a freight industry segment.

3. The network of claim 1, wherein the at least one vehicle comprises at least one autonomous vehicle.

4. The network of claim 1, wherein one or a combination of the at least one representative and the at least one conveyance client operates within a freight industry segment.

5. The network of claim 1, wherein the business entity comprises one or more of an entity that conveys goods or services, an entity that produces or supplies freight, a freight provider, a service provider, a goods supplier, a fleet manager, a logistics provider, and a logistics supplier.

6. The network of claim 1, wherein the at least one representative comprises at least one driver.

7. The network of claim 1, wherein the one or more representative preference is entered by a controller on behalf of one or more of a driver, a business entity, and an autonomous vehicle.

8. The network of claim 1, wherein the at least one representative comprises a controller that secures or obtains the one or more preferred conveyance service requests for one or more of a driver and an autonomous vehicle.

9. The network of claim 1, wherein multiple external servers of the plurality of the external servers are associated with a single business entity.

10. The network of claim 1, wherein the at least one application is further configured to select one or more additional selectable request options after securing the one or more selectable request options.

11. The network of claim 1, wherein the at least one visual representation comprises one or more of a list, a geographical map, a dynamic map, and a heat map.

12. The network of claim 1, wherein the at least one visual representation is configured to repeatedly update with at least one of subsequent or additional filtered subset of conveyance service requests, subsequent or additional one or more preferred conveyance service requests, the one or more additional selectable request options, conveyance data, and the one or more representative preference.

13. The network of claim 1, wherein the at least one application comprises one or more of a website, a web application, a smart phone application, and a computer program.

14. The network of claim 1, wherein the geographical location data comprises one or more of a beginning service geographical location, an ending service geographical location, a waypoint, and a substantially real time geographical location of the at least one representative.

15. A network for communicating and securing one or more conveyance service requests from at least one conveyance client to at least one representative that controls at least one vehicle configured to perform conveyance services, the at least one conveyance client having a conveyance client device in communication with the network, the network comprising:
- at least one central server in communication with the network;
- at least one application associated with the at least one central server, the at least one application configured for entry of one or a combination of geographical location data and one or more representative preference via at least one interface having at least one input device and at least one display device;
- a plurality of external servers in communication with the network, each external server associated with a business entity that manages or controls a conveyance service, wherein at least a portion of the plurality of external servers is configured for receiving the one or more conveyance service requests comprising conveyance data associated with one or more persons or objects to be transported, the geographical location data, and the one or more representative preference, wherein each of the at least a portion of the plurality of external servers is further configured for first filtering the one or more conveyance service requests according to at least one of the geographical location data and at least a portion of the one or more representative preference to define one or more first filtered conveyance service requests;

wherein the at least one central server is configured to:

perform one or more of standardizing and aggregating the one or more first filtered conveyance service requests; and second filter the one or more first filtered conveyance service requests by using one or combination of the one or more representative preference and the geographical location data to identify one or more second filtered conveyance service requests; and wherein the at least one application is further configured to:

generate at least one visual representation associated with one or more selectable request options comprising one or a combination of the one or more second filtered conveyance service requests, the one or more first filtered conveyance service requests, and the one or more representative preference, wherein the one or more selectable request options is displayed interactively within the at least one visual representation on the at least one display device, wherein the at least one visual representation comprises a dynamic map that is updated in substantially real time to display updated results for the one or more selectable request options; and secure the one or more selectable request options in response to an entry by the at least one representative or the business entity via the at least one input device.

16. The network of claim 15, wherein the at least one central server identifies the one or more second filtered conveyance service requests using one or more of a sorting algorithm, a selection algorithm, a search algorithm, a merge algorithm, a maximum function, a minimum function, and a comparison.

17. The network of claim 15, wherein the at least one vehicle comprises at least one autonomous vehicle.

18. The network of claim 15, wherein one or a combination of the at least one representative and the at least one conveyance client operates within a freight industry segment.

19. The network of claim 15, wherein the business entity comprises one or more of an entity that conveys goods or services, an entity that produces or supplies freight, a freight provider, a service provider, a goods supplier, a fleet manager, a logistics provider, a map provider, and a logistics supplier.

20. The network of claim 15, wherein the at least one representative comprises at least one driver.

21. The network of claim 15, wherein the one or more representative preference is entered by a controller on behalf of one or more of a driver, the business entity, and an autonomous vehicle.

22. The network of claim 15, wherein the at least one representative comprises a controller that secures or obtains the one or more second filtered conveyance service on behalf of one or more of a driver, the business entity, and an autonomous vehicle.

23. The network of claim 15, wherein the at least one application is further configured to select one or more additional selectable request options after securing the one or more selectable request options.

24. The network of claim 15, wherein the at least one visual representation comprises one or more of a list, a geographical map, a dynamic map, and a heat map.

25. The network of claim 15, wherein the at least one visual representation is configured to repeatedly update with at least one of additional first filtered conveyance service requests, additional second filtered conveyance service requests, the one or more additional selectable request options, conveyance data, and the one or more representative preference.

26. The network of claim 15, wherein the at least one application comprises one or more of a website, a web application, a smart phone application, and a computer program.

27. The network of claim 15, wherein the geographical location data comprises one or more of a beginning service geographical location, an ending service geographical location, a waypoint, and a substantially real time geographical location of the at least one representative.

28. A method for communicating and securing one or more conveyance service requests from at least one conveyance client to at least one representative that controls at least one vehicle configured to perform conveyance services, the at least one conveyance client having a conveyance client device in communication within the network, the method comprising:

a) receiving at, at least one central server in communication with the network, in any order:

i) the one or more conveyance service requests from at least one external server associated with a business entity that manages or controls a conveyance service, the one or more conveyance service requests comprising conveyance data associated with one or more persons or objects to be transported from at least one first geographical location to at least one second geographical location;

ii) one or more representative preference entered via at least one terminal having a display device and an input device; and iii) geographical location data;

b) processing the one or more conveyance service requests by:

i) filtering the one or more conveyance service requests by using the one or more representative preference and the geographical location data to identify a filtered subset of conveyance service requests; and ii) identifying one or more preferred conveyance service requests from the filtered subset of conveyance service requests based on the one or more representative preference; and c) generating at least one visual representation associated with one or more selectable request options comprising one or a combination of the filtered subset of conveyance service requests, the one or more preferred conveyance service requests, the one or more representative preference, wherein the one or more selectable request options is interactively displayed as options within the at least one visual representation on the display device, wherein the at least one visual representation comprises a dynamic map that is updated in substantially real time to display updated results for the one or more selectable request options; and d) securing the one or more selectable request options in response to an entry by the at least one representative or the business entity via the input device.

* * * * *